(12) United States Patent
Randall et al.

(10) Patent No.: US 9,329,201 B2
(45) Date of Patent: May 3, 2016

(54) METHODS, DEVICES, AND SYSTEMS FOR FORMING ATOMICALLY PRECISE STRUCTURES

(71) Applicant: Zyvex Labs, LLC, Richardson, TX (US)

(72) Inventors: John Neal Randall, Richardson, TX (US); James R. Von Ehr, Richardson, TX (US); James H. G. Owen, Garland, TX (US); Joshua B. Ballard, Richardson, TX (US); Ehud Fuchs, Plano, TX (US)

(73) Assignee: Zyvex Labs LLC, Richardson, TX (US)

( * ) Notice: Subject to any disclaimer, the term of this patent is extended or adjusted under 35 U.S.C. 154(b) by 238 days.

(21) Appl. No.: 14/209,659

(22) Filed: Mar. 13, 2014

(65) Prior Publication Data

US 2015/0355226 A1     Dec. 10, 2015

Related U.S. Application Data

(60) Provisional application No. 61/788,103, filed on Mar. 15, 2013.

(51) Int. Cl.
| | |
|---|---|
| *B82B 3/00* | (2006.01) |
| *G01Q 60/10* | (2010.01) |
| *G01Q 90/00* | (2010.01) |
| *G01Q 20/00* | (2010.01) |
| *G01Q 10/00* | (2010.01) |
| *G01Q 80/00* | (2010.01) |

(52) U.S. Cl.
CPC .............. *G01Q 20/00* (2013.01); *B82B 3/0038* (2013.01); *G01Q 10/00* (2013.01); *G01Q 60/10* (2013.01); *G01Q 80/00* (2013.01); *H01J 2237/31759* (2013.01)

(58) Field of Classification Search
CPC ........ G01Q 60/10; G01Q 90/00; B82B 3/0004; B82B 3/0038; B82B 3/0042; B82B 3/0052; B82B 3/0066
See application file for complete search history.

(56) References Cited

U.S. PATENT DOCUMENTS

| | | | |
|---|---|---|---|
| 6,762,056 B1 * | 7/2004 | Peeters .................... | B82Y 5/00 436/86 |
| 7,601,394 B2 | 10/2009 | Gorman et al. | |
| 2009/0208672 A1 | 8/2009 | Polanyi et al. | |
| 2010/0239775 A1 * | 9/2010 | Zhou ........................ | B82B 3/00 427/457 |

OTHER PUBLICATIONS

International Search Report and Written Opinion received in Patent Cooperation Treaty Application No. PCT/US2014/027895 dated Jan. 2, 2015.

(Continued)

*Primary Examiner* — Nicole Ippolito
*Assistant Examiner* — Sean Luck
(74) *Attorney, Agent, or Firm* — Haynes and Boone, LLP

(57) ABSTRACT

Methods, devices, and systems for forming atomically precise structures are provided. In some embodiments, the methods, devices, and systems of the present disclosure utilize a scanning tunneling microscope (STM) to remove portions of a monolayer of atoms or molecules from a crystalline surface to form atomically precise structures. The STM is utilized to both image the sample and remove the desired portions of the monolayer of atoms or molecules. In some instances, the lattice structure of the crystalline surface is utilized as a coordinate system by a control system of the STM to facilitate the automated removal of specific atoms or molecules from the crystalline surface.

52 Claims, 52 Drawing Sheets

(56) References Cited

OTHER PUBLICATIONS

G. Scappucci et al., A Complete Fabrication Route for Atomic-Scale, Donor-Based Devices in Single-Crystal Germanium, Nano Letters, © 2011 American Chemical Society, May 10, 2011, pp. 2272-2279.
Guohong Ii et al. Self-Navigation of a Scanning Tunneling Microscope Tip Toward a Micron-Sized Sample, The Mar. 2011 of the American Physical Society, Nov. 26, 2011, © 2011 American Institute of Physics, pp. 1-12.
K.E.J. Goh et al., Using Patterned H-resist for Controlled Three-Dimensional Growth of Nanostructures, 2011 American Institute of Physics, Apr. 18, 2011.

* cited by examiner

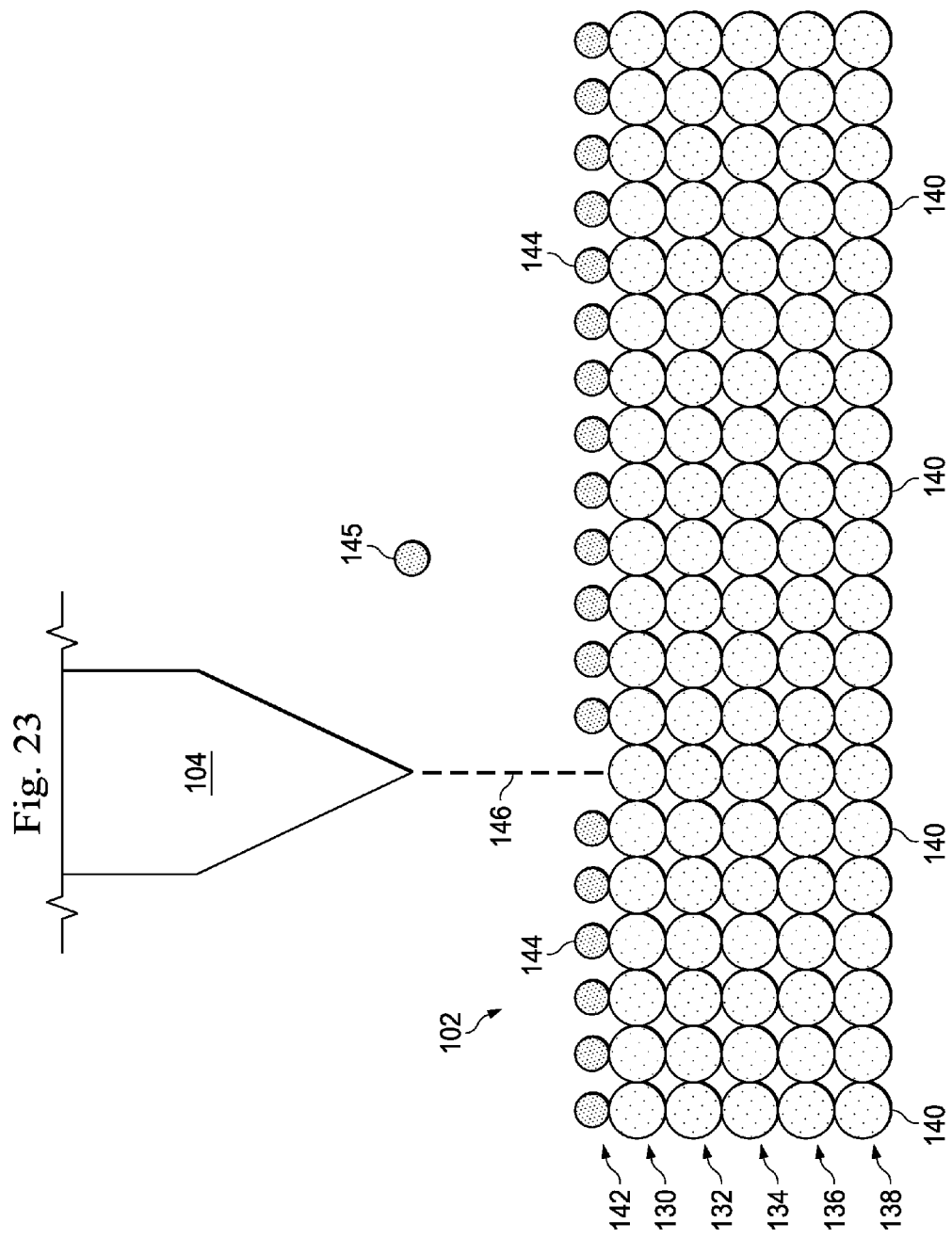

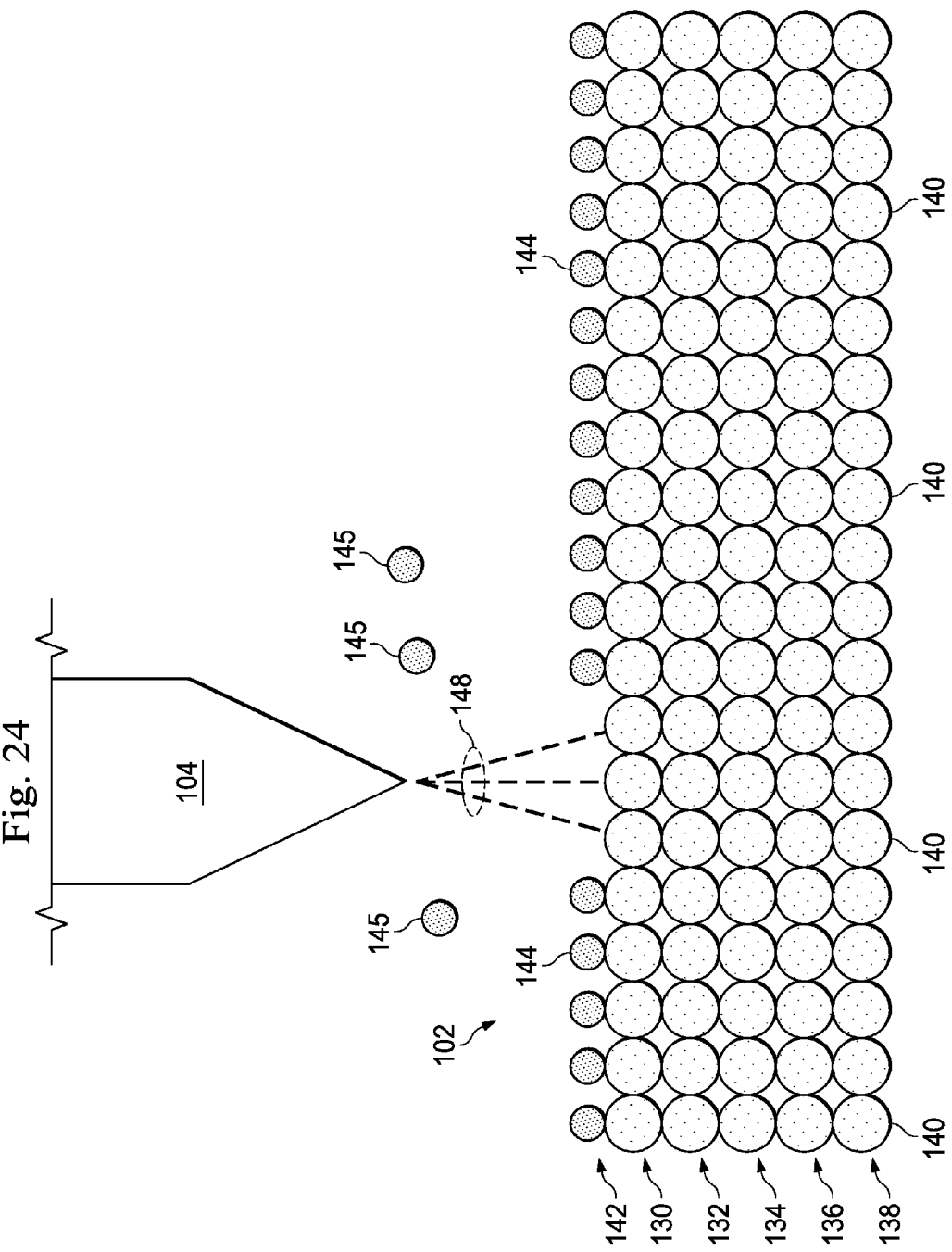

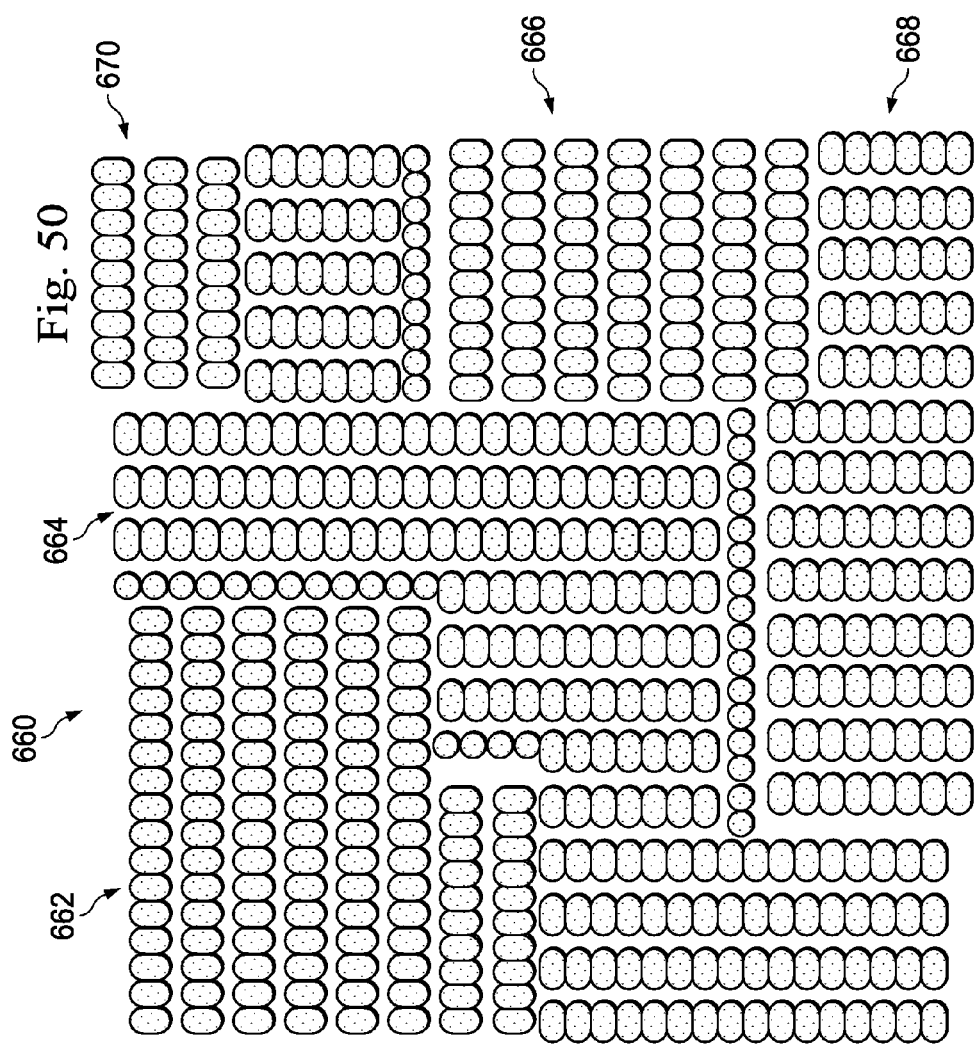

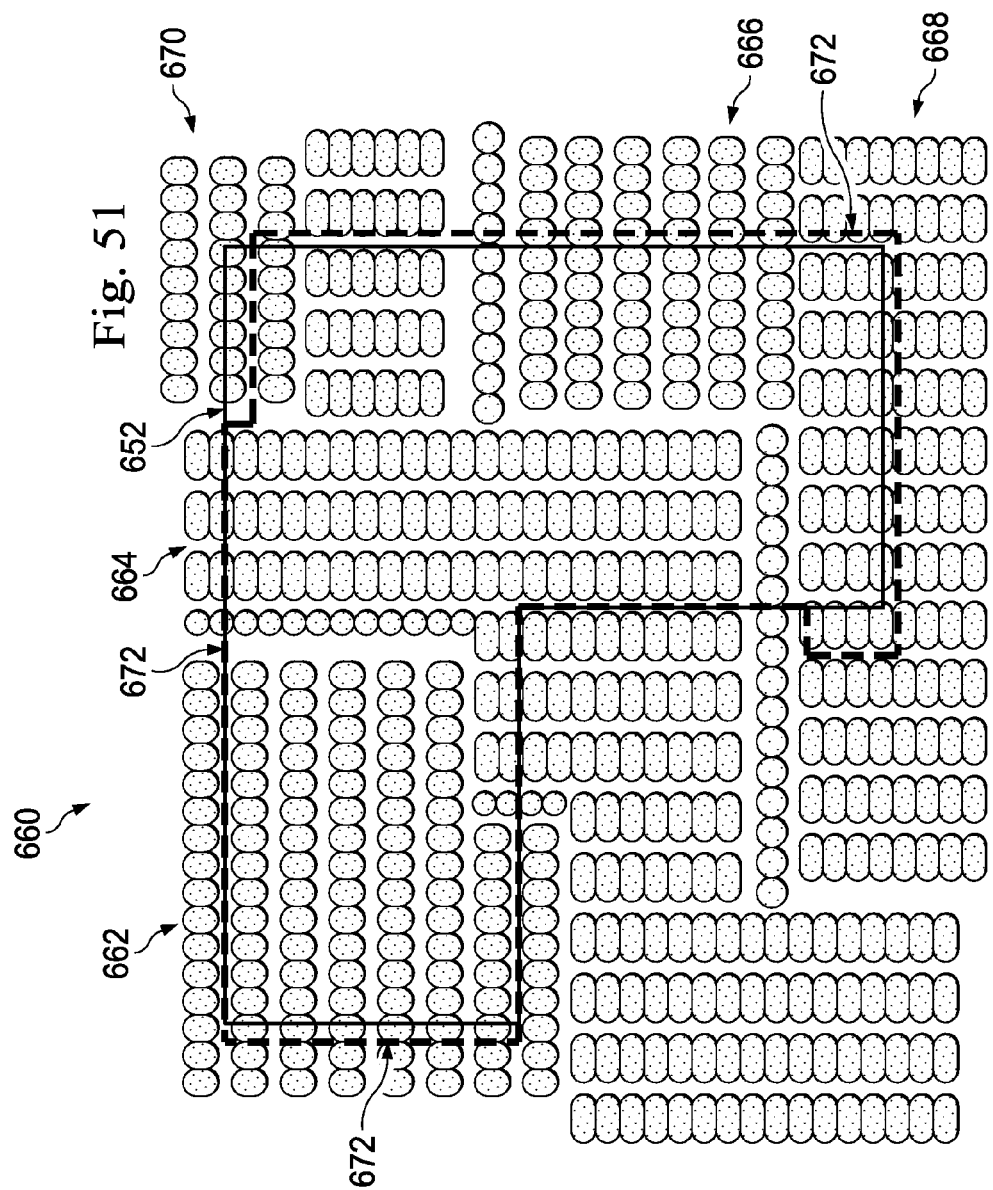

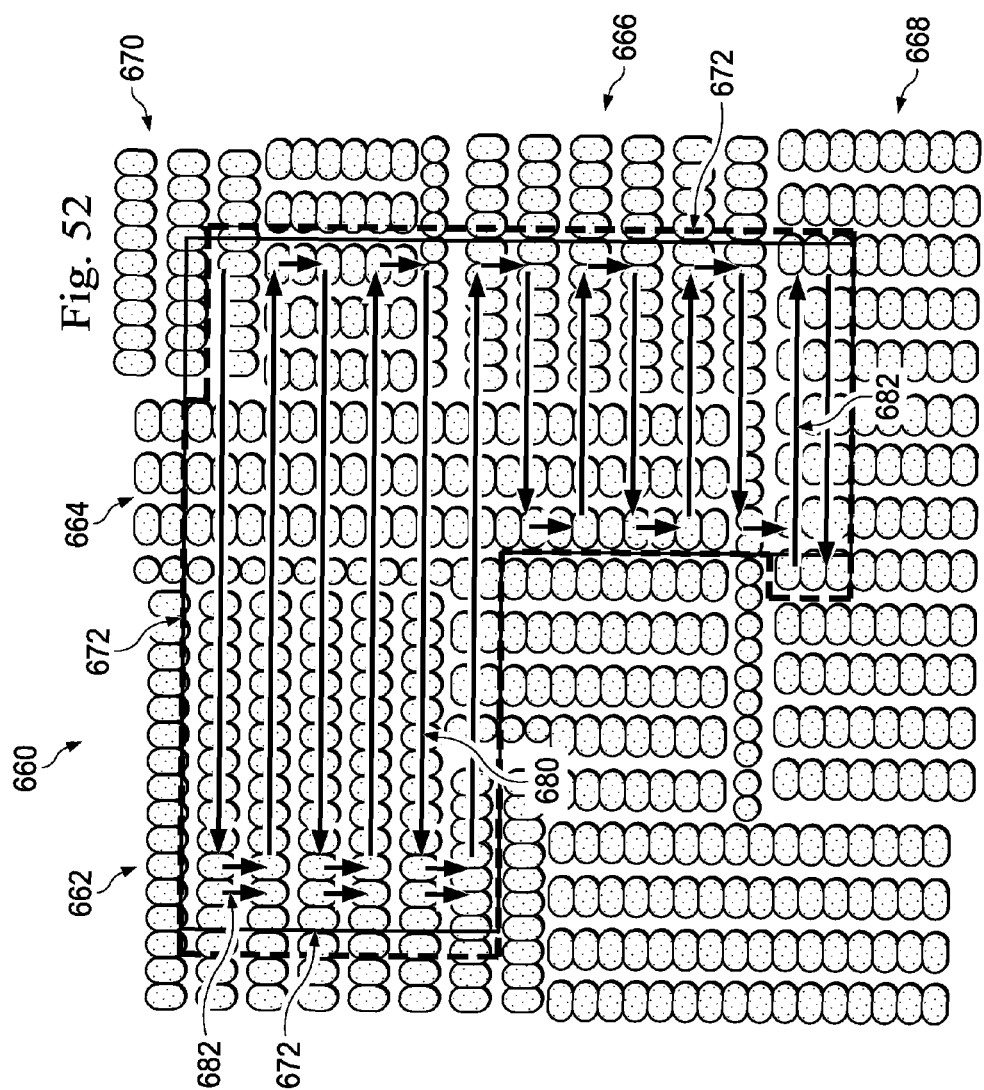

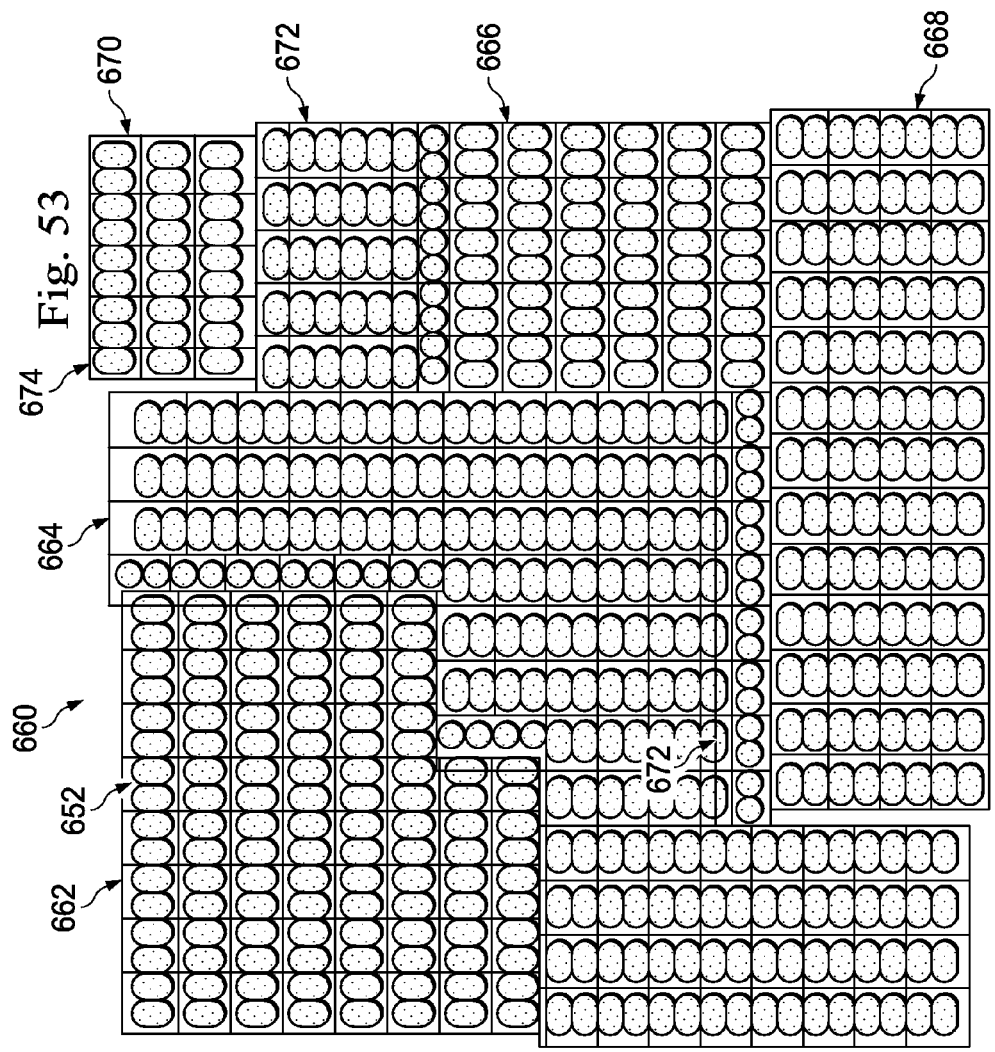

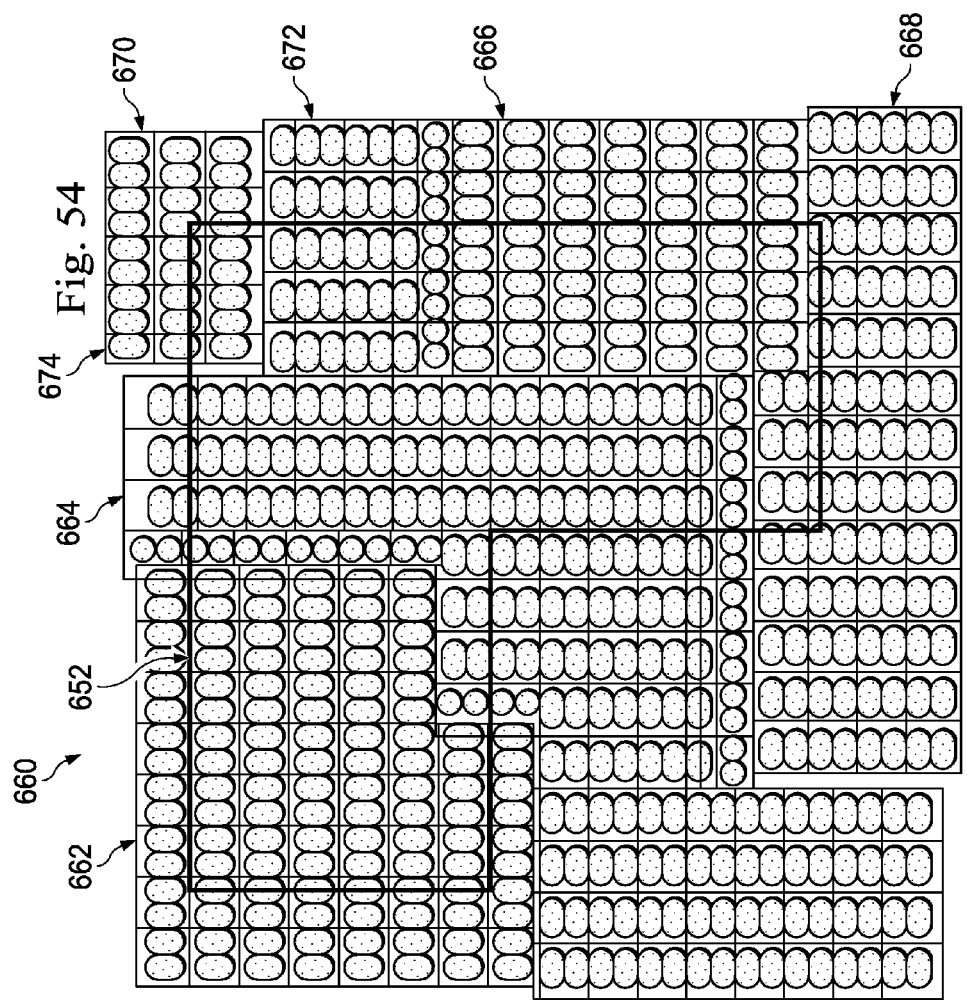

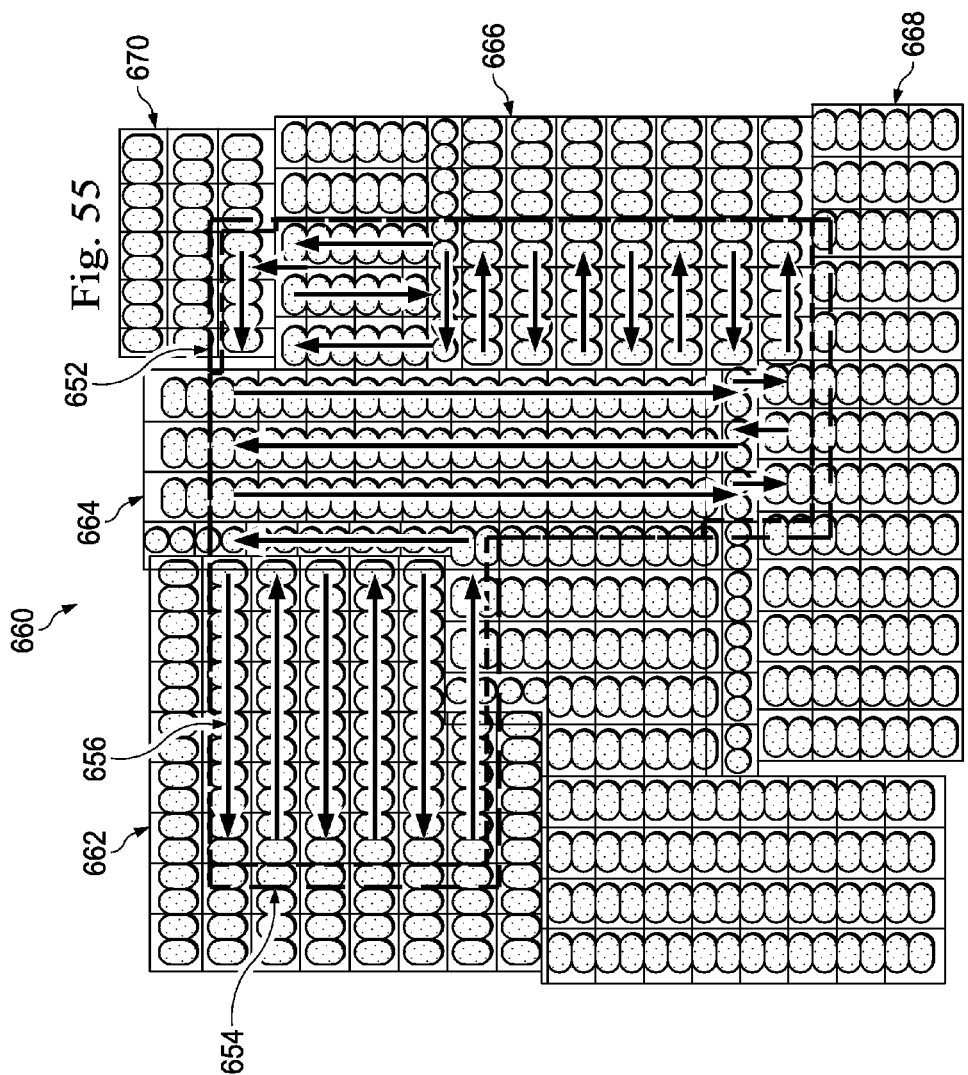

METHODS, DEVICES, AND SYSTEMS FOR FORMING ATOMICALLY PRECISE STRUCTURES

CROSS-REFERENCE TO RELATED APPLICATIONS

This application claims priority to and the benefit of U.S. Provisional Patent Application No. 61/788,103, filed Mar. 15, 2013, which is hereby incorporated by reference in its entirety.

STATEMENT OF GOVERNMENTAL INTEREST

This invention was made under Contract Number N66001-08-C-2040 between Zyvex Labs, LLC and Spawar Systems Center Pacific, operated for the Defense Advanced Research Projects Agency (DARPA). The Government has certain rights in this invention.

TECHNICAL FIELD

The present disclosure relates to methods, devices, and systems for forming atomically precise structures. In some embodiments, the methods, devices, and systems of the present disclosure utilize a scanning tunneling microscope (STM) to remove portions of a monolayer of atoms or molecules from a crystalline surface to form the atomically precise structures.

BACKGROUND

Scanning Tunneling Microscope (STM)

The ability to image surfaces at atomically precise levels stems from the capabilities of the STM. While there have been many different implementations since its invention in 1982, the fundamental operating principle of a STM is as follows. A conducting tip—often tungsten or platinum-iridium—that has been prepared so as to have a nanoscopic portion of the tip which allows electrons to tunnel to or from the nanoscopic portion of the tip to a sample. The tip is brought in close proximity (e.g., within a few nm) to a surface of a sample. Due to the principle of quantum electron tunneling, a current flows across the gap between tip and the sample when a bias voltage is applied between the tip and the sample. The bias voltage applied between the tip and the sample can be either polarity. If the sample is negatively biased with respect to the tip, then electrons flow from the filled electronic states on the surface into the tip. If the sample is positively biased, then electrons flow from the tip into the empty electronic states of the surface. The magnitude of the bias voltage determines the surface states that are available to tunnel into or out of. Thus, the STM provides information about the electronic states as well as the topography of the surface of the sample.

The resulting current between the tip and the sample based on the applied bias voltage varies exponentially relative to the distance between the tip and the surface of the sample. As a result of this strong dependence on the relative position of the tip to the sample, the height of the tip above the surface can be precisely controlled. Often, a piezoelectric element is used to control movement of the tip up and down (i.e., z-direction) until the measured tunnel current matches a set point value, which is in the range of 0.01-100 nA. Piezoelectric elements are also commonly used to move the tip sideways (i.e., x-y directions) across the surface of the sample. As a result, topographic images of the surface can be generated by performing a raster scan of part of the surface. Other than the feedback loop that controls the tip height, most of the tip motions are open loop and prone to creep and hysteresis.

In order to have the tip access larger areas of a sample and to allow the tip to approach a sample, many STM systems also include both fine motion control and coarse motion control for the X, Y and Z axes. For instance, coarse motion is in the range of tens of nanometers to tens of millimeters, with a precision finer than the maximum fine motion range. Most STM systems include some vibration isolation mechanisms to prevent external vibrations from disturbing the system operation.

Most STMs and virtually all commercially available STMs are designed to be laboratory tools for surface science imaging and measurements. There are many operational aspects of these instruments that make them poorly suited for computer controlled, reliable, atomically precise patterning with high productivity.

Hydrogen Depassivation Lithography

Hydrogen depassivation lithography, where a STM is used to remove hydrogen atoms from a silicon surface has been established since the mid-1990s. See, for example, Appl. Phys. Lett. 64 (15), 11 Apr. 1994, which is hereby incorporated by reference in its entirety. Further, Lyding and Hersam demonstrated that individual hydrogen atoms could be targeted and removed from a silicon substrate such as in Hersam, M. C. et al., "Silicon-based Molecular Nanotechnology," Nanotechnology 11 (2000) 70-76, which is hereby incorporated by reference in its entirety. Since then, a number of practitioners have demonstrated the ability to form patterns using hydrogen depassivation for various purposes. However, the limitations of current hydrogen depassivation lithography techniques have prevented the use of the hydrogen depassivation lithography as viable automated manufacturing technique for atomically precise structures.

Hydrogen depassivation lithography can be accomplished at different biases and set point currents. There are several different regimes that are distinct from one another in important aspects. Typically, during depassivation lithography the sample is positive with respect to the tip so that electrons flow from the tip to the sample. At biases below 7V, the hydrogen depassivation efficiency is a strong function of the bias and is also dependent on the current. The depassivation efficiencies are in general very poor. For example according to Shen (Science Vol 268 16 Jun. 1995 p. 1591) at 3V and 1 nA more than 10 billion electrons are required to depassivate a single hydrogen atom. The depassivation efficiency rises dramatically with bias until 7V where approximately half a million electrons are required to depassivate a single hydrogen atom and there is no longer a dependence on current. From 7-12V the depassivation efficiency is essentially constant and does not depend on current.

There is also significant difference in how the electron reaches the sample from the tip at the lower biases versus higher biases. At low positive sample biases the electrons tunnel from the tip to the sample and the physics favors most electrons finding the shortest path resulting in most electrons tunneling to the same nanoscopic area with very few electrons reaching the surface outside of this very small area. Because of this process, at biases of approximately 4 volts and below, atomic precision patterning is possible. Indeed, single hydrogen atoms may be targeted and removed at low biases. Also, it is possible to create patterns where all hydrogen atoms are removed (fully saturated depassivation) within the desired area and no atoms removed outside the pattern or at most the edge of the pattern will deviate by no more than the distance of one atom from the designed pattern. This is generally referred to as atomically precise patterning in the present disclosure. At higher biases, there is the opportunity for field emission (Fowler Nordheim tunneling) of electrons from the tip into the vacuum and then a short trip along field lines to the sample. This electron path along with the fact that the tip will generally be further from the sample at higher biases results in electrons reaching the sample over larger areas. The result is that atomic precision patterning is not possible.

While hydrogen depassivation has been reported with a negative sample bias, the efficiency of the process is even worse than that of a positive sample bias and the mechanism of depassivation in this context is not well understood. On the other hand, the extremely low depassivation efficiency at low negative sample biases permits effective imaging without imparting depassivation. It is also possible to image the sample with little or no depassivation at low positive sample biases with low set point currents.

Hydrogen depassivation lithography is the only lithographic process that has demonstrated atomic resolution patterning and it has the advantage of having the same tool that does the patterning, the STM, to also be capable of examining the patterning area before and after exposure. However, in the atomically precise mode of patterning the process is extremely inefficient.

Electron Beam Lithography

In some respects, depassivation lithography is effectively e-beam lithography operating on the limit of a thin resist. It can be instructive to compare this subset of e-beam lithography with conventional e-beam lithography. Conventional e-beam lithography is an important industrial and research tool that can make very fine patterns by focusing a beam of electrons down to a small Gaussian spot (or other shape) on a substrate. Electron beam columns use high voltage to generate very energetic beams, operate in high to ultra-high vacuums, and use magnetic and/or electrostatic lenses, blankers, and deflectors to shape, blank and scan the beam. The electron beam exposes a thin layer of resist material (usually a polymeric material) and changes its properties in a manner (usually chemical bond breaking or crosslinking) so that a portion of the resist (either the exposed or unexposed portion) can be removed by a subsequent development step. The pattern formed from the resist is transferred to the underlying substrate by a variety of processes that can be additive (patterned deposition) or subtractive (patterned etching). A combination of electron beam deflection and blanking (and often the movement of the substrate) allows a designed pattern to be exposed over the desired portion of the substrate. The main industrial use of e-beam lithography is to write masks used in the production of very large scale integrated circuits.

While hydrogen depassivation lithography is also a form of e-beam lithography in that it uses beam of electrons with a small spot size to serially expose a resist to create a desired pattern, there are a number of significant differences. The electron beam energy is typically 1,000-100,000V for conventional e-beam lithography and is 100V or less for hydrogen depassivation lithography. Principally because of this difference in electron energy, with conventional e-beam lithography, there is significant proximity exposure of the resist, while there is little if any proximity effect exposure with hydrogen depassivation lithography. Conventional e-beam lithography systems have complicated and expensive electron optics while hydrogen depassivation lithography has a tip and a substrate. Conventional e-beam lithography systems cannot image without exposing the resist, while this is possible with hydrogen depassivation lithography. In conventional e-beam lithography, higher electron energy leads to smaller optimized spots but lower efficiency for exposing resist. In hydrogen depassivation lithography a higher current at a fixed electron energy will bring the tip closer to the sample which can produce a smaller exposing spot. In hydrogen depassivation lithography, higher electron energy leads to larger spots and higher resist exposing efficiency. In conventional e-beam lithography, for optimized beams at a fixed electron energy a smaller spot will require a smaller beam current.

While it is conceivable to adapt some of the techniques used in conventional e-beam lithography systems to develop a robust reliable STM based e-beam lithography system, the significant differences outlined above will require novel approaches in that development.

Accordingly, there remains a need for improved methods, devices, and systems for forming atomically precise structures.

BRIEF DESCRIPTION OF THE DRAWINGS

Illustrative embodiments of the present disclosure will be described with reference to the accompanying drawings, of which:

Collectively.

FIG. 9 is a top view of a silicon lattice structure sample having two terraces as imaged by a STM according to an embodiment of the present disclosure.

FIG. 10 is a top view of the silicon lattice structure sample of FIG. 9 after filtering and a plane fit according to an embodiment of the present disclosure.

FIG. 11 is a perspective view of a three-dimensional model of a silicon lattice structure along with a diagrammatic, partial cross-sectional side schematic of the silicon lattice structure according to an embodiment of the present disclosure.

FIG. 12 is a top view of the silicon lattice structure sample of FIGS. 9-11 after a correlation match according to an embodiment of the present disclosure.

FIG. 13 is a diagrammatic top view of the silicon lattice structure sample of FIGS. 9-12 after applying a thresholding algorithm according to an embodiment of the present disclosure.

FIG. 14 is a diagrammatic top view of the silicon lattice structure sample of FIGS. 9-13 after applying a shrink-grow-shrink algorithm according to an embodiment of the present disclosure.

FIG. 15 is a top view of the silicon lattice structure sample of FIGS. 9-14 with an inset image based on the correlation match according to an embodiment of the present disclosure.

FIG. 16 is a top view of the silicon lattice structure sample of FIGS. 9-15 with vertical grid lines of a detected lattice structure overlaid according to an embodiment of the present disclosure.

FIG. 17 is a top view of the silicon lattice structure sample of FIGS. 9-16 with horizontal grid lines of a detected lattice structure overlaid according to an embodiment of the present disclosure.

FIG. 18 is a top view of the silicon lattice structure sample of FIGS. 9-17 with both vertical and horizontal grid lines of the detected lattice structure overlaid according to an embodiment of the present disclosure.

FIG. 19 is a diagrammatic top view of a portion of a lower terrace of the silicon lattice structure sample of FIGS. 9-18 according to an embodiment of the present disclosure.

FIG. 20 is a diagrammatic top view of a portion of an upper terrace of the silicon lattice structure sample of FIGS. 9-18 according to an embodiment of the present disclosure.

FIG. 21 is a top view of a virtual image of the silicon lattice structure of FIGS. 9-20 according to an embodiment of the present disclosure.

FIG. 23 is a diagrammatic, partial cross-sectional side view of a tip of a STM system interfacing with a sample and removing atoms from the surface in a low bias lithography mode according to an embodiment of the present disclosure.

FIG. 24 is a diagrammatic, partial cross-sectional side view of a tip of a STM system interfacing with a sample and removing atoms from the surface in a high bias lithography mode according to another embodiment of the present disclosure.

Collectively.

FIG. 29 is a diagrammatic top view of a plurality of scan fields, each containing a plurality of write fields, according to an embodiment of the present disclosure.

FIG. 30 is a diagrammatic top view of a scan field of FIG. 29 with a portion of a desired pattern geometry overlaid according to an embodiment of the present disclosure.

FIG. 31 is a diagrammatic top view of the scan field of FIG. 30 with the desired pattern geometry divided into a plurality of write elements across the plurality of write fields according to an embodiment of the present disclosure.

FIG. 32 is a diagrammatic top view of a write field of FIG. 31 showing a plurality of write elements within the write field according to an embodiment of the present disclosure.

FIG. 33 is a diagrammatic schematic top view of a silicon lattice structure sample illustrating a write pattern extending along dimer rows of the silicon lattice structure sample according to an embodiment of the present disclosure.

FIG. 34 is a diagrammatic schematic top view of a silicon lattice structure sample illustrating a write pattern extending across dimer rows of the silicon lattice structure sample according to an embodiment of the present disclosure.

FIG. 35 is a diagrammatic schematic top view of a silicon lattice structure sample illustrating a write pattern following an outline of a desired pattern geometry according to an embodiment of the present disclosure.

Collectively.

FIG. 38 is a diagrammatic top view of a pair of scan fields according to an embodiment of the present disclosure.

FIG. 39 is a diagrammatic top view of a portion of a write field according to an embodiment of the present disclosure.

Collectively.

FIG. 40 is a diagrammatic top view of a write field having a desired pattern outlined according to an embodiment of the present disclosure.

FIG. 41 is a diagrammatic top view of the write field of FIG. 40 having high bias write elements associated with a first high bias mode defined according to an embodiment of the present disclosure.

FIG. 42 is a diagrammatic top view of the write field of FIGS. 40 and 41 showing an extension of the high bias write elements associated with the first high bias mode of FIG. 41 according to an embodiment of the present disclosure.

FIG. 43 is a diagrammatic top view of the write field of FIGS. 40-42 having high bias write elements associated with a second high bias mode defined according to an embodiment of the present disclosure.

FIG. 44 is a diagrammatic top view of the write field of FIGS. 40-43 having additional high bias write elements associated with the first high bias mode defined according to an embodiment of the present disclosure.

FIG. 45 is a diagrammatic top view of the write field of FIGS. 40-44 having low bias write elements associated with a low bias mode defined according to an embodiment of the present disclosure.

FIG. 46 is a diagrammatic top view of the write field of FIGS. 40-45 having tip vectors associated with the first and second high bias modes defined according to an embodiment of the present disclosure.

Collectively, FIGS. 48-52 show aspects of writing a desired pattern geometry by depassivating atoms or molecules from a lattice structure having multiple terraces that takes into account the effects of the multiple terraces according to an embodiment of the present disclosure.

FIG. 48 is a diagrammatic schematic top view of a silicon lattice structure sample having a single terrace according to an embodiment of the present disclosure.

FIG. 49 is a diagrammatic schematic top view of the silicon lattice structure sample having a single terrace of FIG. 48 with a pattern outline defined according to an embodiment of the present disclosure.

FIG. 50 is a diagrammatic schematic top view of a silicon lattice structure sample having multiple terraces according to an embodiment of the present disclosure.

FIG. 51 is a diagrammatic schematic top view of the silicon lattice structure sample having multiple terraces of FIG. 50 shown with the pattern outline of FIG. 49 and an adjusted pattern outline to account for the multiple terraces according to an embodiment of the present disclosure.

FIG. 52 is a diagrammatic schematic top view of the silicon lattice structure sample of FIGS. 50 and 51 illustrating an exemplary write pattern within the adjusted pattern outline of FIG. 51 according to an embodiment of the present disclosure.

Collectively, FIGS. 53-55 show aspects of writing a desired pattern geometry by depassivating atoms or molecules from a lattice structure having multiple terraces that takes into account the effects of the multiple terraces according to another embodiment of the present disclosure.

FIG. 53 is a diagrammatic schematic top view of a silicon lattice structure sample having multiple terraces having a pixel grid overlaid according to an embodiment of the present disclosure.

FIG. 54 is a diagrammatic schematic top view of the silicon lattice structure sample having multiple terraces of FIG. 53 with a desired pattern overlaid according to an embodiment of the present disclosure.

FIG. 55 is a diagrammatic schematic top view of the silicon lattice structure sample having multiple terraces of FIGS. 53 and 54 with a series of tip vectors defined to achieve the desired pattern overlay of FIG. 54 according to an embodiment of the present disclosure.

DETAILED DESCRIPTION

Figure 1:
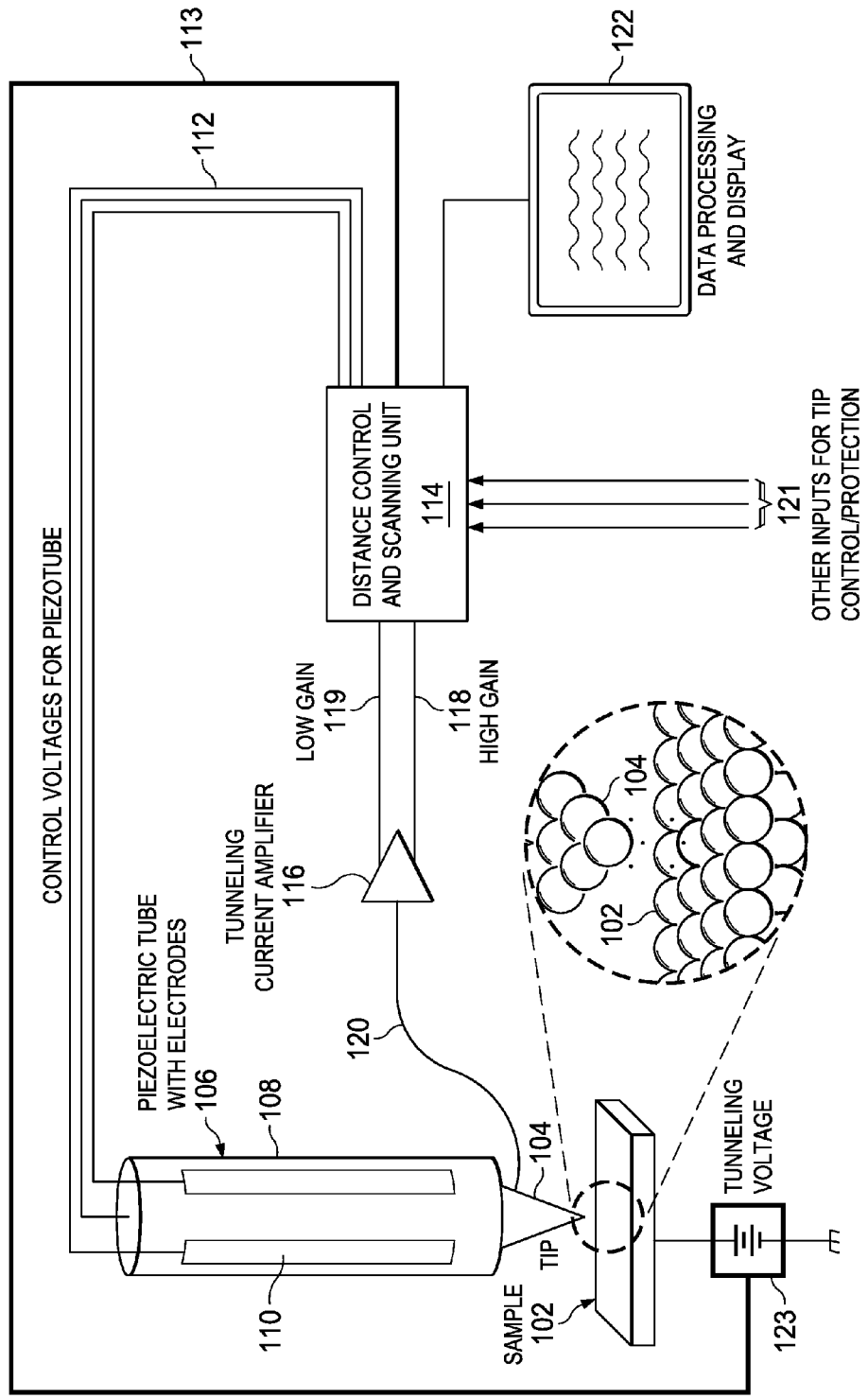
FIG. 1 is a diagrammatic schematic view of a STM system according to an embodiment of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described methods, devices, and systems, and any further application of the principles of the present disclosure are fully contemplated and included within the present disclosure as would normally occur to one skilled in the art to which the disclosure relates. In particular, it is fully contemplated that the steps, features, and/or components described with respect to one embodiment may be combined with the steps, features, and/or components described with respect to other embodiments of the present disclosure. For the sake of brevity, however, the numerous iterations of these combinations will not be described separately.

Improved Scanning Tunneling Microscope System

Referring initially to FIG. 1, shown therein is a STM system 100 according to an embodiment of the present disclosure. As shown, a sample 102 is positioned in close proximity to a tip 104 of the STM system 100. The tip 104 is a conducting tip (e.g., formed of tungsten, platinum-iridium, or other suitable conductive material) that has been prepared so as to have a nanoscopic portion of the tip which allows electrons to tunnel to or from the nanoscopic portion of the tip to a sample. With the tip 104 positioned close to an upper surface of the sample 102, current flows across the gap between the tip 104 and the sample 102 when a bias voltage is applied between the tip 104 and the sample 102 due to the principle of electron tunneling. The bias voltage applied between the tip 104 and the sample 102 can be either polarity. If the sample 102 is negatively biased with respect to the tip 104, then electrons flow from the filled electronic states on the surface into the tip 104. If the sample 102 is positively biased, then electrons flow from the tip 104 into the empty electronic states of the surface. The magnitude of the bias voltage determines the surface states that are available to tunnel into or out of.

During electron tunneling, the resulting current between the tip 104 and the sample 102 based on the applied bias voltage varies exponentially relative to the distance between the tip 104 and the surface of the sample 102. As a result of this strong dependence on the relative position of the tip 104 to the sample 102, the height of the tip 104 above the surface can be precisely controlled. In the illustrated embodiment, a controller 106 precisely controls the movement of the tip 104 relative to the sample 102. The controller 106 includes a piezoelectric element 108 coupled to a plurality of electrodes 110. While the piezoelectric element 108 is depicted as a single element, it is understood that the piezoelectric element 108 includes a plurality of piezoelectric elements in some instances. To this end, in some implementations one or more piezoelectric elements are configured to control movement of the tip 104 in a particular direction or directions (e.g., x-direction, y-direction, and/or z-direction). By controlling the application of voltage to the piezoelectric element 108 via the electrodes 110, the controller 106 is able to control movement of the tip 104 relative to the sample 102 and the sample bias unit 123 (tunneling voltage). To this end, a plurality of electrical leads 112 couple the electrodes 110 to a control unit 114. Also electrical lead 113 couples the control unit 114 to the sample bias unit 123 to allow the control of the sample bias. In some instances, the control unit 114 determines the appropriate voltage to be applied to each electrode 110 to impart the desired movement to the tip 104.

In some embodiments, the scanning tunnelling microscope system 100 includes both fine motion control (e.g., on the order of an Angstrom to a micron) and coarse motion control (e.g., which can be as large as required for the job at hand. For instance there are high resolution stages from Attocube, PI, and other vendors that allow more than a cm of motion and larger range of motion is, in principle, possible. In some instances, course motion is in the range of tens of nanometers to tens of millimeters, with a precision finer than the maximum fine motion range). In that regard, the STM system 100 may include one or more additional controllers or actuators to facilitate coarse movement of the tip 104 in the x, y, and/or z-directions. Further, in some implementations the scanning tunnelling microscope system 100 includes one or more controllers or actuators for moving the sample 102 in the x, y, and/or z-directions relative to the tip 104. While any permutation of motion control may be used, in some instances the scanning tunnelling microscope system 100 utilizes one of the following arrangements: (1) the sample 102 is stationary and the tip 104 does all of the coarse and fine movements relative to the sample 102; (2) the tip 104 is stationary and the sample 102 does all the coarse and fine movements relative to the tip 104; or (3) the tip 104 does all of the fine movements and the sample 102 does all of the coarse movements. Further, it is understood that the particular combination of coarse and fine motion control may be applied globally (i.e., to all directions of movement) or to a specific direction or directions (e.g., x-, y-, and/or z-directions). Accordingly, it is understood that the scanning tunnelling microscope system 100 may utilize any one or a combination of these motion control options in implementing the motion control features discussed herein below.

In some instances, the scanning tunnelling microscope system 100 includes one or more encoders to track movement of the tip 104. For example, in some implementations encoders with an accuracy of one micrometer or better, and preferably less than 100 nm, are utilized to track coarse motion in the x- and y-directions. An encoder is utilized to track the z-direction motion, in some instances, to reduce the amount of time required to position the tip 104 in close proximity to the sample 102. In some instances, the closed loop position control described herein with respect to the fine motion control is not utilized and/or turned off when coarse movements are being made. Fine motion encoders are also utilized in some instances. To this end, x-, y-, and/or z-direction fine motion encoders with an accuracy 1 nm or less, and preferably less than 100 pm, are utilized in some instances. The information from the fine motion encoder(s) can be utilized instead of or in addition to the current feedback loop (utilized for assessment of z-direction control) and/or the lattice structure fiducial grid (utilized for assessment of x-y direction control) as described below. As described below, in some instances the automated patterning processes of the present disclosure utilize an active feedback loop and/or well-calibrated model corrections to ensure that the tip position in the x-y direction is accurate to approximately 0.1 nm.

The control unit 114 is configured to receive signals from a tunneling current amplifier 116 over communication lines 118 and 119. In the illustrated embodiment, the amplifier 116 is represented as a two-stage amplifier having a high gain output along communication line 118 and a low gain output along communication line 119. The amplifier 116 is electrically coupled to the tip 104 by line 120. In some instances, the control unit 114 utilizes the measured tunnel current from the tip 104 and/or other input(s) 121 to control the voltages applied to the electrodes 110. Additional aspects of the manner in which the control unit 114 controls the application of voltages to the electrodes 110 and corresponding movement of the tip 104 relative to the sample will be discussed in greater detail below. The control unit 114 is in communication with a data processing and display system 122 that is configured to process the data received from tip 104 and generate a corresponding image of the sample 102.

Because the tip 104 is positioned above the surface of the sample in a precisely controlled manner, at least the portion of the system 100 associated with tip 104 must be isolated from any external vibration in order to prevent vibrations from harming the imaging resolution and to prevent any perturbations that might cause the tip 104 to collide with the surface. Vibration isolation is required to facilitate maintaining approximately +/−0.1 nm positioning control. Fortunately, vibration isolation technology is available that will suffice for this purpose. For example, some implementations of the present disclosure suspend the system by springs and dissipate vibrations using eddy current damping. However, any suitable vibration isolation techniques may be utilized.

Multi-Tier Architecture

In some instances, the STM computer control is split into 2 tiers. The lower level tier is a Digital Signal Processor (DSP) or other high speed computational device working in real-time. The DSP takes care of all the time sensitive operations. A generic Central Processing Unit (CPU) with a real-time operating system is utilized in place of the two tiered system in some implementations. Some operations, like tip control loop, are performed in real time because of a desire to get fast response times. For other operations, like tip movement and data collections, the timing accuracy is the important factor. The upper tier is a desktop PC, taking care of less time critical tasks such as image manipulation and user interface interactions. The upper tier has several modules that can be executed on different machines, creating a multi-tier set-up. For example, it is useful to put the module that communicates with the DSP on dedicated hardware that communicates faster with the DSP, reducing the jitter due to communication latencies.

The DSP code is designed to get very basic instructions from the higher tier, yet do sophisticated operations such as drift and creep corrections. This design provides the necessary control over the STM, while keeping the DSP code simple enough to keep up with the stringent time requirements for atomically precise operations. In the upper tier, complex operations such as scanning, sample recognition and lithography operation are highly abstracted. This allows scripts that fully automate the operation of the STM to be written. With such scripts, the STM can operate unattended for hours or days, creating complicated patterns over multiple scan fields and even three-dimensional structures that require multiple lithography and dosing operations.

Creep

Figure 2:
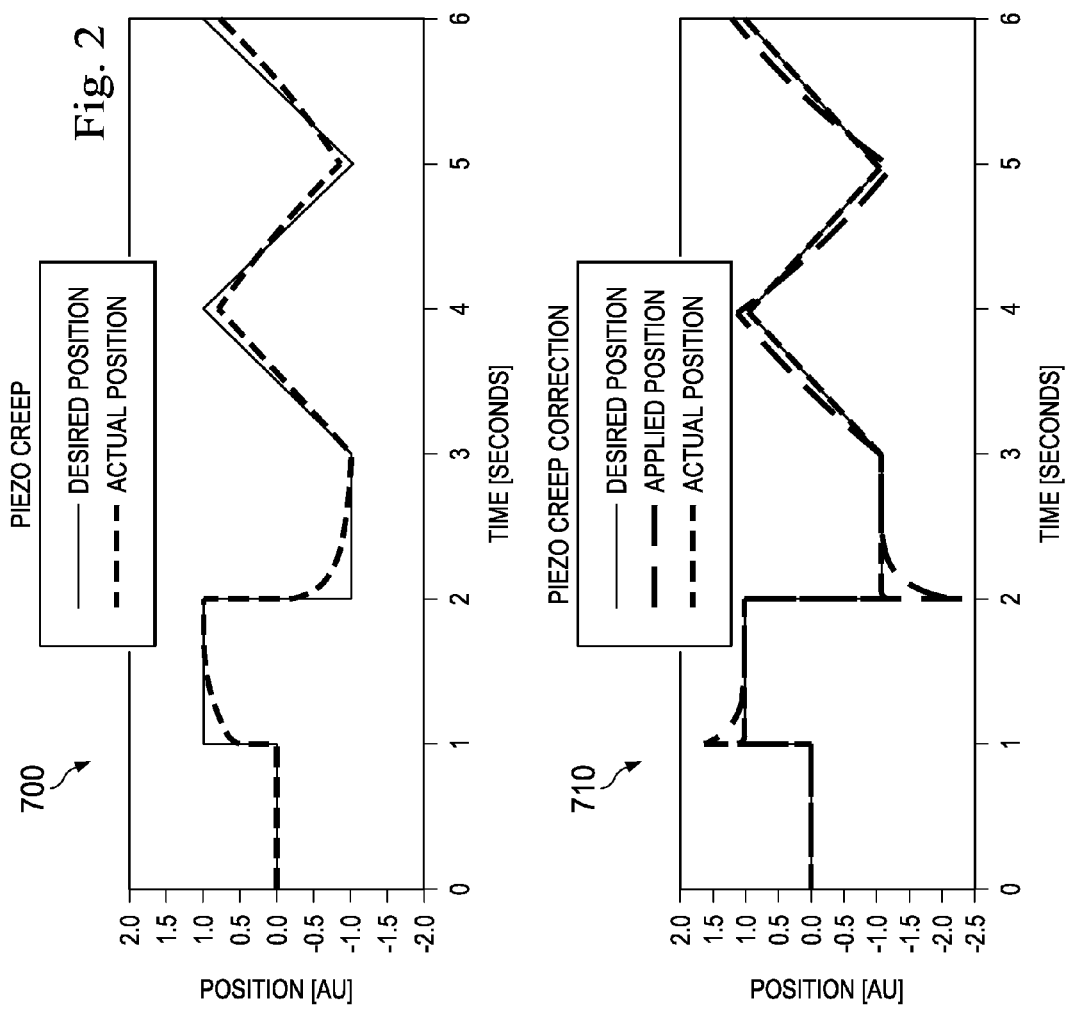
FIG. 2 includes a graph illustrating the adverse position effects as a result of creep within a STM system and a graph illustrating the position-correcting effects of implementing a creep-correction algorithm according to an embodiment of the present disclosure.

Referring now to FIG. 2, shown therein is a graph 700 illustrating the adverse position effects as a result of creep within an STM system and a graph 710 illustrating the position-correcting effects of implementing a creep-correction algorithm according to the present disclosure. In this regard, as shown in graph 700, if the tip of the STM system is driven in accordance with a desired position profile, the actual position of the tip has a tendency to lag the desired position as a result of creep and hysteresis of the STM system. This is because the piezoelectric actuators controlling the tip position do not respond immediately to voltage changes, instead the piezoelectric actuators respond to voltage changes with a temporal decay to the error. One way to overcome this creep effect is to slow down the process to allow the tip position to overcome the temporal decay effect. However, this has a negative effect on the efficiency of the system that also increases drift issues. Accordingly, slowing down the process is not a viable solution for implementing a robust, automated patterning process with a STM system.

Standard commercial STM systems do not include creep correction because the resulting image distortions are tolerable for most scientific imaging purposes, the imaging process can be slowed to minimize the effects of creep, and/or the image can be post-processed to correct the image distortions. Again, in the context of the present disclosure where the STM system is utilized to form atomically precise patterns through depassivation such solutions are not viable. For example, the position effects resulting from creep and hysteresis of the STM system can introduce unwanted errors into the pattern. As the atoms or molecules are depassivated based on the position of the tip, these creep effects can destroy the intended atomic precision of the pattern and cannot be corrected by image processing as the depassivation is a physical change in the sample. Further, since information from the scanned image of the sample is utilized in some instances to determine where to position the tip and perform the depassivation process, it is very difficult to map the actual position of elements in the image to the real surface without taking into account creep effects since the amount of creep is dependent upon the history of tip movements. Therefore, implementations of the STM system according to the present disclosure include a creep correction function.

In some instances, the creep behavior of the tip is modeled. The model of the creep behavior is then utilized in real-time to correct the creep effects by overshooting the applied tip movements, such that the actual tip movement follows the desired path. For example, graph 710 shows an applied tip position that overcomes the creep effects of the system such that the tip tracks along the desired tip position path. More specifically, as shown the applied tip position significantly overshoots the desired tip position at the transitions between tip positions to account for the creep effects. In some instances, the same software that controls the tip position also applies the creep correction. As a result, the software controlling the tip position has the entire tip motion history available to take into consideration when correcting the creep effects.

In some instances, creep is modeled as a sum of exponential decays as follows:

$$P_{actual} = \Sigma R_i \text{Exp}(-t/T_i) + R_{Instantly}$$

where $P_{actual}$ is the actual position of the tip, $R_i$ is the ratios of each exponent, and $T_i$ is the decay time constant of the corresponding exponent. In some implementations, $R_{instantly} = 1 - \Sigma R_i$ is utilized to represent the ratio of the tip movement that responds instantly to voltage changes. It is understood that this approach is not necessarily an intrinsic description of the creep effects and that more complicated models can more accurately model the creep effect. However, the described model provides a good approximation and allows for fast real-time implementation of creep correction, which is particularly useful for the depassivation lithography procedures of the present disclosure.

Accordingly, the real-time correction is determined as follows in some instances:

$$\Delta P_{calc} = (P_{applied} - P_{calc}) \Delta t / T_i$$

$$\Delta P_{applied} = R_i (P_{applied} - P_{calc}) / R_{instantly}$$

where $P_{calc}$ is the calculated position of the tip based on the creep model and $P_{applied}$ is the applied position, which is the applied position that will correct for the creep effects. As a result, these positions are updated as follows:

$$P_{calc} = P_{calc} + \Delta p_{Calc}$$

$$P_{applied} = P_{applied} + \Delta p_{applied}$$

The precision of the creep correction is mostly dependent on the accuracy of the creep parameters $R_i$ and $T_i$. Accordingly, in some instances the creep correction algorithm fits both the time constants and the ratios. However, in other instances the creep correction algorithm selects arbitrary time constants and fits only the ratios. This approach has an advantage in situations where there are no intrinsic time constants to the creep. In such situations, the technique that fits both time constants and ratios would not necessarily converge, while the technique that only fits ratios can choose the range and separation of the time constants in a manner that maximizes the precision for a given computation load. For example, applying exponential spacing (e.g., T1=25 s, T2=5 s, T3=1 s, T4=200 ms, T5=40 ms) provides good results in some implementations. Other implementations such as a linear progression of time constants (e.g., T1=1s T2=2s, T3=3s) may be applied with varying success depending upon the mechanical system in use.

Since the tip (or sample) physically scans, another way of performing creep and hysteresis correction is closed loop positioning. For effective use in the context of atomically precise depassivation lithography with a STM system, the resolution of the closed loop positioning system needs to be less than the tip positioning tolerance that maintains atomic precision. In the case of H depassivation of Si (100) 2×1 surfaces where a pixel is defined by 2 dimers along a dimer row, that tolerance is ~0.15 nm. There are a number of displacement sensors that can provide the required sensitivity at this resolution. For example, displacement sensors with 0.15 nm or better resolution include interferometers (e.g., SIOS Meβtechnik GmbH sells a Nanopositioning and Nanomeasuring Machine Model NMM-1 with specified 100 pm resolution), capacitive sensors (e.g., Physik Instrumente (PI) GmbH & Co. KG. sells a capacitive sensor Model D-015 that specifies resolution down to 10 pm), Fabry-Perot cavities (See, e.g., T. R. Schibli, et al., "Displacement Metrology with Sub-pm Resolution in Air Based on a fs-Comb Wavelength Synthesizer," Optics Express, Vol. 14, Issue 13, pp. 5984-5993 (2006), which is hereby incorporated by reference in its entirety), and other displacement sensors such as piezoelectric sensors. Because the scan range of a STM system is typically <10 um, in some implementations a closed loop X-Y positioning for small range of motion (e.g., 10×10 um) with 0.1 nm resolution is utilized. However, as discussed above, closed loop positioning is not necessarily required as creep and hysteresis may be effectively corrected by modeling creep as a multiple exponential time response. In some implementations, a combination of displacement sensors and creep modeling is utilized to correct the creep and hysteresis effects.

Drift

Similar to creep, there is always some relative drift movement between the sample and the tip of the STM system that creates a positioning error. Drift can be due to thermal expansion, slow relaxation time of physical tensions in the piezoelectric actuators, and/or other parts of the system. While the scanner hardware of the STM system is designed to minimize this drift, to facilitate formation of atomically precise structure using the depassivation lithography techniques of the present disclosure some embodiments correct for the drift effects in the software of the system. Like creep correction, drift correction is not usually included in standard STM systems.

In some implementations, drift correction is maintained by subsequent scanning of the same area of the sample. In this regard, the two scans are correlated to find their relative displacement. Sample impurities, fiducial markers, step edges, and/or other identifiable feature(s) of the sample are utilized to determine the relative displacement between the scans. Generally, any scanning of the sample, including both imaging mode and depassivation mode, can be used as feedback information to facilitate drift correction. In some instances, the displacement information between scans is used in two manners. First, the position of the tip of the STM system is adjusted to compensate for the displacement. This adjustment maintains the absolute reference to the surface lattice of the sample and helps to ensure that even a long sequence of scans will stay in the same position on the sample. Second, the velocity of the drift is calculated from the relative displacement. Then a matching velocity is applied to the tip motion. This counteraction of the drift velocity reduces the amount of drift between scans by assuming that the drift velocity is consistent.

In some implementations, drift correction is implemented as described in J. N. Randall, et al. "Atomic precision lithography on Si", J. Vac. Sci. Technol. B 27 (6) p.2764 November/December 2009, which is hereby incorporated by reference in its entirety.

Tip Protection

An unfortunately common occurrence in the operation of STM systems is an encounter between the tip and the sample that changes the structure of the tip. This change to the structure of the tip often results in changes to the way the tip images. These changes in tip structure can be corrected in some instances by further modifying the tip shape (e.g., by intentionally imparting additional tip-to-sample encounters) until the tip returns to a useful condition for imaging. However, these changes to the structure of the tip pose a much larger problem for the depassivation lithography processes of the present disclosure that are more sensitive to tip changes than imaging processes and that rely upon a repeatable depassivation process. Further, any time spent repairing, or attempting to repair, the tip is unproductive time that is to be avoided in an automated patterning procedure.

The cause of these encounters between the tip and the sample is typically a perturbation to the closed loop system that adjusts the tip height to maintain a set point current. In standard commercial STM systems, this control system is generally a proportional-integral-derivative ("PID") controller with the differential coefficient set to zero coupled to the mechanical STM described above. When the set point current is properly maintained, the tip is nominally maintained at about 1 nm above the sample surface. The majority of the time the control loop makes the appropriate adjustments to tip height as the tip is scanned across the sample surface such that the topography of the sample surface is recorded and the tip is not modified. However, when occasionally faced with a significantly large perturbation, the control loop in an attempt to regain the set point current will drive the tip too close to the surface or the tip will react too slowly to a perturbation and the tip will have a close encounter with (where fields and currents both increase) or crash into the sample. Due to the small size of the tip, these encounters with the sample surface often result in modifications to the shape of the tip. For example, the modifications can be anything from a very subtle rearrangement of atoms near the end of the tip to spectacular crashes that dramatically alter the tip (e.g., creating loops or turns in the tip structure). The perturbations that cause the tip to contact the sample can come from various sources, including without limitation external vibrations, spikes in electrical noise, a scan speed combined with a relatively large topographical feature that the control system does not have the bandwidth to respond to, changes in the tip bias, changes in set point current, and/or combinations of these factors.

In the context of hydrogen depassivation lithography on a Si(100) surface, proper sample preparation minimizes the number of significant surface topographical features. However, the depassivation lithography process itself significantly modifies the bias and current set point as the STM system switches between an imaging mode and the various lithography modes. These changes to the bias and current set point can cause significant perturbations to the tip height control loop. Several approaches are potentially available to minimize this perturbation. Simply turning off the feedback loop, changing the settings, and then turning the feedback loop back on is one approach. However, using such an approach can still present a perturbation to the control system when the feedback loop is turned back on and the tip is not in the correct position for the new settings. Changing the bias and/or current set point slowly would seem to be another way to avoid a major perturbation but such an approach takes additional time and can lead to a tip crash if changing slowly through a zero bias with a non-zero current. One technique for making this transition through a zero bias is to utilize a step function through zero, which may or may not lead to a significant perturbation.

In another implementation, the set point current values are ramped along a linear path from the old set point to the new set point followed (or preceded) by a linear ramp from the old bias value to the new bias value. The expectation in such implementations is that the feedback loop will be able to keep up with the linear changes. A similar approach is to map out the tip height as a function of the bias and current parameter space. From this information, a path (e.g., either linear or non-linear) from the old bias and set point to the new bias and set point can be mapped through the parameter space in a manner that results in a controlled and expected change in tip height from the old conditions to the new conditions.

Another problem for the tip control feedback loop arises when some perturbation excites a resonance in the STM system. Such resonances can lead to non-linear behaviors that result in poor control of the tip position and, therefore, possible crashes into the sample. Accordingly, in some instances a higher-ordered control system that takes into consideration the resonances in the scanning system is utilized. Similarly, in some instances a scanner that has well behaved resonances (e.g., stable in frequency) is utilized such that the control system can take such behavior into consideration in controlling the tip position. In some instances, the tip control system is further improved by implementing creep correction, as discussed above, in the direction of the z-axis.

Further, in some embodiments the control algorithm is implemented such that the highest priority of the control algorithm is to avoid interactions between the tip and the sample so that other control parameters (e.g., maintaining a constant tip-sample current) are secondary to protecting the tip. A control loop is always responding to errors. Moving the tip in response to larger errors (e.g., pulling the tip away in order to protect the tip) degrades the imaging quality of the STM. However, in some implementations the current signal and the topographical signal are captured. Since the current to distance relationship is known, the current signal can be used to mitigate the topographical errors due to the protective control system.

Another strategy is to use multiple inputs as part of the tip protection system. The tunneling current is the only input to standard STM control systems trying to maintain a static set-point current. For a standard system with a single tunneling current preamp, there is a tradeoff between gain and bandwidth. Often the desirable gain for imaging operations leads to a relatively low bandwidth diminishing the opportunity to respond fast enough to prevent crashes. Separate preamps, which can be difficult to implement in some instances because it requires dividing the small tunneling current, are utilized in some instances. Further, in some embodiments a preamp with dual outputs such as shown in FIG. 1 (e.g., one high bandwidth, lower gain output 119 and one standard high gain, lower bandwidth output 118 for imaging) is utilized. The higher bandwidth signal is used as the input to the tip protection function and the higher gain input is used to maintain the set point current. Shown in FIG. 1, other inputs 121 that can be used for the tip protect function are the sample bias voltage, the piezo bias voltages, and/or an accelerometer. Such inputs are principally looking for anomalous behavior (e.g., unintended voltage spikes or mechanical perturbations) that could be reacted to before they create a tip crash. Further, in some instances a second output of the tip control system controls a separate fast acting actuator that is used to quickly increase the tip to sample distance to avoid a crash.

By utilizing one or more of the tip control techniques described above, the distance between the tip and the surface is stabilized, preventing unwanted damage to the tip. In some implementations, the tip position is monitored with a feedback loop in order to control the relative position of the tip to within a few pm. This precise control of the tip position that prevents damage to the tip can also facilitate improved depassivation processes (e.g., allowing removal of adjacent hydrogen atoms from a silicon surface in a single pass with a relatively low bias voltage by positioning the tip equally between the hydrogen atoms).

Figure 3:
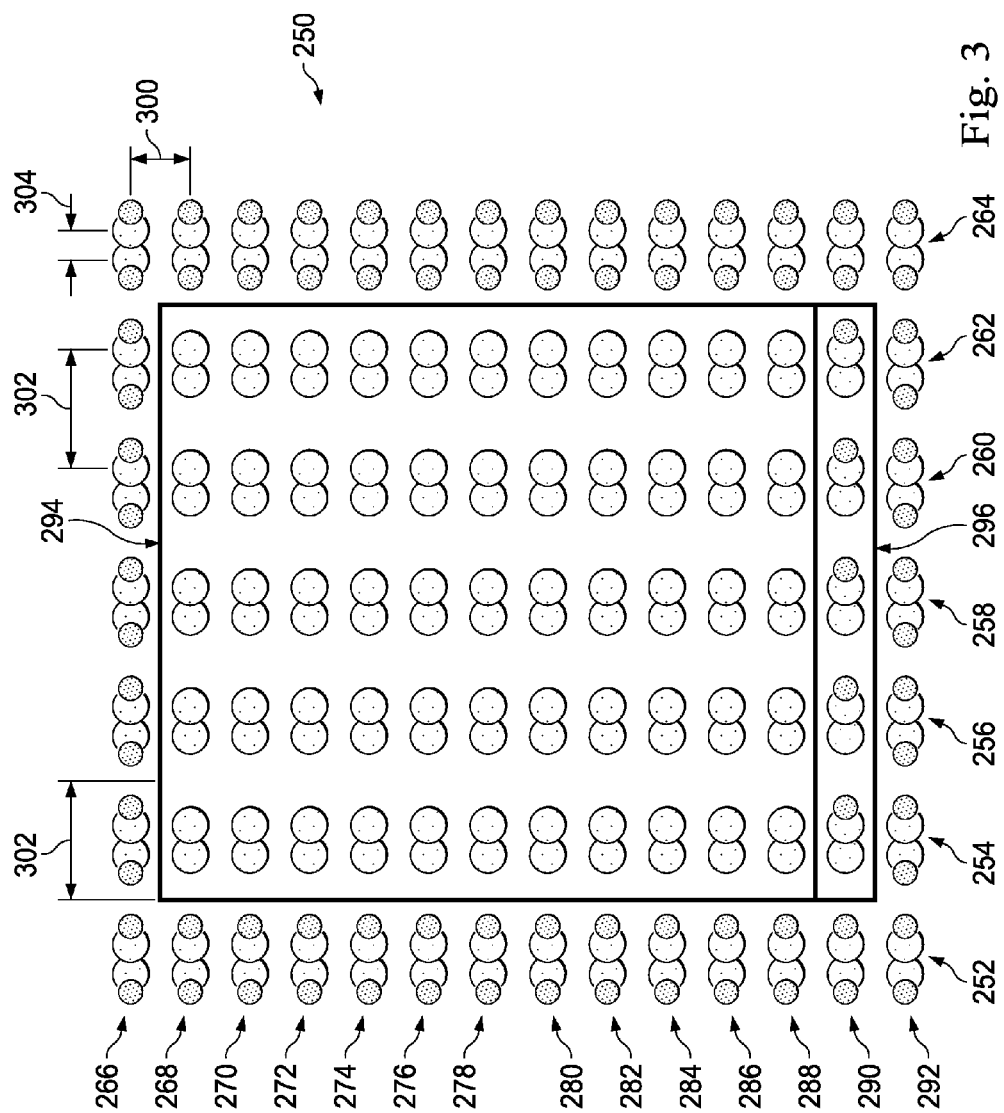
FIG. 3 is a diagrammatic schematic top view of a silicon lattice structure sample according to an embodiment of the present disclosure.

Recognition of Surface Features
Recognition of Lattice Structure, Terraces, and Steps Referring now to FIG. 3, shown therein is a diagrammatic schematic top view of a silicon lattice structure sample 250 according to an embodiment of the present disclosure. In FIG. 3 the surface Si atoms are shown as the larger lighter circles paired together into dimers and the H atoms are smaller darker circles that sometimes are and sometimes are not attached to the Si atoms. In the illustrated embodiment, the sample 250 is a Si (100) surface partially passivated with hydrogen atoms. In some implementations, a silicon wafer is obtained from a vendor, such as University Semiconductor, and prepared using known surface preparation techniques (See, e.g., Miki, K., et al., "Surface preparation of Si substrates for epitaxial growth" Surface Science 406 312-327 (1998), which is hereby incorporated by reference in its entirety). Such surface preparation techniques, when performed on a Si(100) wafer, produce a 2×1 reconstructed hydrogen terminated surface, as shown. An ideal cleaved Si(001) surface would have two dangling bonds per surface atom. To minimize surface energy, the silicon reconstructs by distorting the surface atoms to form pairs called dimers, each with one dangling bond. Each dimer row 252, 254, 256, 258, 260, 262, and 264 in FIG. 3 consists of a plurality of dimers oriented in a common direction. For example, dimer row 252 includes dimers 266, 268, 270, 272, 274, 276, 278, 280, 282, 284, 286, 288, 290, 292 aligned in a vertical direction as depicted in FIG. 3. The resulting dimers can be bonded with two hydrogen atoms, a single hydrogen atom, or no hydrogen atoms, which bond to the one remaining dangling bond on each dimer atom. For example, the sample 250 includes an area 294 where all of the dimers are bonded to no hydrogen atoms and an area 296 where all of the dimers are bonded to a single hydrogen atom. The remaining portions of the sample 250 have dimers bonded to two hydrogen atoms. The dimer rows 252, 254, 256, 258, 260, 262, and 264 have a pitch 300 between dimers of 0.384 nm and a spacing 302 between dimer rows of 0.768 nm. The atoms forming the dimer pairs have a spacing 304 that is nominally 0.3 nm instead of the usual 0.384 nm spacing of the silicon atoms. The dimer rows are a strong structural feature, and form the natural choice for one dimension of a lithography pixel, since the low-bias mode of H depassivation lithography described later in this document has a line width of 1 dimer row. In some embodiments of the invention, a pixel in the pattern to be written could be a square writing pixel which is 2 dimers within a single dimer row, forming a square 0.768 nm across.

Figure 4:
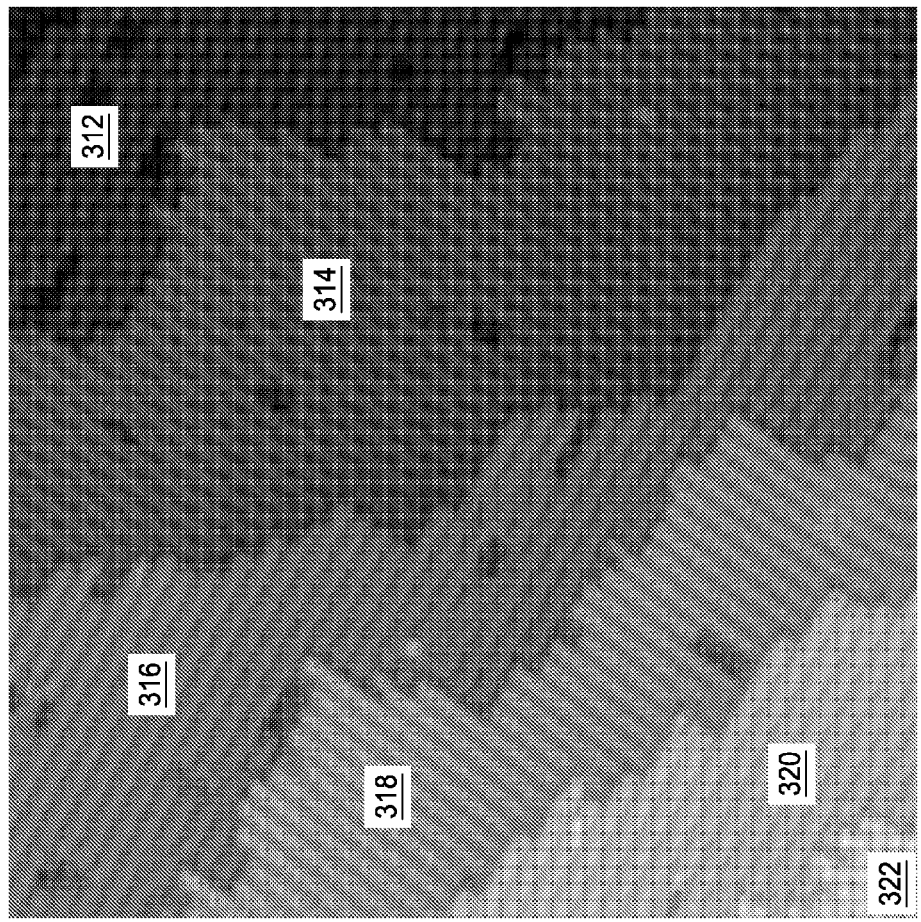
FIG. 4 is a top view of a silicon lattice structure sample having multiple terraces as imaged by a STM according to an embodiment of the present disclosure.

FIG. 4 is a top view of a silicon lattice structure sample 310 having multiple terraces as imaged by a STM. More specifically, the sample 310 includes terraces 312, 314, 316, 318, 320, and 322. The different heights of the terraces are shown by different grey levels, from dark grey at the lowest terrace 312, and light grey at the highest terrace 322. The height difference between each atomic layer is 0.135 nm. The dimer rows of each terrace extend perpendicular to the dimer rows of the adjacent terraces, due to the diamond lattice structure of silicon. Accordingly, in the illustrated embodiment, the dimer rows of terraces 312, 316, and 320 each extend in a direction from the top left corner to the bottom right corner of the image, while the dimer rows of terraces 314, 318, and 322 each extend in a direction from the top right corner to the bottom left corner of the image.

Even for wafers cut with very low miscut angles, the size of a single atomically flat terrace (i.e., any one of terraces 312, 314, 316, 318, 320, and 322 shown in FIG. 4) is usually only several tens or hundreds of nanometers wide. Significantly larger atomic terraces may be formed by deliberately creating troughs or walls in the silicon substrate and using the high surface mobility of the silicon atoms at elevated temperatures, as described by Fuechsle, Martin et al. J. Vac. Sci. Technol. B 25 2562-2567 (2007) and Li, K., et al., "Controlled Formation of Atomic Step Morphology on Micropatterned Si (100)," J. Vac. Sci. Technol. B 29, 041806 (2011), each hereby incorporated by reference in its entirety.

Step edges (i.e., the transitions between terraces) and other surface features (such as dimer vacancies, di-hydride surface Si atoms, and isolated dangling bonds) that are often found on even well prepared surfaces can be addressed utilizing techniques of the present disclosure described below such that these surface anomalies do not create significant problems for the depassivation lithography patterning process. A dimer vacancy is where the two Si atoms comprising one dimer are missing. In some instances, a properly prepared surface has few dimer vacancies making any such vacancies possible to avoid when determining the pattern layout. Even if a pattern must extend across a dimer vacancy, the result is a 0.135 nm vertical displacement of the deposited atom, which is tolerable in many instances. If desired, dimer vacancies can be eliminated by filling them in using patterned Si Atomic Layer Epitaxy (ALE) (See, e.g., J H G Owen et.al. JVSTB 29(6) F201, November/December 2011, which is hereby incorporated by reference in its entirety). Dihydrides—where two H atoms are bonded to a single surface Si atom and, therefore, a dimer is not formed—are not a problem for hydrogen depassivation as both hydrogen atoms can be removed from the silicon atom, and they have also been established as an effective resist. On well prepared hydrogen passivated Si (100) 2×1 surfaces, dangling bonds exist on only a small percentage of Si atoms and the vast majority of dangling bonds are isolated dangling bonds. Since many species do not adsorb onto an isolated dangling bond, isolated dangling bonds are of little or no consequence to the patterning process. However, as discussed below isolated dangling bonds may be used as fiducial markers to guide positioning of the tip during the patterning process.

While in principle it is possible to create single atomic terraces that contain no step edges upon which all patterning can be done, in reality there will inevitably be instances where it is necessary to pattern over an area that contained one or more atomic step edges. In Si (100) 2×1 surfaces, not only do the surface reconstructed dimer rows change direction, but because of the diamond crystal structure of silicon, there is also a shift in the atom coordinate system that must be accounted for. The crystal lattice of silicon (and germanium)

is a diamond lattice. Therefore, the bonding direction and position of the surface atoms repeats only every 4 atomic layers.

Figure 5:
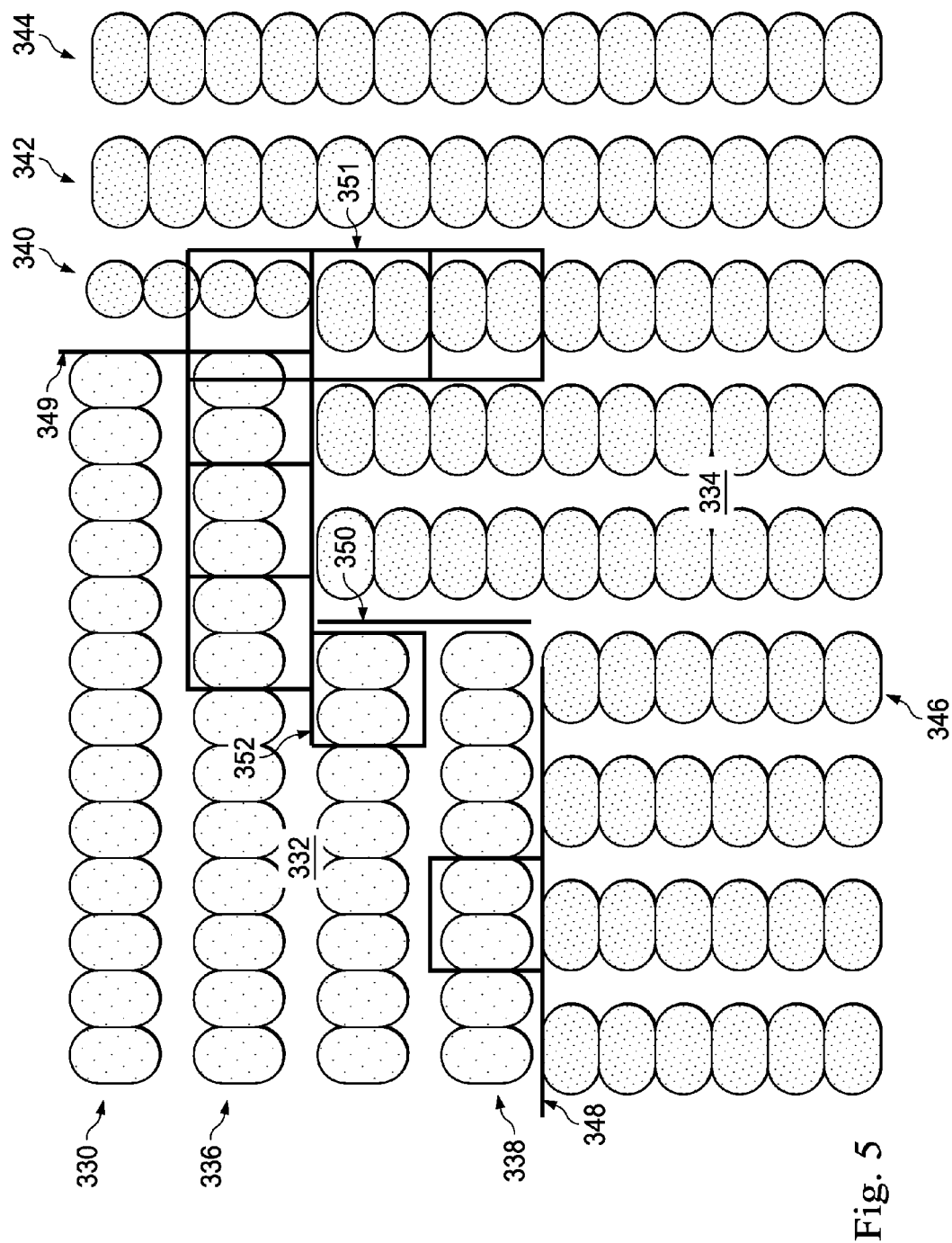
FIG. 5 is a diagrammatic schematic top view of a silicon lattice structure sample having two terraces according to an embodiment of the present disclosure.

In FIG. 5 as well as a number of other figures in this disclosure that represent a Si (100) 2×1 surface, we will represent dimers (pairs of Si atoms with H adsorbed) as ovals. Occasionally, at the end of dimer rows at a B-type rebonded step edge (explained below) we will represent single surface atoms as circles. As shown in FIG. 5, for a sample 330 having an upper terrace 332 and a lower terrace 334, the dimer rows 336 and 338 of the upper terrace 332 extend perpendicular to the dimer rows 340, 342, 344, and 346 of the lower terrace 334. Further, the dimer rows 336 and 338 of the upper terrace 332 are offset with respect to the dimer rows 340, 342, 344, and 346 of the lower terrace 334. In this regard, if each terrace is considered to be a pixel grid defined by a plurality of 2-dimer pixels (i.e., each pixel is comprised of 2 dimers), then, as shown 351, the 2-dimer pixels of the lower terrace 334 are offset by ¼ pixel (½ dimer) in the direction parallel to the dimer rows 336 and 338 of the upper terrace 332. Generally, as illustrated in FIG. 5, there are two types of step edges. An A-type step edge 348 runs parallel to the dimer rows 336 and 338 of the upper terrace 332, and B-type step edges 349 and 350 run parallel to the dimer rows 340, 342, 344, and 346 of the lower terrace 334. There are two possible types of B-type step edge. The rebonded B-type step edge 349 is found in large majority on a well-prepared sample, while the non-rebonded B-type step edge 350 is mainly found after epitaxial growth of Si, particularly growth using disilane or other gas-sources. The two types of B-type step edge inevitably introduce a one-dimer or ½ pixel shift of the step edge 352.

Identification of and Alignment to Lattice Structure

The precision and accuracy of the depassivation lithography processes of the present disclosure are facilitated in some respects by the ability to image and align to the crystal lattice structure. To this end, in some implementations the image of the crystalline surface as observed with a STM is utilized as the global address grid for pattern generation. The automated recognition of the address grid based on the image of the surface is accomplished with real space image analysis, Fourier analysis, and/or combinations thereof. In order to be suitable for manufacturing implementations, the recognition of the lattice structure from the image should be performed in a timeframe that is significantly less than the time required to expose the portion of the pattern that is to be written before re-registration to the lattice is required. It is also desirable in order to account for image distortions, drift, creep, and/or other factors that adversely affect imaging utilizing a STM.

Figure 6:
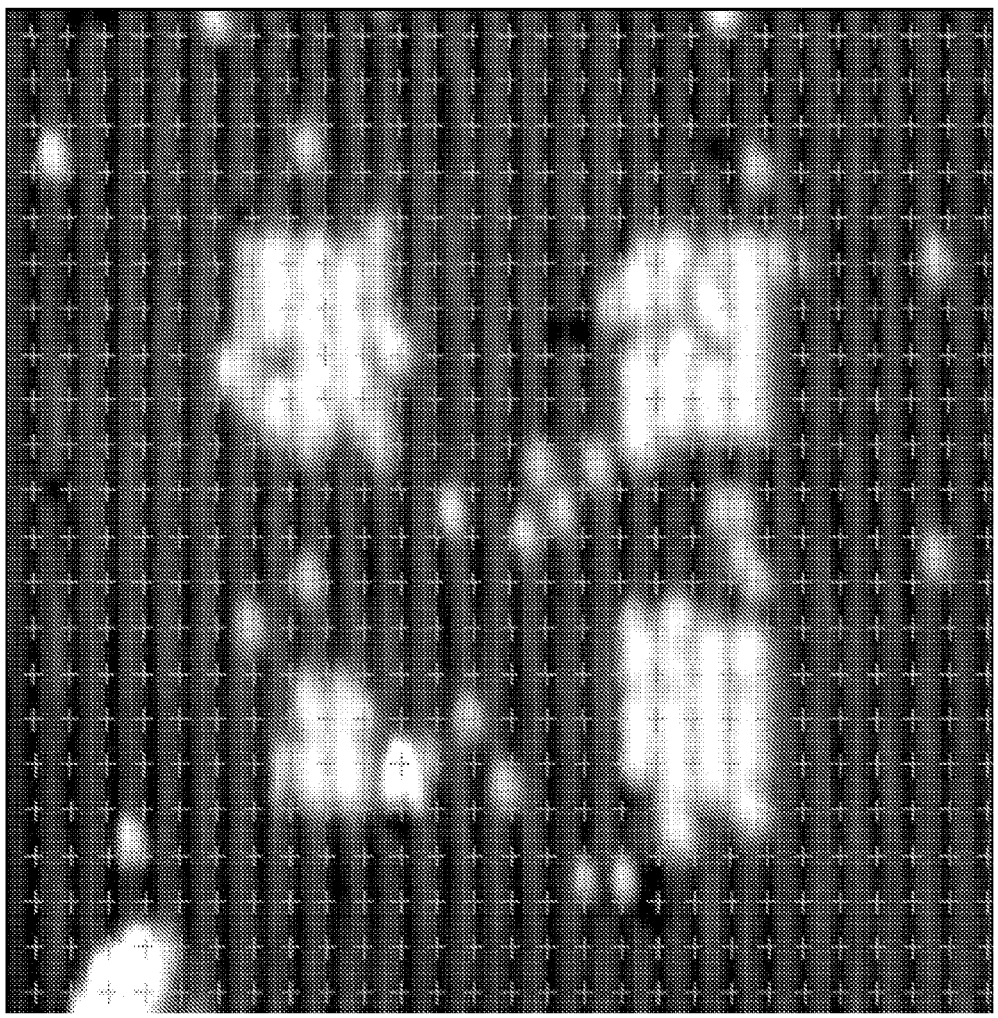
FIG. 6 is a top view of a silicon lattice structure sample as imaged by a STM overlaid with a lattice structure grid according to an embodiment of the present disclosure.

Referring now to FIG. 6, shown therein is an image 400 of a silicon lattice structure sample as imaged by a STM overlaid with a lattice structure grid according to an embodiment of the present disclosure. As shown the grid is indicated by a plurality of crosshairs that are aligned with the dimers of the silicon lattice structure. With the grid aligned with the dimers of the silicon lattice structure, a desired depassivation pattern can be written to the sample based on the grid. The following description will discuss aspects of correlating the grid to the lattice structure for use in the depassivation process.

As an initial step, the physical characteristics of the sample surface are determined from the image(s) generated by the STM system. In this regard, in some implementations there are three general steps to identifying the physical characteristics of the surface: (1) identifying the lattice structure, (2) identifying terraces and step edges, and (3) identifying the content of each unit cell.

Figure 7:
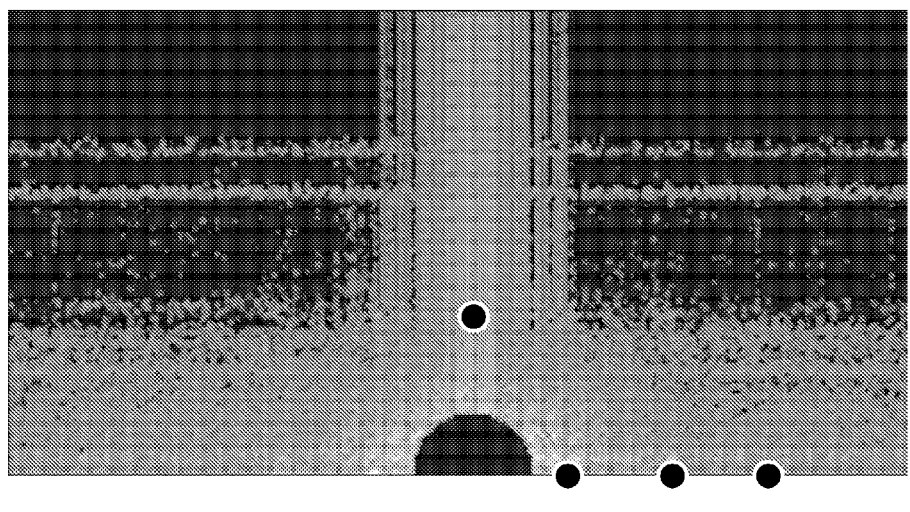
FIG. 7 is the silicon lattice structure image of FIG. 8 shown in Fourier space.

In some implementations, a Fourier transform of the two-dimensional scanned image is utilized to identify the global lattice structure. For example, FIG. 7 shows an image 410 which is the absolute value of the Fourier Transform of the silicon lattice structure of FIG. 6. In the case of a Si(100) surface, the dimer row is the most prominent periodic feature. By searching for a peak in the absolute value of the Fourier Transform nearest the expected dimer row frequency, the dimer rows are identified. Likewise, by searching for a perpendicular peak that would appear if there are step edges in the image, the presence of any transitions between terraces of the sample can be identified. In some instances, the image is analyzed for a peak in the second harmonic of the expected dimer row frequency, which can provide additional information about the location of the dimers. In some instances, higher harmonics are also searched for in the image. In this regard, the presence (or lack thereof) of the higher harmonics provides an indication of the quality of the image. From the position of the peaks, the pitch and angle of the dimer rows are determined. The complex phase at the peaks gives the position of the dimer rows and dimers in real space. The geometry involved in translating image coordinates to lattice coordinates is shown in FIG. 8.

Figure 8:
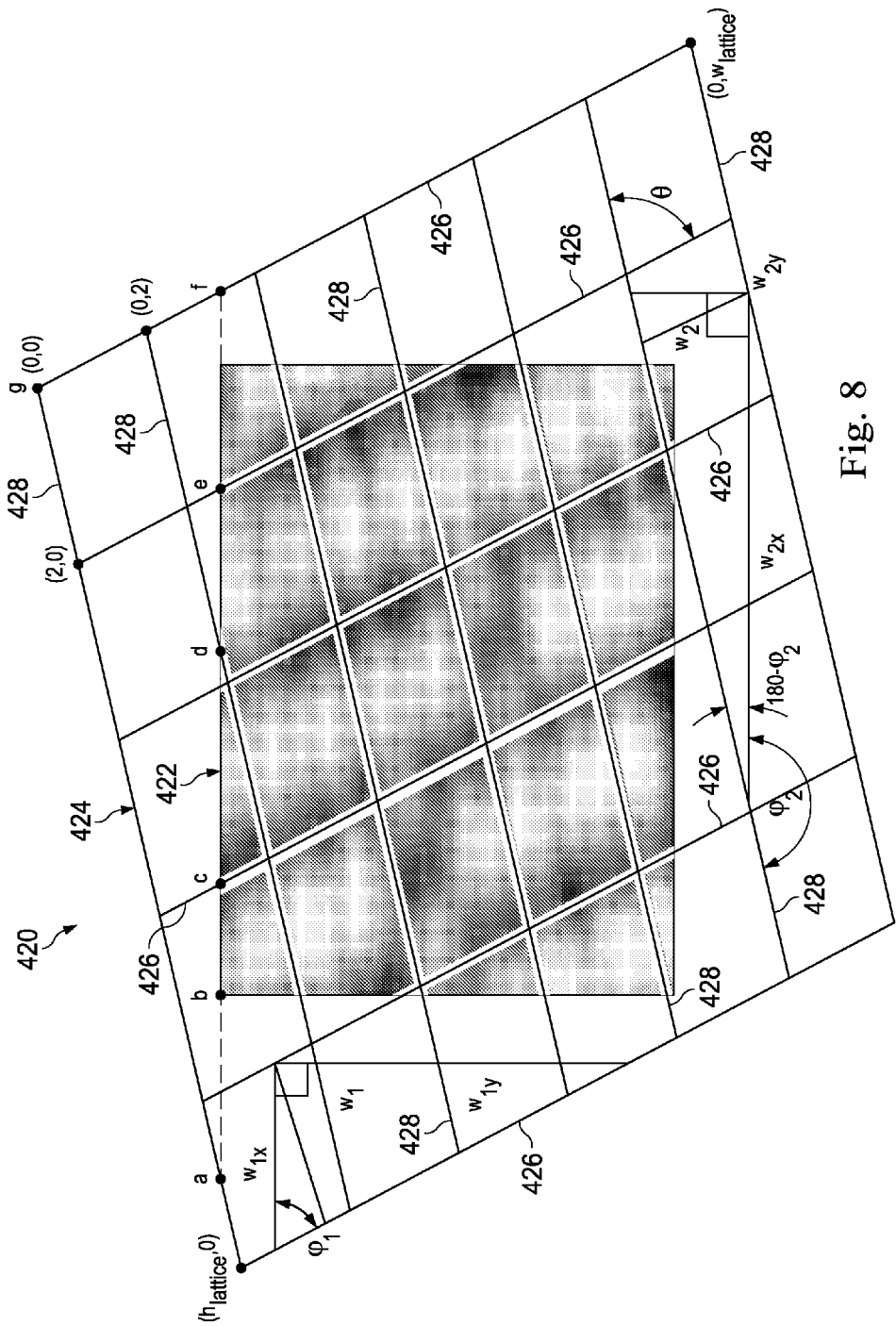
FIG. 8 is a top view of a silicon lattice structure sample as imaged by a STM overlaid with grid lines according to an embodiment of the present disclosure.

More specifically, FIG. 8 shows a schematic 420 of an image 422 of a silicon lattice structure sample as imaged by a STM overlaid with a grid 424. The grid 424 is defined by a series of grid lines 426 and a series of grid lines 428. As shown, grid lines 426 extend at an angle, which can be approximately 90 degrees, to grid lines 428 and are aligned with the underlying lattice structure of the sample. In the illustrated embodiment, the grid lines 426 extend parallel to the dimer rows of the sample and grid lines 428 extend parallel to the dimers. More specifically, in the illustrated embodiment a single grid square (defined by the area between a pair of adjacent grid lines 428 and a pair of adjacent grid lines 426) encompasses a pair of dimers of the underlying lattice structure (e.g., for the illustrated Si (100) surface the grid square encompasses four silicon atoms grouped into two pairs (each pair of silicon atoms defining a dimer)). In some implementations, each grid square defines a pixel that will be utilized to plot a desired design pattern to the sample. It is understood that different size grid squares and/or pixels are utilized in other implementations. However, for the sake of clarity in explanation, the following description will assume that the patterns are designed with pixels corresponding to grid lines 426, 428 of grid 424. Each pixel is a square on the actual surface, but in the image of FIG. 8, these pixels appear generally as parallelograms due to scanning artifacts.

As noted above, the geometry calculations utilized to translate image coordinates to corresponding lattice grid coordinates are shown in FIG. 8. In that regard, the following variable definitions are utilized:

a=coordinate point a
b=coordinate point b=image coordinates origin
c=coordinate point c
d=coordinate point d
e=coordinate point e
f=coordinate point f
g=coordinate point g=lattice coordinates origin
$h_{image}$=image height
$w_{image}$=image width
$h_{lattice}$=lattice height=$2[h_{image}/w_{1y}+w_{image}/w_{1x}]$=10
$h_{width}$=lattice width=$2[h_{image}/w_{2y}+w_{image}/w_{2x}]$=
$w_1$=dimer 1 width
$\phi_1$=dimer 1 angle
$p_1$=dimer 1 phase position
$w_{1x}$=dimer 1 x-width=$w_1/|\sin(\phi_1)|$
$w_{1y}$=dimer 1 y-width=$w_1/|\cos(\phi_1)|$
$w_2$=dimer 2 width $\phi_2$=dimer 2 angle
$p_2$=dimer 2 phase position
$w_{2x}$=dimer 2 x-width=$w_2/|\sin(\phi_2)|$
$w_{2y}$=dimer 2 y-width=$w_2/|\cos(\phi_2)|$
ef=$w_{1x}$
bc=ef*$p_1$
bf=ef*($p_1$+[$w_{image}/w_{1x}$])
ad=$w_{2x}$
bd=ad*$p_2$
ba=ad*($p_2$-1)

Due to artifacts associated with the STM system, it should be noted that: (a) $w_1$ and $w_2$ are not necessarily equal and (b) $\Theta$=$\phi_1$+180-$\phi_2$ is not necessarily 90°.

The Fourier analysis cannot handle non-linear distortions in the image. Therefore, in some instances creep correction is utilized to account for such non-linear distortions in the STM image before performing the Fourier analysis. However, the Fourier analysis can handle linear distortion such as linear scaling of the dimer dimensions and an apparent non-orthogonality between dimer rows. Any linear scaling and/or non-orthogonality between dimer rows are utilized in some implementations to accurately calibrate the STM system. Once calibrated, the search for peaks in the Fourier space can be restricted based on this information, thereby reducing the chances of finding false positives of the presence of dimers. Further, as shown above in the context of FIG. 5, the phase of the dimer rows is affected by atomic step edges in the crystal surface. In that regard, a shift of ¼ or ½ of a dimer row width can occur at step edges between terraces. Methods for dealing with these shifts while maintaining registration to the underlying lattice structure and fiducial markers are discussed below.

By associating the desired lithography patterns with the 2-dimer pixels defined by the grid 424, the desired patterns are directly correlated to the underlying lattice structure in the same manner as the grid. As described below, this provides the ability to create atomically precise structures utilizing a robust automated process. In the two-dimer (four-atom) pixel configuration in the context of a Si(100) surface, a square pixel that is sub-nm in dimension is provided. As there are zero to four hydrogen atoms present per pixel, there can be different definitions as to what constitutes an exposed (depassivated) or an unexposed (passivated) pixel. In the most stringent case, an unexposed (passivated) pixel will have all four of its passivating hydrogen atoms present and an exposed (depassivated) pixel will have all four hydrogen atoms removed. Any pixel with one, two, or three hydrogen atoms is partially exposed.

Depending on the application and the number of hydrogen atoms present, these pixels may be treated as exposed (depassivated), unexposed (passivated), or partially exposed. In this regard, there are cases where the application the hydrogen depassivation lithography will enable less stringent definitions of what constitutes an unexposed (passivated) pixel. For instance, when using the hydrogen resist to define where phosphorous is to be deposited on a silicon surface, a single missing hydrogen atom will not allow a phosphorous atom to be deposited. Even adjacent missing hydrogen atoms on adjacent pixels do not allow phosphorous to be deposited. Accordingly, in this and other applications of hydrogen depassivation lithography an unexposed pixel includes pixels with either three or four hydrogen atoms present. Similarly, there are applications where an exposed pixel includes pixels with either one hydrogen atom or zero hydrogen atoms. Generally, the definition of what constitutes an exposed (depassivated) and/or unexposed (passivated) pixel can be determined based on the particular application of the depassivation lithography process.

A real space approach to identifying the lattice and relevant surface features is described in the following paragraphs. Collectively, FIGS. 9-21 show aspects of identifying a lattice structure of a sample according to embodiments of the present disclosure. It is understood that the described steps of identifying the lattice structure are exemplary in nature and that one or more of the steps may be omitted, one or more additional steps may be added, and/or the order of the steps may be changed without departing from the scope of the present disclosure. Further, one skilled in the art will recognize that there are alternative ways or manners of identifying the lattice structure from the image(s) of the STM system and such alternative techniques are included within the scope of the present disclosure. Generally speaking, any type of image processing and/or data analysis now known or developed in the future may be utilized to identify the lattice structure of the sample for use with the depassivation lithography processes of the present disclosure.

Figure 9:
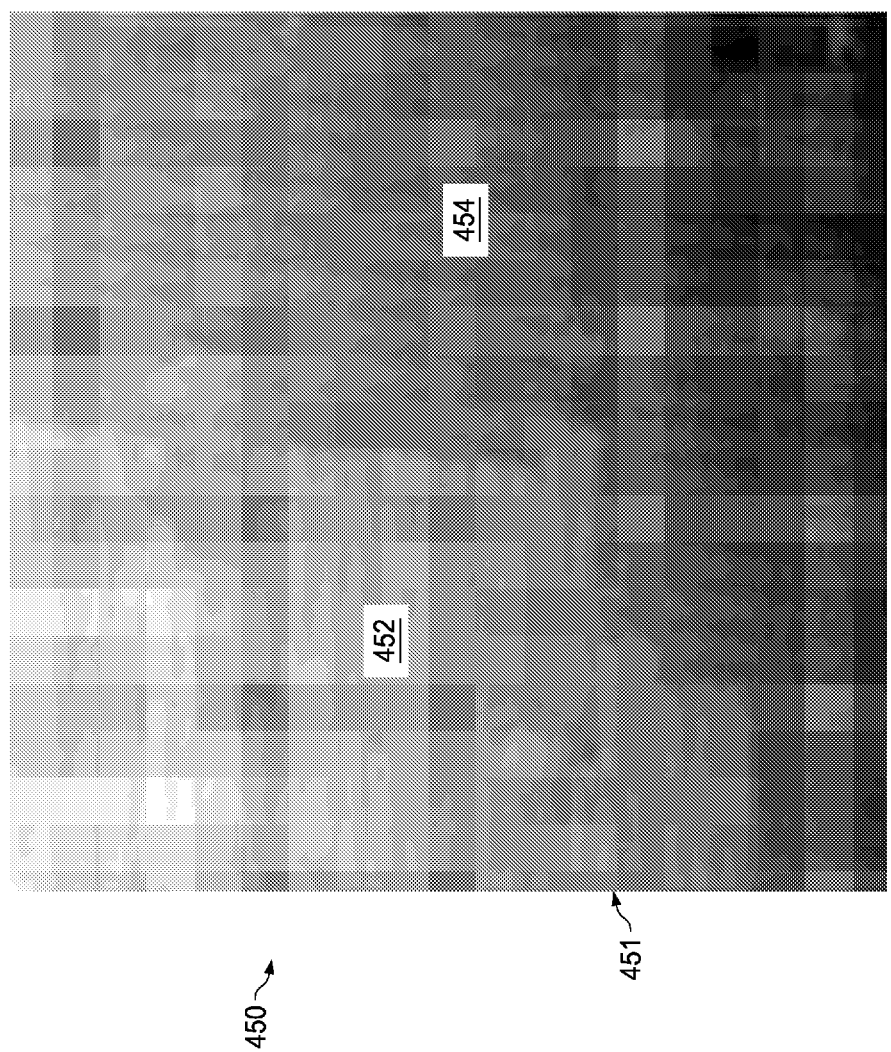
FIGS. 9-21 show aspects of identifying a lattice structure of a sample according to embodiments of the present disclosure.
Figure 10:
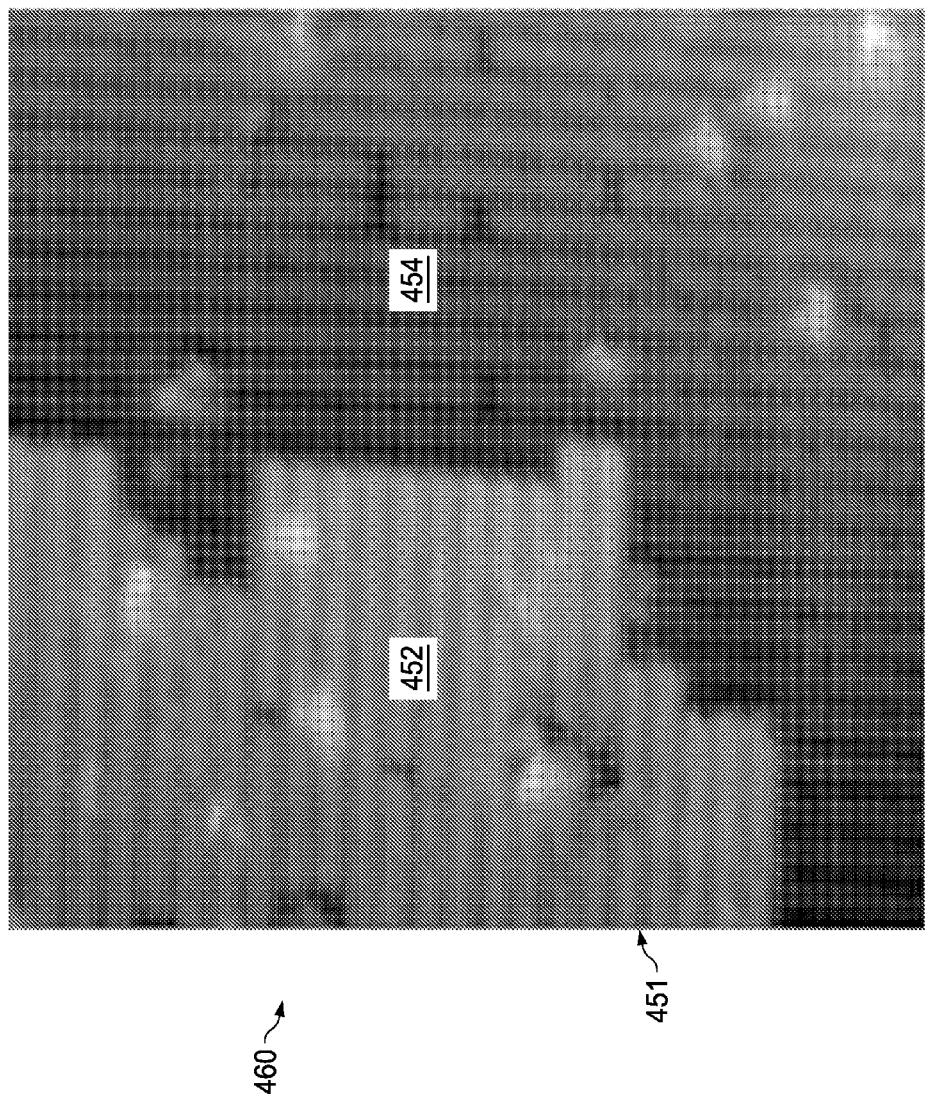

Referring initially to FIG. 9, shown therein is an image 450 of a silicon lattice structure sample 451 having two terraces generated by a STM system according to an embodiment of the present disclosure. As shown the sample 451 includes an upper terrace 452 and a lower terrace 454. In accordance with the silicon lattice structure, the dimer rows of the upper terrace 452 extend perpendicular to the dimer rows of the lower terrace 454. In the illustrated embodiment, the dimer rows of the upper terrace 452 extend in a generally horizontal direction (as viewed in FIG. 9), while the dimer rows of the lower terrace 454 extend in a generally vertical direction (as viewed in FIG. 9). In some instances, the image of the sample 451 is linearly fit to remove any image tilt. In this regard, if the sample includes multiple terraces, then the linear fit is applied to each terrace independently. In some implementations, the linear fit is a least squares plane fit and that is performed to each terrace separately in order to prevent tilt. However, in other instances an algorithm is applied to the entire surface in parallel. FIG. 10 shows an image 460 of the silicon lattice structure sample 451 after spatial filtering to remove noise and a plane fit of the image 450 of FIG. 9 according to an embodiment of the present disclosure. In that regard, FIG. 10 illustrates a global plane fit so the separate terraces are not terribly flat. The modeling of dimer rows (See, FIGS. 11 and 12) is used to determine which part of the image is on which terrace. Then a least squares plane fit is used to flatten (un-tilt) the larger terrace. Since the terraces are parallel, planarizing one effectively planarizes both.

Figure 11:
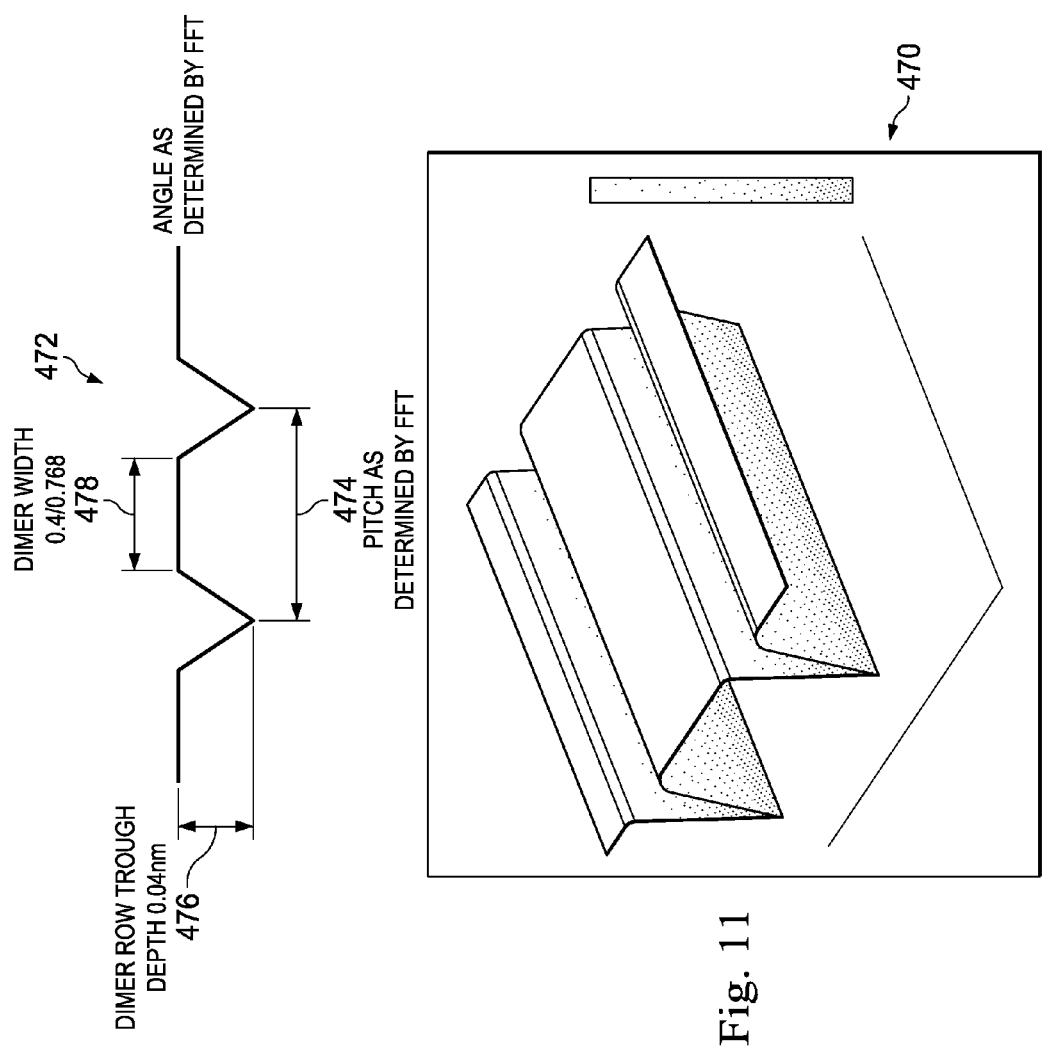

Referring now to FIG. 11, shown therein is a perspective view of a three-dimensional model 470 of a silicon lattice structure along with a diagrammatic, partial cross-sectional side schematic of the silicon lattice structure according to an embodiment of the present disclosure. The structure 470 is a model of a segment of a dimer row (extended partially to the adjacent dimer rows). The model is specific to the lattice structure of the sample, but with minor adaptation to can be applied to other sample types. In this regard, Si (100) 2×1 and many other crystal surfaces have dominant features that could be modeled in a similar fashion. This model is adapted to the image with respect to angle and pitch (as determined by FFT). With sufficient calibration and consistent imaging, only the angle need be determined by FFT, though adaptability to some imaging features is useful in some instances. For example, if the imaging resolution is good enough to see dimers as well as dimer rows (determined by FFT), then the dimer corrugation can be added to the dimer row model.

Figure 12:
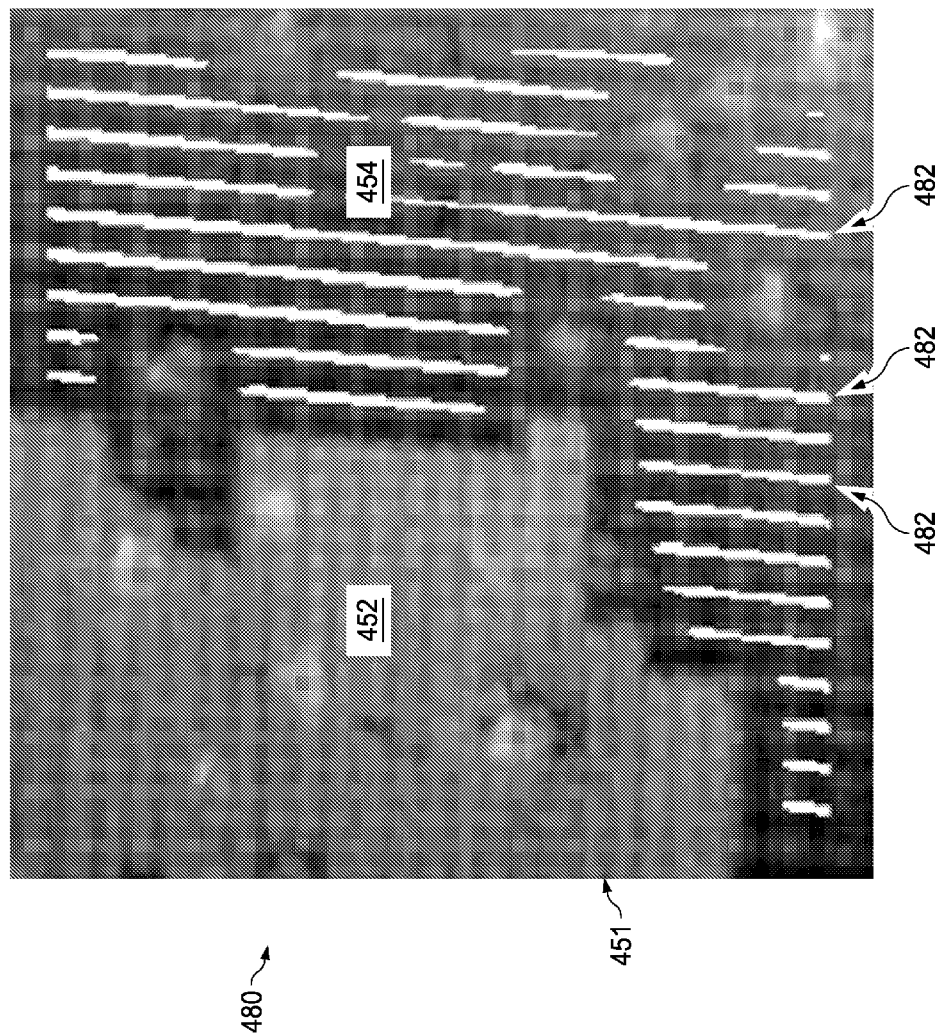

FIG. 12 shows an image 480 of the silicon lattice structure sample 451 after the correlation matching process. In this regard, the model of the silicon lattice structure of FIG. 11 is correlated to the image 460 of FIG. 10. The fit of the model to the smoothed and global plane fit image is generated by the OpenCV function MatchTemplate using the CV_TM_CCO-EFF_NORMED method. The lines 482 represent the location of the centroid pixel of the model centroid where the model has a high correlation fit to the image. In the illustrated embodiment, the model is fairly symmetric with a dimer row, and the identified pixels are well aligned with the dimer rows in the image. However, the specifics of the alignment can be adjusted to create alignment with the dimer row troughs if desired. In at least one embodiment, the specifics of the alignment are not particularly important as the identified pixels are used primarily to identify a specific terrace or sets of terraces that all have the same dimer row direction.

Figure 13:
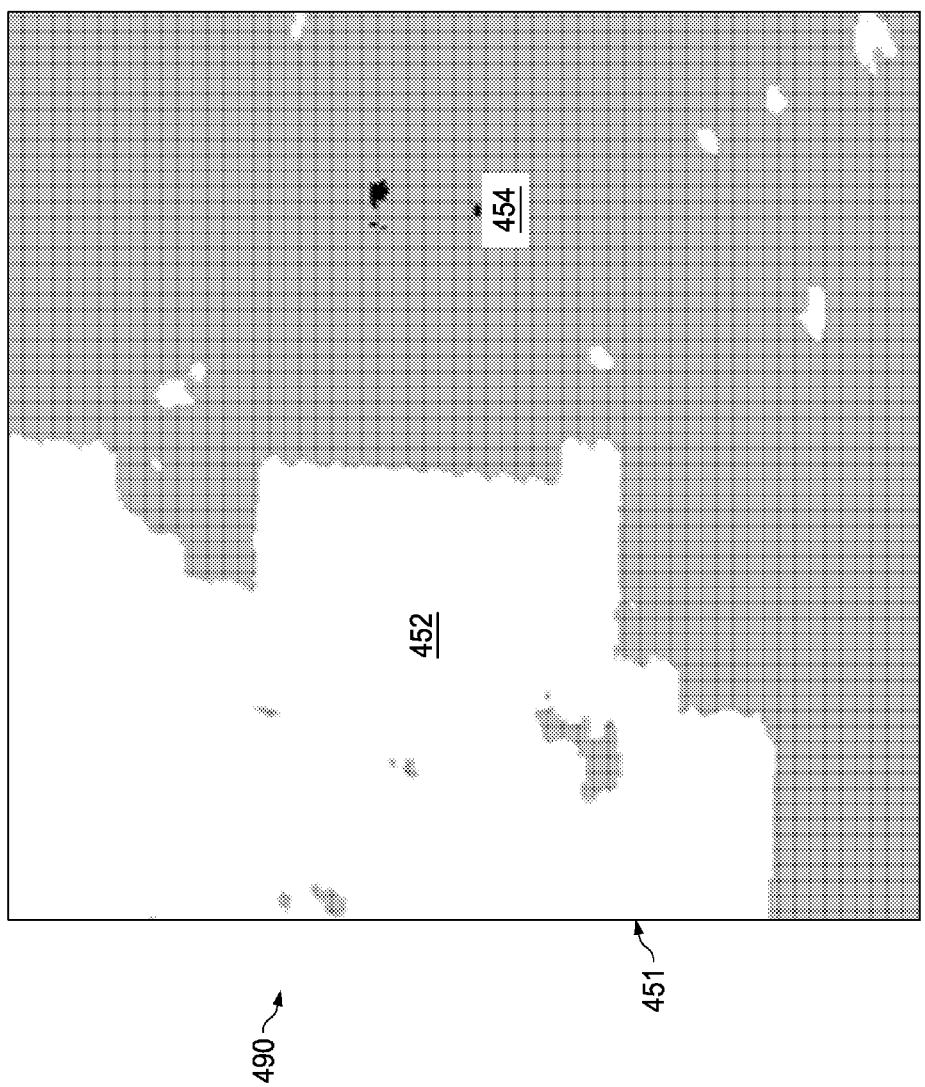

FIG. 13 is a digital representation 490 of the silicon lattice structure sample 451 after applying a thresholding algorithm to distinguish between the upper terrace 452 and the lower terrace 454. In the illustrated embodiment, pixels corresponding to the upper terrace 452 of the sample 451 are shaded lighter than the pixels corresponding to the lower terrace 454. In some implementations, the transition between the upper terrace 452 and the lower terrace 454 is determined by detecting whether a step edge exists between two different locations on the surface of the sample 451. For example, in some instances the image is analyzed to determine if there has been a shift in atom position indicative of the presence of an intervening step edge. In some instances, a threshold between 0.06 nm and 0.10 nm is utilized, with some particular implementations utilizing a +/−0.08 nm threshold. In this regard, single atomic step edges are 0.135 nm high on a Si(100) surface. Accordingly, where the tilt has been removed, the surface atoms for that terrace are well contained within the +/−0.08 nm threshold. However, the value of the threshold is somewhat arbitrary and could be larger or smaller in other instances, including having a larger or smaller threshold value depending on the sample type.

Figure 14:
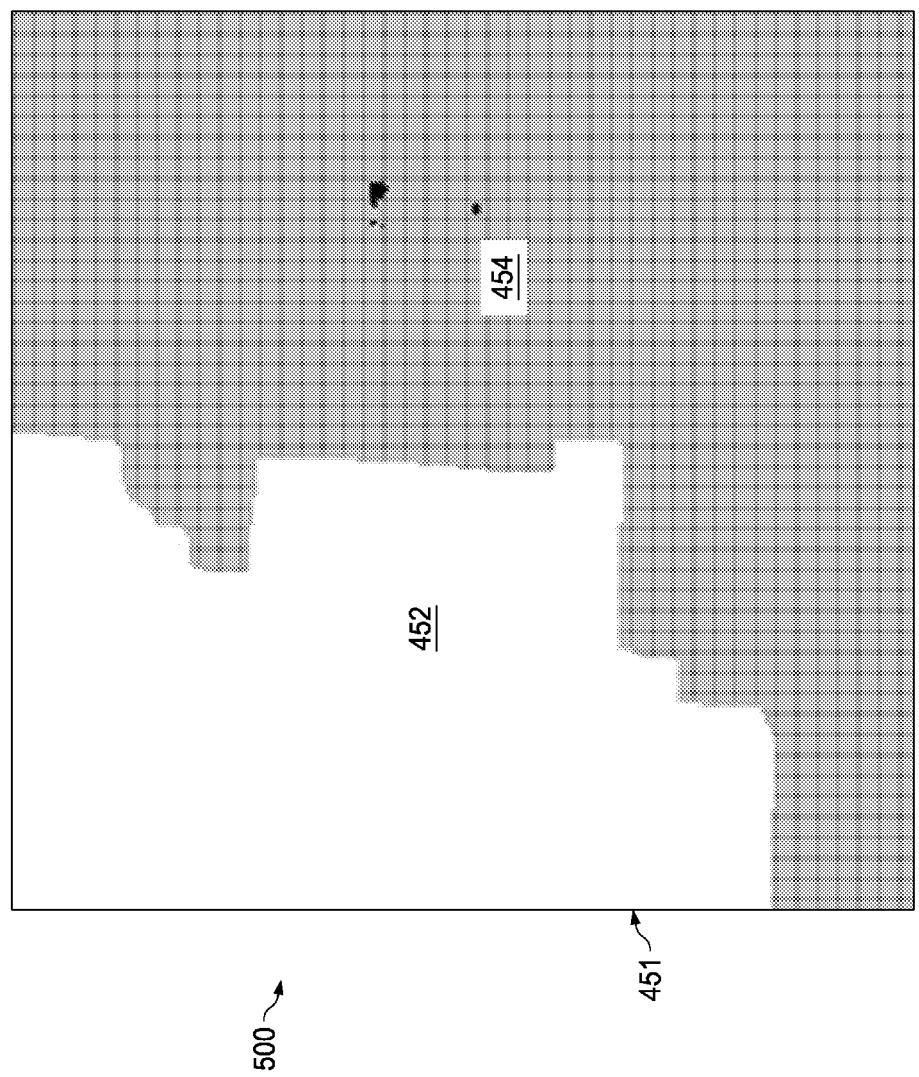

FIG. 14 is a digital representation 490 of the silicon lattice structure sample 451 after applying a shrink-grow-shrink algorithm to the digital representation 490 of FIG. 13. The shrink-grow-shrink algorithm identifies and/or eliminates features that are either too big or too small. If features in an image are shrunk by a certain amount and the remaining features are regrown by the same amount, then features below a certain size are eliminated but the original features are largely retained (e.g., note the disappearance of the light features in the 454 terrace). On the other hand, if the process is reversed (grow first then shrink), then holes of a certain size are eliminated (e.g., note the elimination of the small holes (darker regions) in the 452 terrace). In the illustrated embodiment, the amount to shrink and grow by was designed to be similar to half of the dimer row pitch (~0.4 nm or roughly the size of an atom). This eliminates dimer vacancies, dangling bonds, and other surface anomalies occurring in a given terrace. It also cleans up the edges. In the illustrated embodiment, the shrink and grow operations were combined into a 1× shrink, 2× grow, 1× shrink implementation in an effort to eliminate both isolated features and holes. However, other size shrink and grow operations may be utilized in a similar manner. Varying the parameters of the rules by which features are shrunk and grown affect what is removed (and what is not) and the shape of the features that remain. Accordingly, the rules can be optimized based on the desirability to remove or preserve features of the sample. In some implementations, the terraces 452 and 454 are identified using the techniques described in "Automated Scanning Tunneling Microscope Image Analysis of Si(100):H 2_1 Surfaces," J. N. Randall, J. R. Von Ehr, J. B. Ballard, J. H. G. Owen, E. Fuchs, Microelectronic Engineering 98 214-217 (2012), which is hereby incorporated by reference in its entirety.

Figure 15:
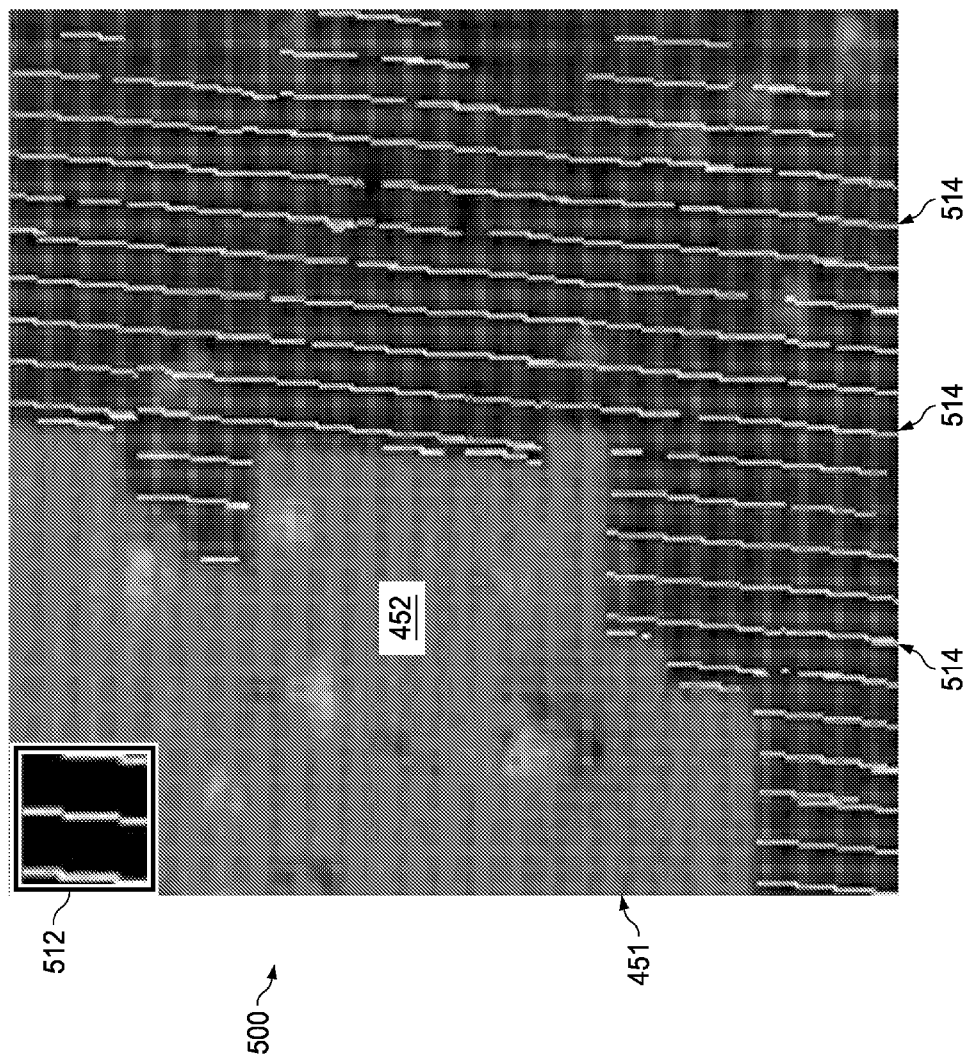
Figure 16:
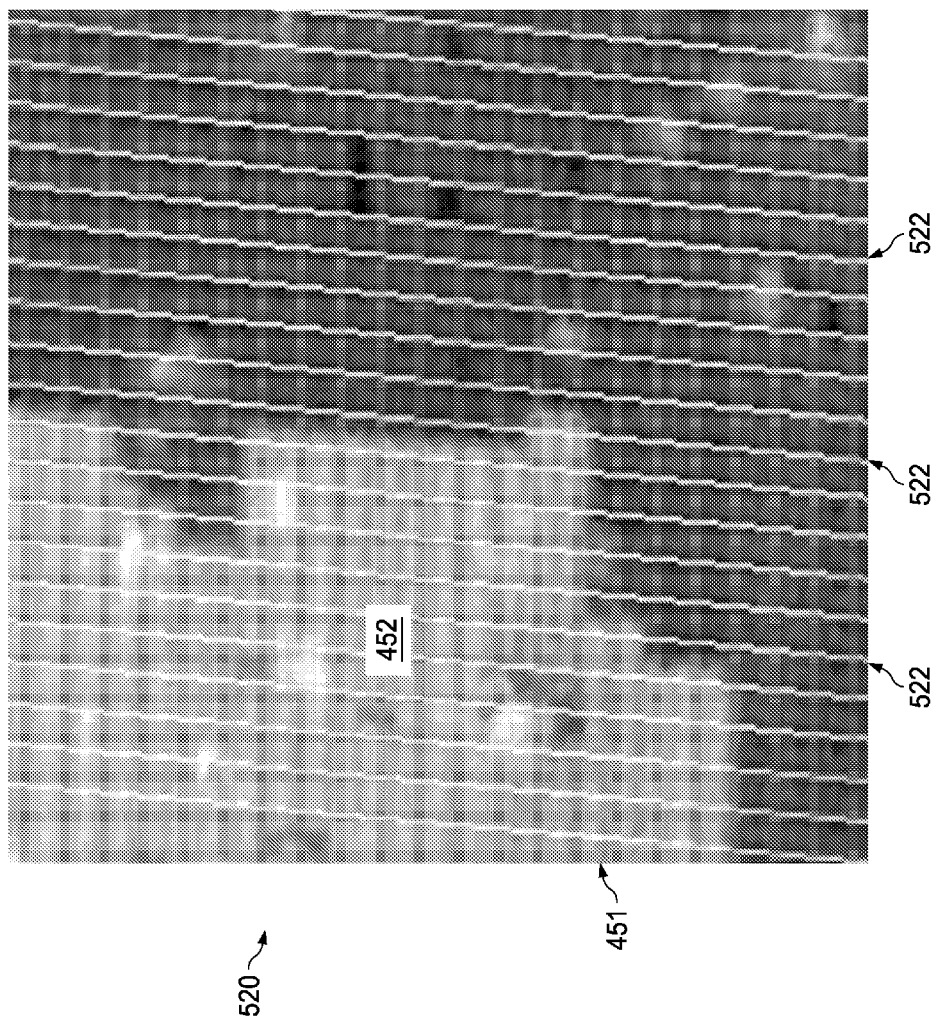
Figure 17:
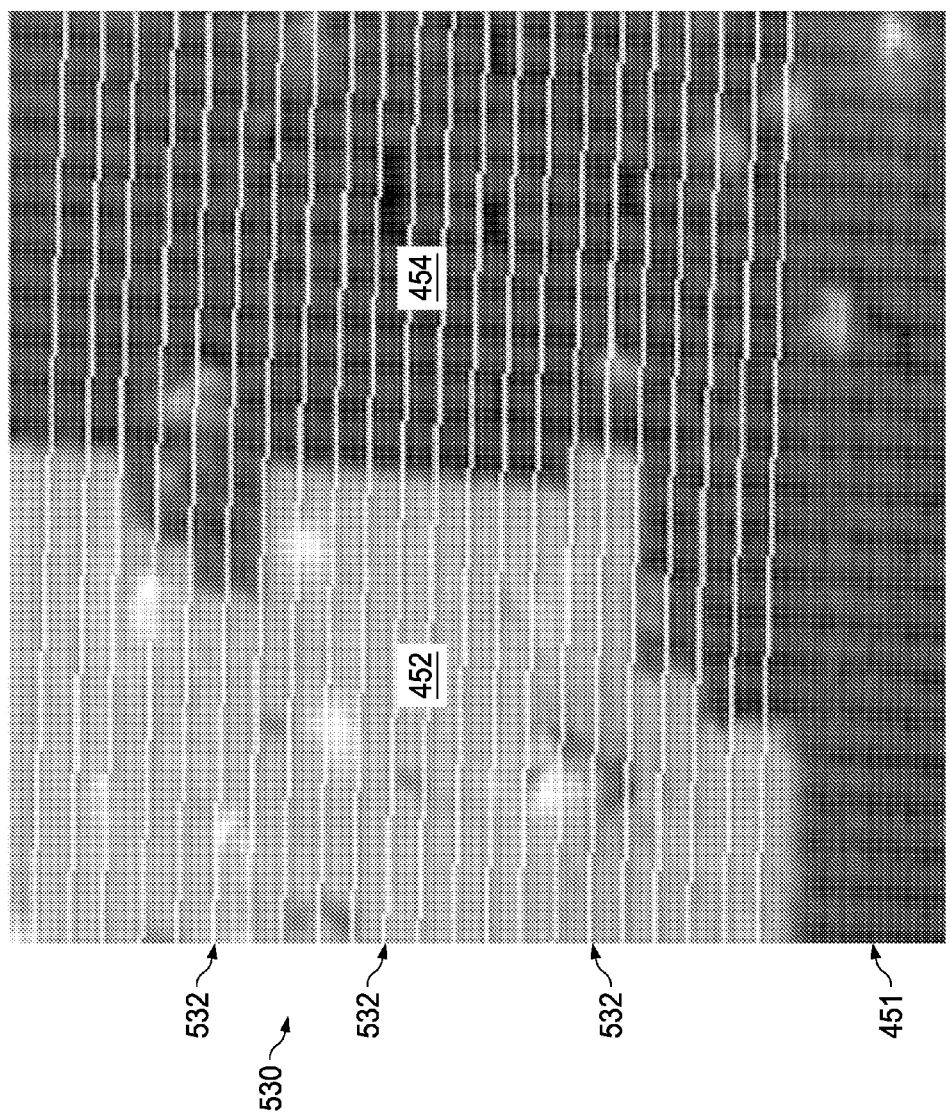
Figure 18:
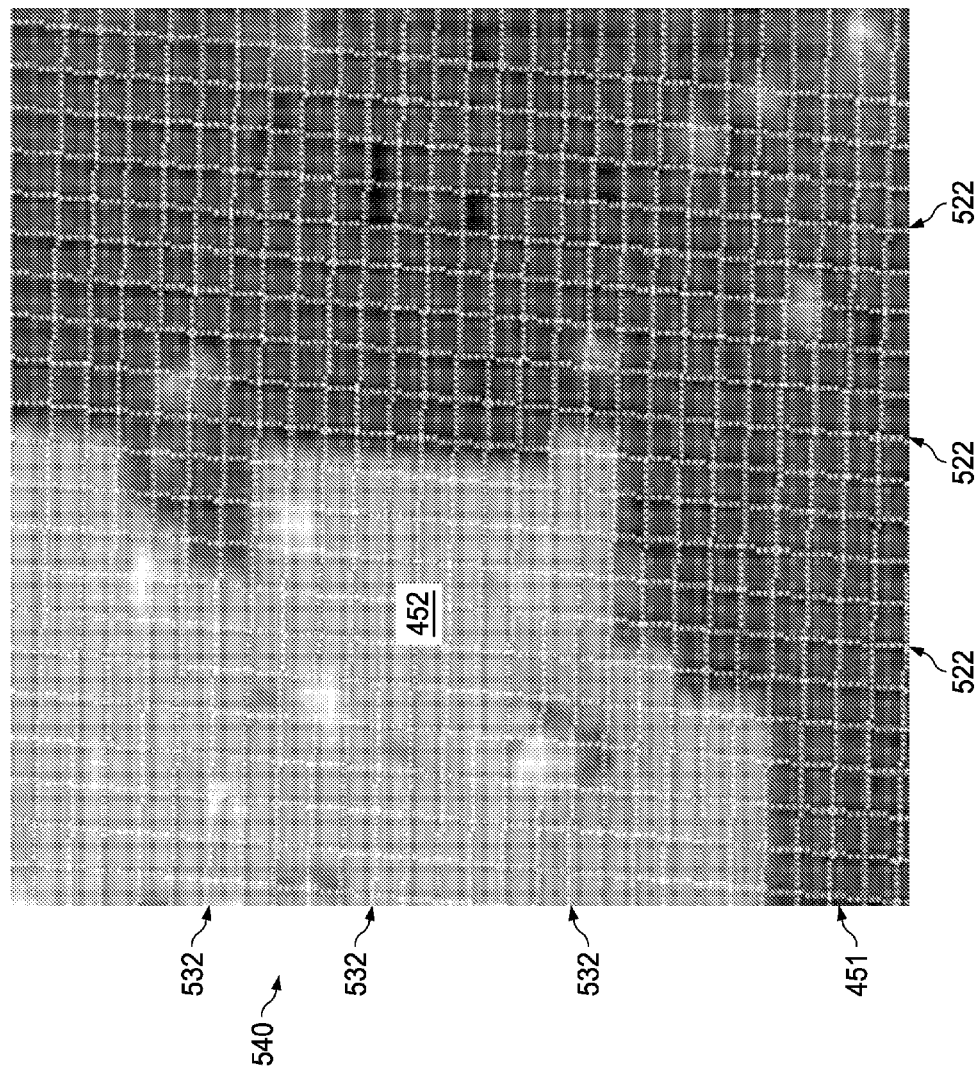

Referring now to FIG. 15, an image 510 is the result of the summation of an STM image with the image shown in the inset 512 that has been placed where there is a good correlation with the model 470. The inset image 512 has white pixels aligned with the dimer row troughs of a model similar to the model 470. Any placements of these 512 image lines are suppressed in the portion of the image that has been identified as the upper terrace 452 in FIG. 14. As can be seen in FIG. 15, there is excellent correlation between the dimer row troughs and the white pixels from the placed image 512. Based on the alignment of the model to the sample 451, vertical grid lines of the detected lattice structure can be associated with the image. For example, FIG. 16 shows an image 520 of the sample 451 with a plurality of vertical grid lines 522 overlaid. In some instances, the placement of lines 522 is determined by placing a global grid of lines at the pitch and angle suggested by the FFT analysis and then making minor corrections/adjustments to maximize the overlay with the white pixels in FIG. 15. Alternatively the positions and angles of the individual grid lines can have minor corrections/adjustments to maximize overlay with the white pixels in FIG. 15. A similar approach is taken to associate horizontal grid lines with the image of the sample 451. For example, FIG. 17 shows an image 530 of the sample 451 with a plurality of horizontal grid lines 532 of the detected lattice structure overlaid. FIG. 18 shows an image 540 of the silicon lattice structure sample 451 with both vertical grid lines 522 and horizontal grid lines 532 of the detected lattice structure overlaid.

Figure 19:
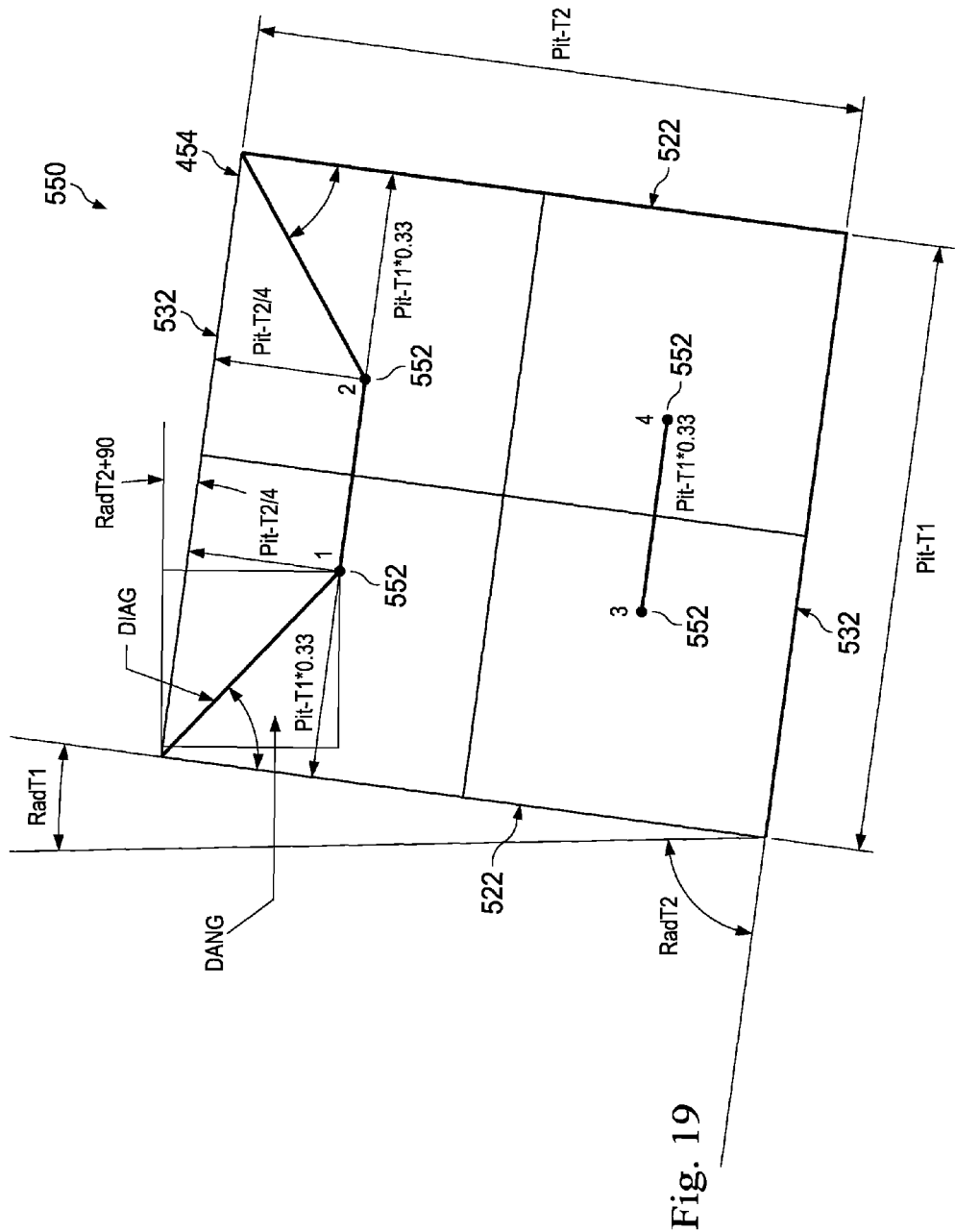
Figure 20:
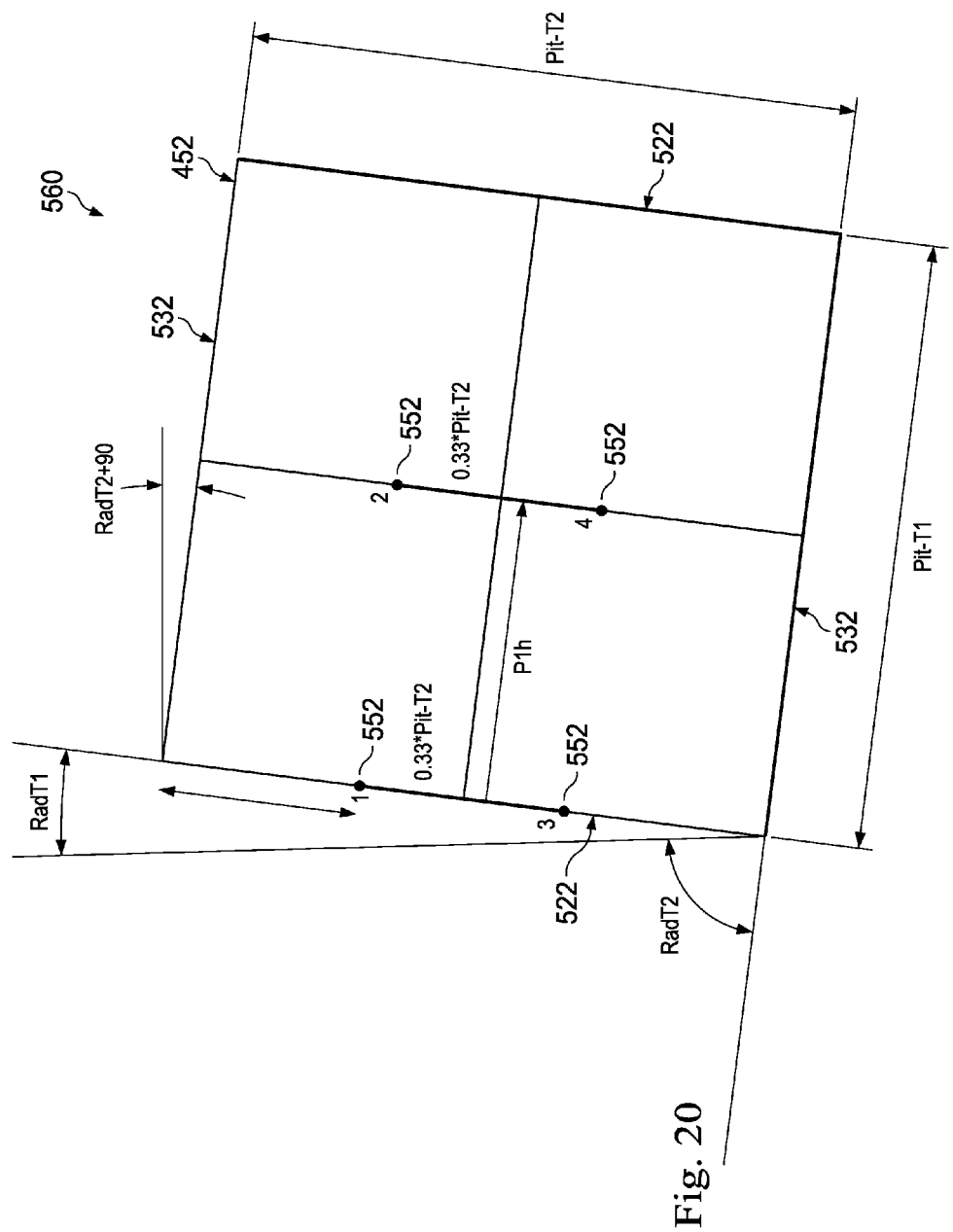

With the grid lines 522 and 532 associated with the image, the relative positions of the silicon atoms within each pixel defined by the grid lines 522 and 532 can be determined. For example, FIG. 19 shows a schematic 550 of a portion of the lower terrace 454 of the silicon lattice structure sample 451 including the geometrical relationship of the grid lines 522, 532 to the silicon atoms 552 of the dimer rows of the lower terrace 454 of the sample 451. Similarly, FIG. 20 shows a schematic 560 of a portion of the upper terrace 452 of the silicon lattice structure sample 451 including the geometrical relationship of the grid lines 522, 532 to the silicon atoms 552 of the dimer rows of the upper terrace 452 of the sample 451. The shift in the expected atomic position is the expected half dimer shift pointed out in FIG. 5. This shows the process working for two atomic terraces. The process can be extended to additional layers where there would be up to four different atom positions within the global grid lines. In other embodiments, the positions of the dimers within the grid lines would remain the same for each terrace, and the grid lines would be adjusted for each terrace independently, by making ½ dimer shifts in either a horizontal or vertical direction.

With the overall lattice structure determined and the different terraces identified, the properties of individual dimers can be evaluated. For example, a threshold analysis can determine whether an atom is passivated or depassivated. Simply looking at the height of the STM image at the precise location expected for the atom will reveal passivation or depassivation, with the depassivated locations appearing up to 0.15 nm taller than the background. For example, if the expected position of an atom as identified by the analysis above for a particular terrace where a least squares plane fit drives the average value (height) of the terrace to zero, then any position below −0.04 nm can be considered a vacancy, any position from -0.04 nm to 0.07 nm can be considered an H passivated atom, and any position above 0.07 nm can be considered a dangling bond or some other surface contamination. More elaborate analysis, such as template matching, can provide additional information regarding the properties of a dimer. For example, template matching can also help identify partially passivated dimers, including determining which of the dimer's bonds has been depassivated.

Figure 21:
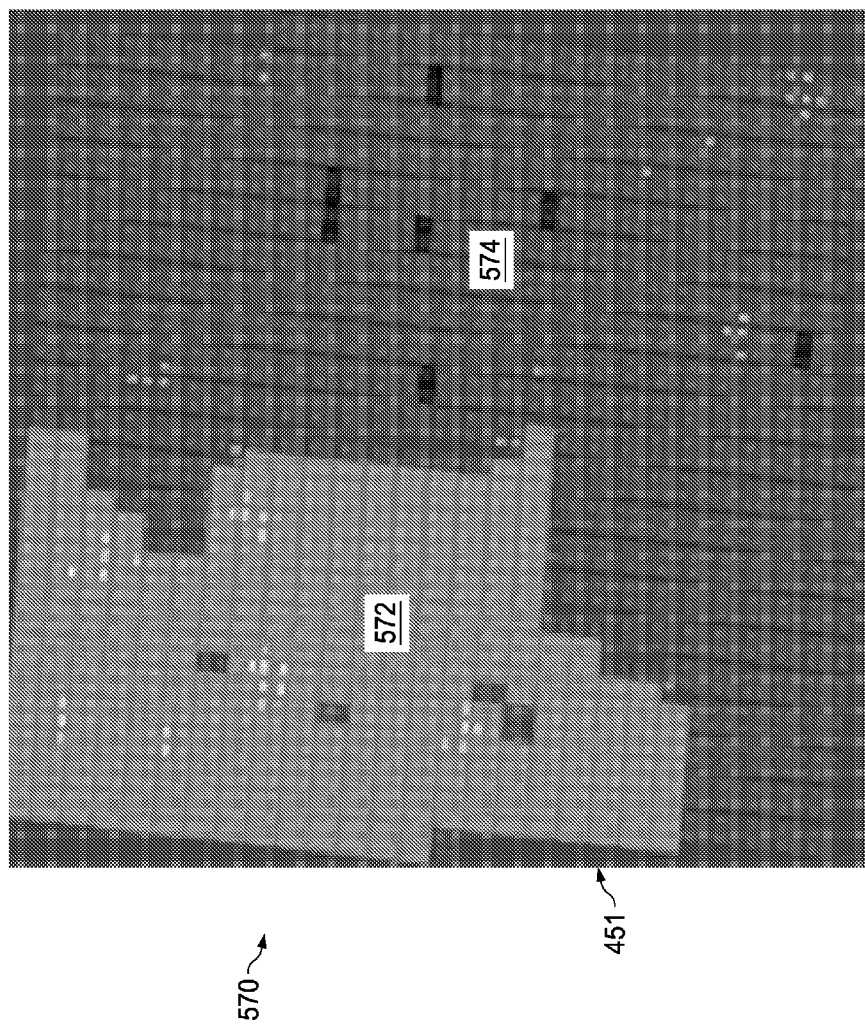

Referring now to FIG. 21, shown therein is a virtual representation 570 of the silicon lattice structure 451. In this regard, the virtual representation 570 includes terraces 572 and 574 that correspond to terraces 452 and 454, respectively. Further, as shown, the virtual representation 570 includes features representative of individual dimers across the sample 451, including dangling bonds and missing dimers. Using this virtual representation 570, a desired pattern layout can be applied to the sample 451 in a manner that takes into account the lattice structure, terraces, and properties of individual dimers to effectuate the most effective positioning of the pattern layout on the sample 451.

The direction and location of the dimer rows on each terrace are very important, as the relative position on the tip with respect to the dimer rows affects the efficiency of the H atom depassivation process. The edges of each terrace is defined by the step edges, and thus the location and type of step edges (i.e. A or B-type and single or double height) are also important. Different surface sampling techniques, which aim to provide the required information but without taking a complete scan of the whole area, have been developed within this invention, to allow for much faster exploration of the surface than a regular high-precision STM scan of the surface.

Figure 22:
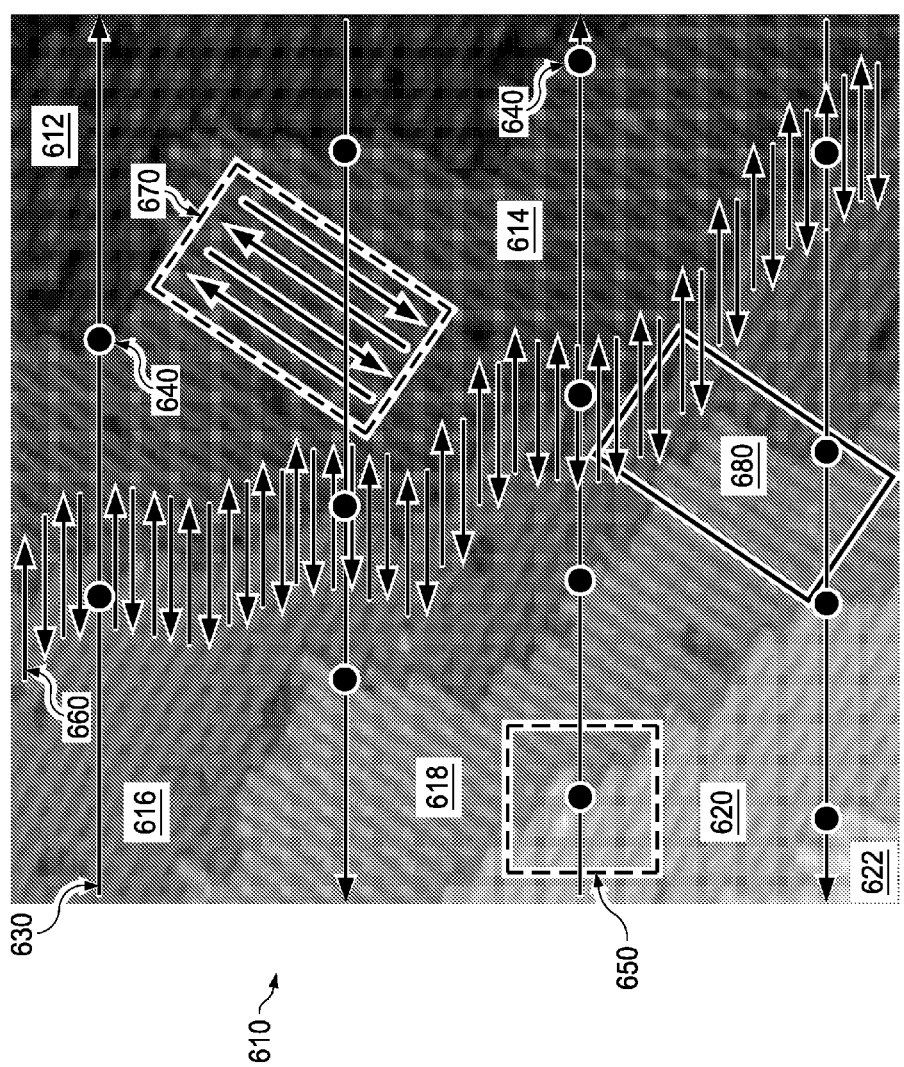
FIG. 22 is a diagrammatic schematic top view of a silicon lattice structure sample having multiple terraces illustrating a sampling technique that identifies important lattice features without having to image the entire area according to an embodiment of the present disclosure.

One embodiment of a surface sampling technique is described in FIG. 22. FIG. 22 shows an STM image of a section of the Si(001) surface 610, containing 6 different terraces 612, 614, 616, 618, 620 and 622, with the dimer rows changing direction at each step edge. The STM tip moves across the surface in a series of single scan lines, with much lower density than a typical STM scan, as indicated 630 in FIG. 22. As it moves across the surface, the tip will detect sudden changes in average height, as a step edge, 640 in FIG. 22. In some cases, these apparent step edges would in fact be a set of missing dimers. Therefore, for each apparent step edge, the tip would pause its scanning, and perform a small detailed scan over a limited area centered on the apparent step edge, 650 in FIG. 22. The purpose of the small scan is to determine the precise location of the step edge, its type (i.e. A-type or B-type) and the direction of the dimer rows of the terraces above and below the step. For a single step, the system will expect there to be a 90° rotation of the dimer rows from the top to the bottom of the step. For a double step, there will be no rotation in the dimer row direction, but there will be a shift in the dimer row position, and a much greater change in height.

If the position of the step edges is determined along each scan line, the approximate course of the step edge across the whole surface can be interpolated. In some cases, more detailed knowledge of the step edge position is required, e.g. if a write element may cross the step edge. In such cases, the tip can perform a dithered scan perpendicular to the step edge, moving along the step edge across the whole scan field. The center of the dithered scan would be adjusted to maintain the step edge in the middle of the scan, and the size of the dither would depend upon the roughness of the step edge. Thus the step edge position is completely determined, 660 in FIG. 22.

Either in addition to this, or in place of this scanning process, the tip may make a higher-resolution prescan of the location of each write element, to determine if the write element is contained within one terrace, as in 670 in FIG. 22, or crosses a step edge, as in 680 in FIG. 22. Depending on the result of this pre-scan, the tip will then assign local pixel positions, tip vectors for the write field, or even adjusting the position of the whole Write Element, when necessary, as described below.

Finally, as the dimer row direction should be constant across a whole terrace, and each single step is known to cause a 90° rotation in the direction of the dimer rows, the system can use the knowledge of the local dimer row direction to determine if any step edges have not been detected by the initial pre-scan. In such a case, the tip would perform further pre-scans to determine the location of any unidentified step edges.

Depassivation Lithography
Depassivation Process

The present disclosure utilizes the depassivation of a monolayer of atoms or molecules from a crystalline surface to create atomically precise patterns. For the sake of clarity, in the embodiments described below hydrogen depassivation from a silicon substrate will be utilized as the example. More specifically, the removal of hydrogen atoms from a Si (100) 2×1 surface will be described. However, it is understood that the present disclosure has application to other surface reconstructions, crystal faces, crystalline materials, and/or resist layers. In that regard, those of ordinary skill in the art will recognize that the principles of the present disclosure can be adapted to these other applications by taking into consideration the characteristics of the particular sample.

Depassivation lithography is distinct from any number of atomic and molecular manipulation processes where a scanning probe is used to find atoms or molecules on a surface and push, pull, or pick (and place) the atoms or molecules into place to form a pattern. For example, techniques are used such as those described in *Single Bond Formation and Characterization with a Scanning Tunneling Microscope*, H. J. Lee and W. Ho, Science 286, 1719-1722 (1999), which is hereby incorporated by reference in its entirety. In the molecular or atomic manipulation method it is required to deposit the species of interest on the surface, find a suitable number of these species and move them into place. Such a technique makes it difficult, if not impossible, to create large and/or complex patterns because it is difficult to get the right number of atoms or molecules on the surface. Further, such a manipulation method also requires that the tip come into physical contact with the atoms or molecules and the surface, which makes tip wear and/or other damage to the tip a concern. Depassivation lithography is also distinct from dip pen lithography and other processes that create patterns by depositing material from a tip on a surface.

Figure 25:
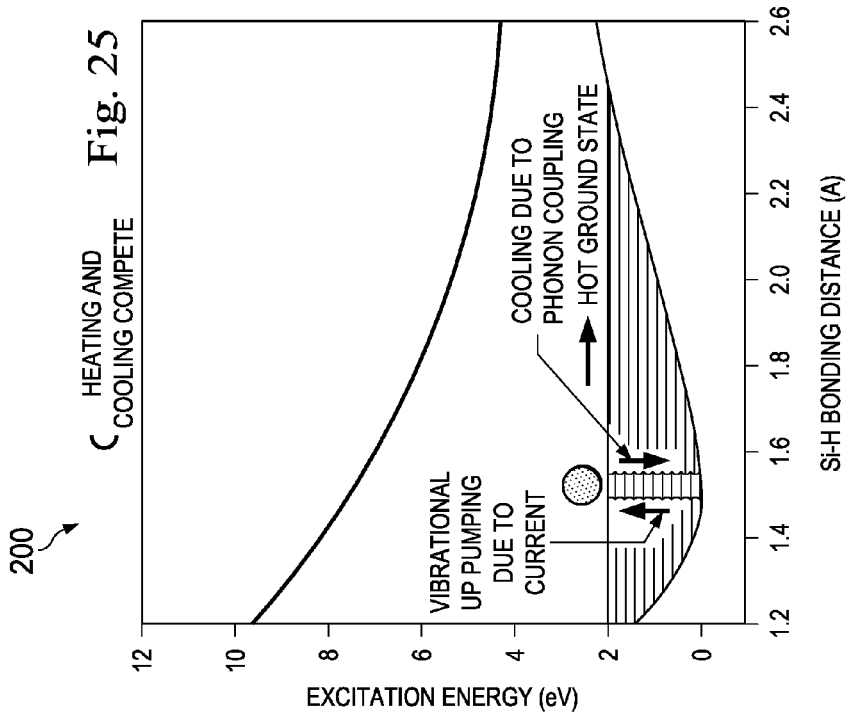
FIG. 25 is a graph illustrating the bond energy of a surface vibration as a function of bonding distance between silicon and hydrogen atoms.

Referring to FIGS. 23 and 24, shown therein are aspects of depassivation lithography according to aspects of the present disclosure. Referring more specifically to FIG. 23, the sample 102 is shown having a crystalline structure made up of a plurality of layers 130, 132, 134, 136, and 138. Each layer 130, 132, 134, 136, and 138 is a plane of the crystal 140. A resist layer 142 is formed over the top layer 130 of the crystalline structure. As shown, the resist layer 142 is a monolayer of atoms or molecules 144. Through the application of a bias voltage between the tip 104 and the sample 102 a current 146 is generated between the tip 104 and the sample 102 that excites one or more of the atoms or molecules 144 forming the resist layer 142. If the atom or molecule is sufficiently excited by the current 146, then the bond between the atom or molecule 144 of the resist layer 142 and the associated atom or molecule 140 of layer 130 will be broken and the released atom or molecule 145 will desorb into the vacuum of the STM system. In the illustrated embodiment of FIG. 23, the current 146 is associated with a low bias voltage such that a single atom or molecule 145 is removed from the resist layer 142. However, in other embodiments of the present disclosure a high bias voltage is utilized to remove more than one atom or molecule 145 from the resist layer at a time. For example, in the illustrated embodiment of FIG. 24, a current 148 is generated between the tip 104 and the sample 102 based on high bias voltage such that a plurality of atoms or molecules 145 are removed from the resist layer 142 as shown. FIG. 25 provides a graph 200 illustrating the energy in the Si-H stretch on Si(100) as a function of bond distance, where the limit of large bond distance indicates depassivation. The accepted model for how excitation energy is delivered from tip 104 to sample 102 in order to break the bond between silicon and hydrogen is shown for both the atomically precise and field emission modes.

Further the depassivation process is not restricted to hydrogen. Electron stimulated desorption with an STM from a Si surface has been demonstrated with a number of other species including deuterium, Cl, benzene, chlorobenzene, NO, and cyclopentene. Since electron stimulated desorption is a fairly general process, one skilled in the art, can see that many other possibilities exist. Similarly, the Si (100) surface, is not the only crystal surface that the present invention may be applied to. STM-based hydrogen desorption from Si (111), Ge (100), and C(100) have all been reported. While STM depassivation lithography is usually done at positive sample biases, it is also possible to depassivate with negative sample bias.

In some embodiments of the present disclosure, during depassivation lithography the sample is positive with respect to the tip so that electrons flow from the tip to the sample. In this regard, while hydrogen depassivation has been reported with a negative sample bias, the efficiency of the process is even worse than that of a positive sample bias and the mechanism of depassivation in this context is not well understood. On the other hand, the low efficiency of lithography at low negative sample biases permits effective imaging without imparting depassivation. Accordingly, in some implementations of the present disclosure the depassivation lithography patterning is performed with a positive sample bias, while imaging is performed with either a positive or negative sample bias.

At lower biases, for instance below approximately 7V, the flow of electrons is primarily tunneling from the tip to the sample and the efficiency of hydrogen removal is dependent on the current between the tip and sample, which is suggestive of a multi-electron process. While there is currently some controversy in the literature as to whether this is a multi-electron process, it is well established that the depassivation efficiency is strongly dependent on the bias. For example, the depassivation efficiency is very low at 2V and increases dramatically (for a given current) up to approximately 7V. At these low voltages (~1-5V), the tip is very close to the surface, reducing the interaction volume approaches the atomic scale, allowing atomic precision depassivation lithography.

In some implementations of hydrogen depassivation from a Si(100) surface, an atomically precise, low bias exposure mode used a 4V sample bias, a 4 nA current, and a scan speed of 10 nm/s [See, e.g., Shi Chen et.al. "Patterning of sub-1 nm dangling-bond lines with atomic precision alignment on H:Si (100) surface at room temperature", *Nanotechnology*. 2012 Jul. 11; 23(27):275301, which is hereby incorporated by reference in its entirety]. In use, this exposure mode resulted in a line width of 0.78 nm (the width of a single dimer row) with little to no depassivation outside of this line width when the tip was moved down the middle (+/−0.15 nm) of a dimer row. An area where the lithography has removed all, or substantially all (>=95%) of the hydrogen atoms is referred to as being fully saturated. For low bias atomically precise modes, the exposure regions are expected to be fully saturated with little or no partially saturated adjacent regions. An area where the lithography has removed between 5% and 94% of the hydrogen atoms is referred to as being partially saturated. Finally, areas where the lithography has removed less than 5% of the hydrogen is referred to as being unexposed or unsaturated. Other combinations of bias voltages, set point currents and scan speeds are used to remove a single row of hydrogen (i.e., half the width of a dimer row) and/or larger line widths (i.e., 1.5 dimer rows or larger). Lithography parameters for other crystals and resists, as well as at extreme temperatures, would likely differ from the exemplary case described here.

It has also been observed that there may be a relatively wide range of lithography parameters that yield a single dimer row wide depassivation pattern. For the Si(100)-H (2×1) surface, the arrangement of atoms on the surface result in a natural "boundary" for lithography to be confined to a single dimer row atomically precise conditions, with robustness both in position as well as in bias/current/dose. In the exemplary patterning case of Si(100)-H, a dimer row width may be a convenient pixel size even though single atom lithography has been performed. For other crystal surfaces, there may be favored line widths that determine pixel size and write directions, but they are not described in detail here.

The alignment of the tip to the silicon lattice structure can be important not only when defining the edges of the pattern features, but also can affect the writing process. For example, if the tip is within +/−0.15 nm of the center of a dimer row of a hydrogen passivated Si(100) sample when scanning along the dimer row in a low bias lithography mode, then both hydrogen atoms from each dimer are removed as the tip moves along the dimer row. However, when the tip is further than 0.15 nm away from the center of the dimer row, either only a single hydrogen atom on each dimer or, in some cases, neither hydrogen atom is removed.

The nature of the electron flow between the tip and sample also changes as the bias increases. At 2V, for example, the electron flow between tip and sample is dominated by tunneling from the tip to the sample. At higher biases, for instance 10V, the tip is in a field emission regime (e.g., Fowler Nordheim Tunneling) where the electrons tunnel from the tip into the vacuum and then accelerate through the vacuum to the sample. One indication of being in the field emission regime is significantly reduced resolution in imaging compared to direct tunneling. In the direct tunneling regime there is an exponential dependence on tunneling current with the distance between the tip and sample that leads to strong confinement of the areas of the tip and sample participating in the current flow. This limited interaction region results in good imaging and patterning resolution. On the other hand, in the field emission regime the electrons follow field lines once emitted into the vacuum from the sharp apex of the tip rather than finding the closest part of the sample to the tip. The electrons following the field lines results in a wider area of electron impact on the sample and, therefore, poorer imaging and patterning resolution. In the present disclosure with respect to hydrogen depassivation modes, low bias is considered to be below 7V, high bias is considered to be 7V or above. These values are somewhat arbitrary, but the 7V is chosen as the dividing point since above 7V the H depassivation efficiency is no longer a strong function of bias and a function of current but becomes a much weaker function of voltage and does not vary with current. The upper range on the high bias is approximately 100V, but in some implementations is higher.

Similarly, in some instances multiple high-bias modes are provided. Typically, for high bias modes there is in addition to the fully saturated exposed region, an adjacent partially saturated region. It is desirable to minimize the size of the partially saturated region in order to maintain the precision of the depassivation procedure. In this regard, by minimizing the size of the partially saturated region, the amount of time spent exposing the edges with a low bias mode to create atomically precise edge resolution is reduced. As the bias voltage is increased to increase the depassivation efficiency, the tip of the STM system is raised further away from the surface, which results in larger saturated and partially saturated regions. For a given high bias (e.g., above 7V), the depassivation rate (i.e., hydrogen atoms removed per unit of time) rises linearly with increased current. As the tip height is reduced to create the larger field necessary to generate the increased current, the lower tip height reduces the size of both the saturated and partially saturated regions. Accordingly, in some instances both the bias and the set point current are increased in order to increase the size of the fully saturated region, while minimizing to the extent possible the size of the partially saturated region.

Figure 26:
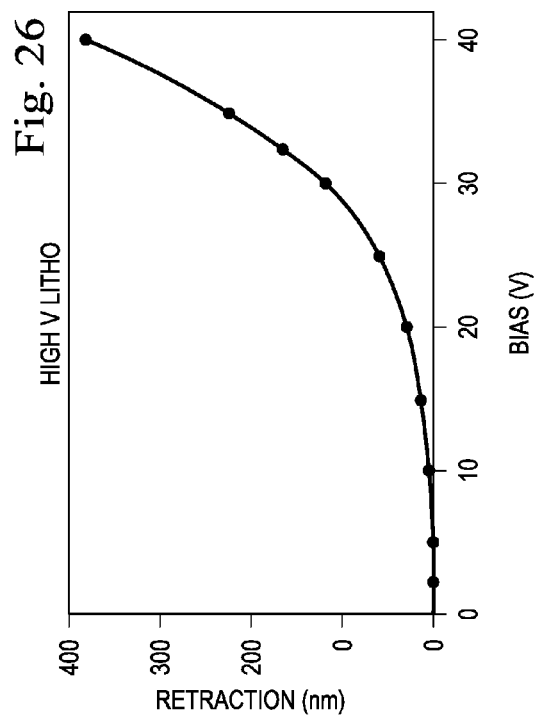
FIG. 26 is a graph illustrating the amount a tip must be retracted from the surface to maintain a constant current relative to bias voltage.

The present inventors have discovered that (1) the hydrogen depassivation efficiency that plateaus in the 7-10V range increases again at around 13V and (2) the depassivation efficiency is about an order of magnitude greater at approximately 30V than it is at 10V. For example, FIG. 26 shows a graph of the amount a tip must be retracted from the surface to maintain a constant current relative to bias voltage which results in larger spot sizes allowing the scanning time for a large region to be reduced. Due to these properties, there is an incentive to use higher biases in the hydrogen depassivation lithography process in order to decrease the amount of time necessary to create a desired pattern. As discussed above, with conventional e-beam lithography higher currents generally mean larger spot sizes, which limits pattern resolution. However, with hydrogen depassivation lithography using a STM, for a given bias larger currents are obtained by moving the tip closer to the sample. In the low bias regime (e.g., 4.5V and below), the tip is very close to the sample (e.g., —1 nm in some instance) and the primary electron transport between the tip and the sample is direct tunneling. If the tip is reasonably sharp, then the closer distance produces a higher current with no appreciable increase in the spot size or lithography features. In the high bias regime (e.g., 7V and above), the tip is positioned considerably farther from the surface, i.e. from 1 nm at 7V and 50 pA to 380 nm at 40V and 50 pA as shown in FIG. 26, and the tip operates effectively as a field emitter with the emitted electrons diverging at some angle from the apex of the tip. Accordingly, in high bias modes, the line widths of the resulting hydrogen depassivation can be significantly larger than the low bias modes but will lose some precision.

Line Widths

While there are other methods of exposure, such as discrete spot exposures that could be implemented in other embodiments, an exposure line produced by a tip scanning over a surface with a given set of exposure conditions (bias, set point current and scan speed) is a common mode of exposing patterns. It is often useful to have different exposure conditions (modes) for exposing the desired pattern. Two regimes have been identified: a Low Bias regime <7V bias, and a High Bias regime >=7V bias. In the ~1-4.5V portion of the low bias regime it is possible to get the line width of depassivation to be approximately 0.78 nm, or one dimer row on the Si(001) surface (under certain conditions a line width of a single atom (0.38 nm on a Si (001) surface), and a High Bias or Field Emission regime, where the line width is typically much larger than one dimer row.

Figure 27:
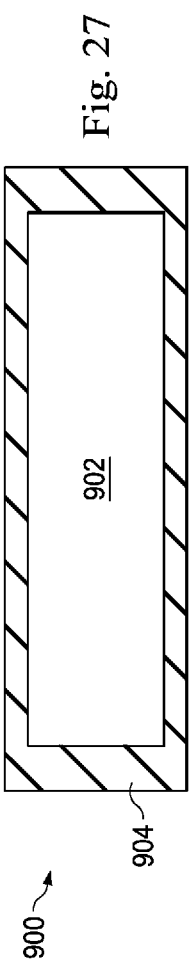
FIG. 27 is a diagrammatic top view of a line pattern having fully saturated and partially saturated portions according to an embodiment of the present disclosure.

More specifically, in addition to a fully saturated region (i.e., area in which all atoms or molecules are depassivated), there is a partially saturated region (i.e., area where some, but not all atoms or molecules are depassivated). For example, FIG. 27 shows a diagrammatic top view of a line pattern 900 having fully saturated and partially saturated portions according to an embodiment of the present disclosure. More specifically, the line pattern 900 includes a fully saturated region 902 where all atoms or molecules are removed by the depassivation line pattern and a partially saturated region 904 where some but not all of the atoms or molecules are removed by the depassivation line pattern. For comparison, an atomically precise low bias mode will include only fully saturated region 902 and will not include the partially saturated region 904. Because of the atomic precision of such a low bias mode, only the atoms or molecules that are intended to be removed will be removed by the depassivation process. Accordingly, a line pattern generated using such an atomically precise bias mode consists only of fully saturated region 902.

In conventional e-beam lithography, the sophisticated optical systems can control the spot size and shape with a variety of adjustments. In depassivation lithography, there is a much more limited range of options available to change the effective spot size of the depassivation process. The tip shape, especially in high bias modes, can affect the spot size. While creating tips with consistent structure is possible through various techniques (e.g., FDSS, Wolkow, etc.), there may be some variation in tip structure that makes it desirable in some embodiments to match the scanning speed and pattern to the effective spot size of the STM system. Accordingly, in some instances the spot size of the STM system is measured for a particular bias mode, or each of multiple bias modes, and the scan pattern and speed is adjusted based on the spot size measurement(s) associated with the bias mode(s). Alternatively, the bias, current, and scan speed can be adjusted based on spot size measurements to achieve a specific saturated line width consistent with the desired tip vector path for pattern exposure.

As these low bias and high bias exposure modes will be used to remove atoms or molecules as the tip is moving across the surface of the sample, there will inevitably be atoms or molecules that are intended to be removed by the depassivation procedure that are not removed for one reason or another or vice versa. Accordingly, in the context of the present disclosure, a fully saturated region of a pattern line is the region where at least 95% of the resist layer atoms or molecules have been removed and the partially saturated region of the pattern line is the region surrounding the fully saturated region where between 5% and 94% of the resist layer atoms or molecules have been removed. Accordingly, the areas of the sample outside of the pattern lines will typically have less than 5% of the resist layer atoms or molecules removed. These thresholds are somewhat arbitrary and their selection will depend on the processing that follows the lithography process. As mentioned above, patterned Si ALE and deposition of P atoms work well with these thresholds as an exposure of less than 5% comprises primarily single dangling bonds where no deposition takes place and 95% removal of H would allow deposition in the intended areas to proceed. For other processes, atoms, molecules, samples, etc., more or less stringent thresholds may be appropriate.

Figure 28:
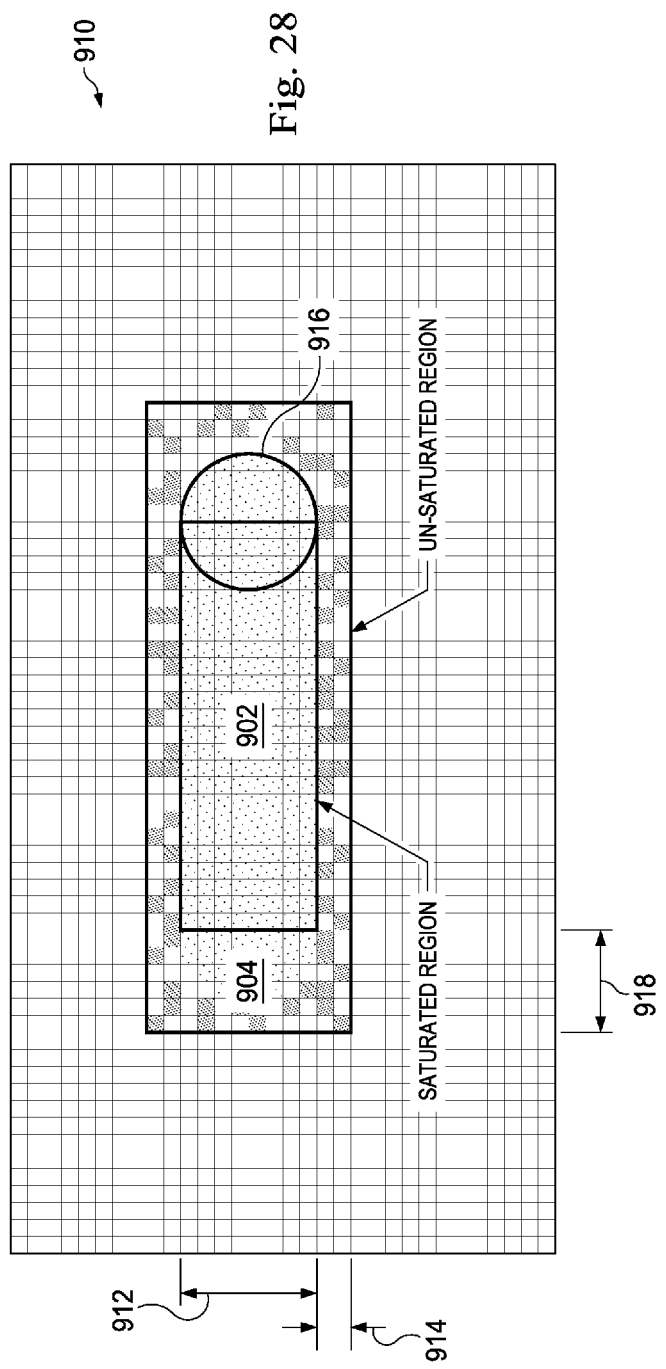
FIG. 28 is a diagrammatic top view of a sample showing a line pattern having fully saturated and partially saturated portions, as shown in FIG. 27, resulting from the application of a bias voltage to the sample according to an embodiment of the present disclosure.

Referring to FIG. 28, exemplary techniques for calculating these depassivation percentages for the various exposure modes will be discussed. In this regard, FIG. 28 shows a pixel grid (where in the present example each pixel is a pair of adjacent dimers on a dimer row) on sample 910 with a line pattern having a fully saturated region 902 and a partially saturated region 904 written thereon. The fully saturated region 902 is the area where at least 95% of the resist layer atoms or molecules are removed for the full line width over a length equal to ten times the line width. In the illustrated embodiment, the fully saturated region 902 has a width 912 that is eight pixels wide. In this context, the width 912 of the saturated region 902 in terms of pixels is based upon the registration of the pattern to the underlying lattice structure as discussed in other portions of the present disclosure.

The partially saturated region 904 includes sections extending along the length of the fully saturated region 902 (above and below in the illustrated embodiment) as well as sections extending perpendicular to the fully saturated region 902 at the ends of the fully saturated region 902 (left and right ends in the illustrated embodiment). The sections of the partially saturated region 904 extending along the length of the line pattern include the areas where between 5% and 95% of the resist layer atoms or molecules are removed when averaged over a length equal to ten times the fully saturated line width for that exposure mode. In the illustrated embodiment, the sections of the partially saturated region 904 extending along the length of the line pattern have a width 914 that is two pixels wide.

The widths of the sections of the partially saturated region 904 at the ends of the line pattern are typically larger than the width of the partially saturated regions extending along the length of the line pattern. For example, in some instances the widths of the line-end partially saturated regions are larger by approximately half of the fully saturated line width. This is due, in some implementations, to the approximately circular nature of the electron distribution from the tip in high bias modes. For example, in FIG. 28, the right end of the line pattern illustrates an exemplary circular profile 916 representative of a potential electron distribution from a tip. In the illustrated embodiment, the sections of the partially saturated region 904 extending perpendicular to the line pattern at the ends of the line pattern have a width 918 that is six pixels wide.

The specific definitions and calculations discussed above for defining fully saturated and partially saturated portions of a line pattern in the context of a bias mode are somewhat arbitrary and those of ordinary skill in the art will recognize that numerous other definitions and calculations can be used in a similar manner to define different exposure modes for use in the depassivation processes of the present disclosure.

While in some implementations a single low bias mode and a single high bias mode are provided by the STM system, in other instances more than one low bias mode and/or more than one high bias mode are provided. For example, in some instances multiple low bias modes are provided, where the first low bias mode provides atomically precise patterning at a first scan speed and with a first amount of error and the second low bias mode provides atomically precise patterning at a second scan speed that is slower than the first scan speed but with a second amount of error that is less than the error associated with the first low bias mode. As a result, when the most precise patterning possible is demanded, the second low bias mode can be utilized, recognizing that the increase in precision will result in a slower writing speed. It is understood that the first and second low bias modes may have different bias and/or current parameters in addition to the different scan speeds. It is further understood that any number of low bias modes may be provided for with the STM system and that the different combinations of bias, set point current, and scan speed for each low bias mode may be optimized for particular aspects of the pattern writing process, including writing speed, edge precision of the pattern, or otherwise.

In some implementations of hydrogen depassivation from a Si(100) surface, an atomically precise, low bias exposure mode used a 4V sample bias, a 4 nA current, and a scan speed of 10nm/s. In use, this exposure mode resulted in a line width of 0.78 nm (the width of a single dimer row) with little to no depassivation outside of this line width when the tip was moved down the middle (+/−0.15 nm) of a dimer row. Other combinations of bias voltages, set point currents and scan speeds are used to remove a single row of hydrogen (i.e., half the width of a dimer row) and/or larger line widths (i.e., 1.5 dimer rows or larger).

Similarly, in some instances multiple high-bias modes are provided. Typically, for high bias modes it is desirable to minimize the size of the partially saturated region in order to maintain the precision of the depassivation procedure. In this regard, by minimizing the size of the partially saturated region, the amount of time spent exposing the edges with a low bias mode to create atomically precise edge resolution is reduced. As the bias voltage is increased to increase the depassivation efficiency, the tip of the STM system is raised further away from the surface, which results in larger saturated and partially saturated regions. For a given high bias (e.g., above 7V), the depassivation rate (i.e., hydrogen atoms removed per unit of time) rises linearly with increased current. As the tip height is reduced to create the larger field necessary to generate the increased current, the lower tip height reduces the size of both the saturated and partially saturated regions. Accordingly, in some instances both the bias and the set point current are increased in order to increase the size of the fully saturated region, while minimizing to the extent possible the size of the partially saturated region.

There are also instances where minimizing the size of the partially saturated region is not a priority. For example, for interiors of relatively large pattern features and/or edges of patterns that do not require atomic resolution edge acuity, larger partially saturated regions may be tolerable such that the increased writing speed is worth the increase in the size of the partially saturated region. Accordingly, in some implementations a series of high bias modes with fully saturated regions of increasing size that have corresponding partially saturated regions that increase in size are provided such that the most efficient high bias mode can be selected for writing particular portions of the pattern. In this regard, examples of how particular write elements may be divided into multiple types of bias modes to increase the efficiency of the pattern writing process are discussed below. In some instances, the depassivation characteristics of each exposure mode (e.g., fully saturated line width, partially saturated line width along the length of the pattern line, and/or partially saturated line width at the end(s) of the pattern line) are taken into consideration when determining the particular exposure mode (or combination of exposure modes) utilized to generate a write element.

Pattern Placement and Execution
Scan Fields, Write Fields, and Write Elements

Referring now to FIGS. 29-32, shown therein are aspects of creating a desired pattern geometry by depassivating atoms or molecules from a lattice structure by defining scan fields and associated write fields based on the lattice structure, the surface features such as different terraces and characteristics of a STM according to an embodiment of the present disclosure.

Figure 29:
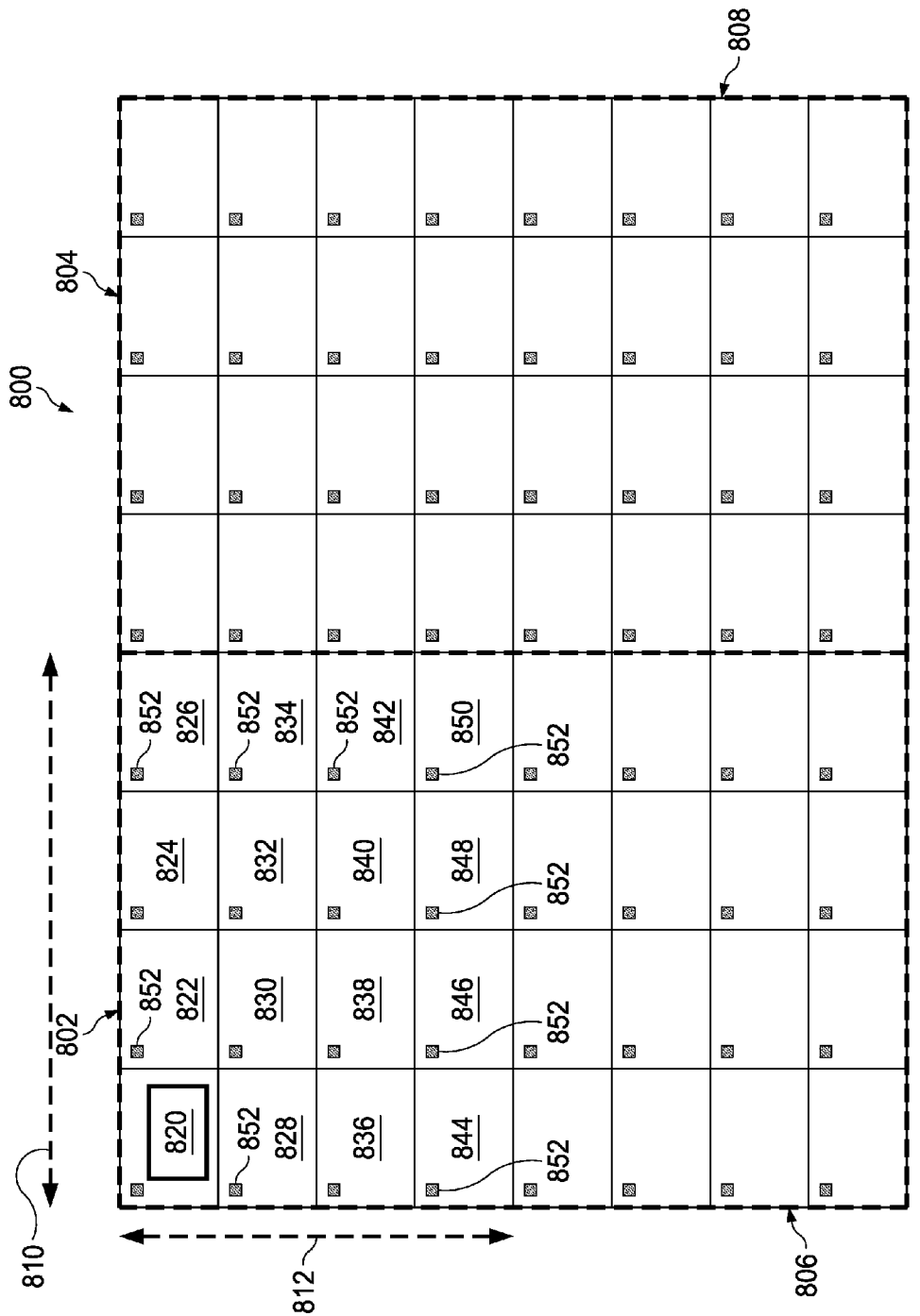
FIGS. 29-32 show aspects of creating a desired pattern geometry by depassivating atoms or molecules from a lattice structure by defining scan fields and associated write fields based on the lattice structure and characteristics of a STM according to an embodiment of the present disclosure.

Referring initially to FIG. 29, shown therein is a diagrammatic top view of sample 800 having a plurality of scan fields according to an embodiment of the present disclosure. In particular, overlaid on the sample 800 is a 2×2 array of scan fields formed by scan fields 802, 804, 806, and 808. The scan range of most fine motion actuators utilized to control movement of the tip of a STM system is a few microns. Accordingly, in some implementations the size of each scan field 802, 804, 806, and 808 is defined by the X-Y direction range over which the actuators can control movement of the tip with the required accuracy and stability. For example, in the illustrated embodiment the scan fields 802, 804, 806, and 808 have a width 810 extending in the X-direction and a height 812 extending in the Y-direction. In some implementations the width 810 and the height 812 are equal. In some instances, the width 810 is between about 0.5 μm and about 10 μm, and the height is between about 0.5 μm and about 10 μm, but alternate mechanical systems with improved stability may extend these distances.

Each of the scan fields 802, 804, 806, and 808 includes a plurality of write fields. In the illustrated embodiment, each scan field 802, 804, 806, and 808 contains a 4×4 array of write fields. For example, scan field 802 includes write fields 820, 822, 824, 826, 828, 830, 832, 834, 836, 838, 840, 842, 844, 846, 848, and 850. However, it is understood that each scan field may include a different number of write fields in other embodiments, ranging from a single write field to hundreds or more. In this regard, the size of the write field is selected such that movement within that single write field and between adjacent write fields can be considered atomically precise (at least when utilizing one or more of the control features of the present disclosure). In some instances, each write field has a width extending in the X-direction between about 20 nm and about 500 nm, and a height extending in the Y-direction between about 20 nm and about 500 nm. However, with improved stability systems these ranges may be expanded. Accordingly, write fields are typically smaller than scan fields and, therefore, a given scan field is made up of an array of similarly sized write fields. However, it is possible that in some instances the stability and resolution of the STM could allow the scan fields and the write fields to be the same size. For sake of clarity in describing the concepts of the present disclosure, in the following description the scan fields are understood to include an array of write fields.

In order to write a pattern on the address grid defined by the lattice structure in a manner that is precise and accurate with respect to both local and global aspects of the address grid, reference points or fiducial markers associated with the lattice structure are relied upon in some instances. Each write field of the scan fields 802, 804, 806, and 808 includes a fiducial mark 852 that allows the tip of the STM to be positioned with respect to it. The fiducial markers can be physical structures of the lattice structure that are located through imaging or some other process. The physical structures relied upon as fiducial markers can be existing features of the sample (e.g., step edges between terraces, dangling bonds, dimer vacancies, or other features identifiable on an image from a STM) or may be created by the STM system (e.g., portions of the written pattern, dangling bonds created specifically to serve as position markers, and/or other surface features defined by the STM system). Regardless of how they are defined, the fiducial markers are referred to during the pattern writing process in order to make sure that positioning relative to an absolute address on the patterning grid is maintained as the pattern is created.

In some instances, the lithography process is carried out by registering the tip of the STM system to a fiducial marker that establishes a reference to the address grid associated with the lattice structure for the sample area to be patterned. The address grid is then correlated to the pixels of the designed digital image defining the pattern to be exposed. The pixels of the digital image of the pattern can be defined as individual surface atoms/molecules or a group of atoms/molecules. In this manner, the pattern to be exposed is directly referenced to the surface of the sample. With the tip referenced to the fiducial marker, the tip moves to a part of the pattern near the fiducial marker and starts the depassivation lithography process. As elements of the pattern are written, portions of the pattern can themselves be used as fiducial markers, which can reduce the distance and time required to ensure that the tip is properly referenced to the address grid during the pattern writing process.

As discussed above, the error in position of the tip increases with time and distance traveled. Accordingly, in some instances the size of the write fields is selected such that the tip of the STM can write a fiducial mark in one write field by depassivating one or more atoms or molecules, register the fiducial mark position and record the exact pattern of the fiducial mark, and then move to an adjacent write field to write the fiducial mark for the adjacent write field with a very high confidence that the positional error will be a small fraction of the surface lattice spacing. With this low positional error as a result of the relatively short time frame and short movement between the write fields, the fiducial mark for the adjacent write field can be written and registered to the absolute address grid defined by the lattice structure. In some instances, measures are taken to track and take into consideration any step edges between fiducial marks (e.g., noting any changes in topography as the tip moves between positions when writing the fiducial marks). By repeating this process of writing fiducial marks in each write field, a fiducial grid array is defined across the write fields. The fiducial grid array can then be used to control the position of the tip with respect to the global design grid during the depassivation process.

Figure 30:
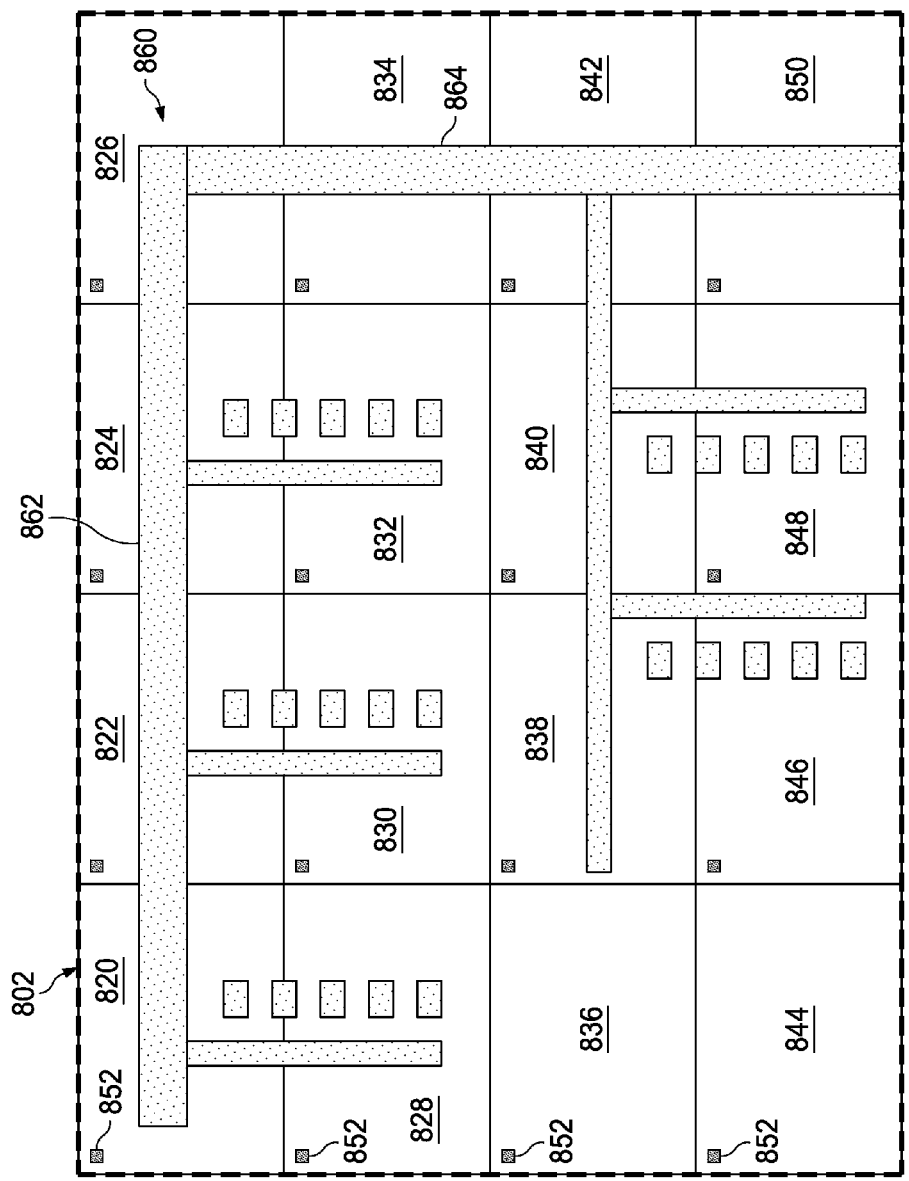

Referring now to FIG. 30, shown therein is a diagrammatic top view of the scan field 802 of FIG. 29 with a portion of a desired pattern 860 overlaid according to an embodiment of the present disclosure. As shown, the pattern 860 includes a plurality of pattern geometries that extend across the various write fields of scan field 802. In particular, sections of the pattern 860 extend over areas of write fields 820, 822, 824, 826, 828, 830, 832, 834, 838, 840, 842, 846, 848, and 850. As shown, the pattern 860 does not include any sections that extend across write fields 836 and 844. Some of the pattern geometries extend across multiple write fields. For example, a rectangular pattern geometry 862 extends horizontally from write field 820, across write fields 822 and 824, to write field 826. In a similar manner, some pattern geometries extend across multiple scan fields. For example, a rectangular pattern geometry 864 extends vertically from write field 826, across write fields 834, 842, and 850 of scan field 802, and continues into one or more write fields of scan field 806.

Figure 31:
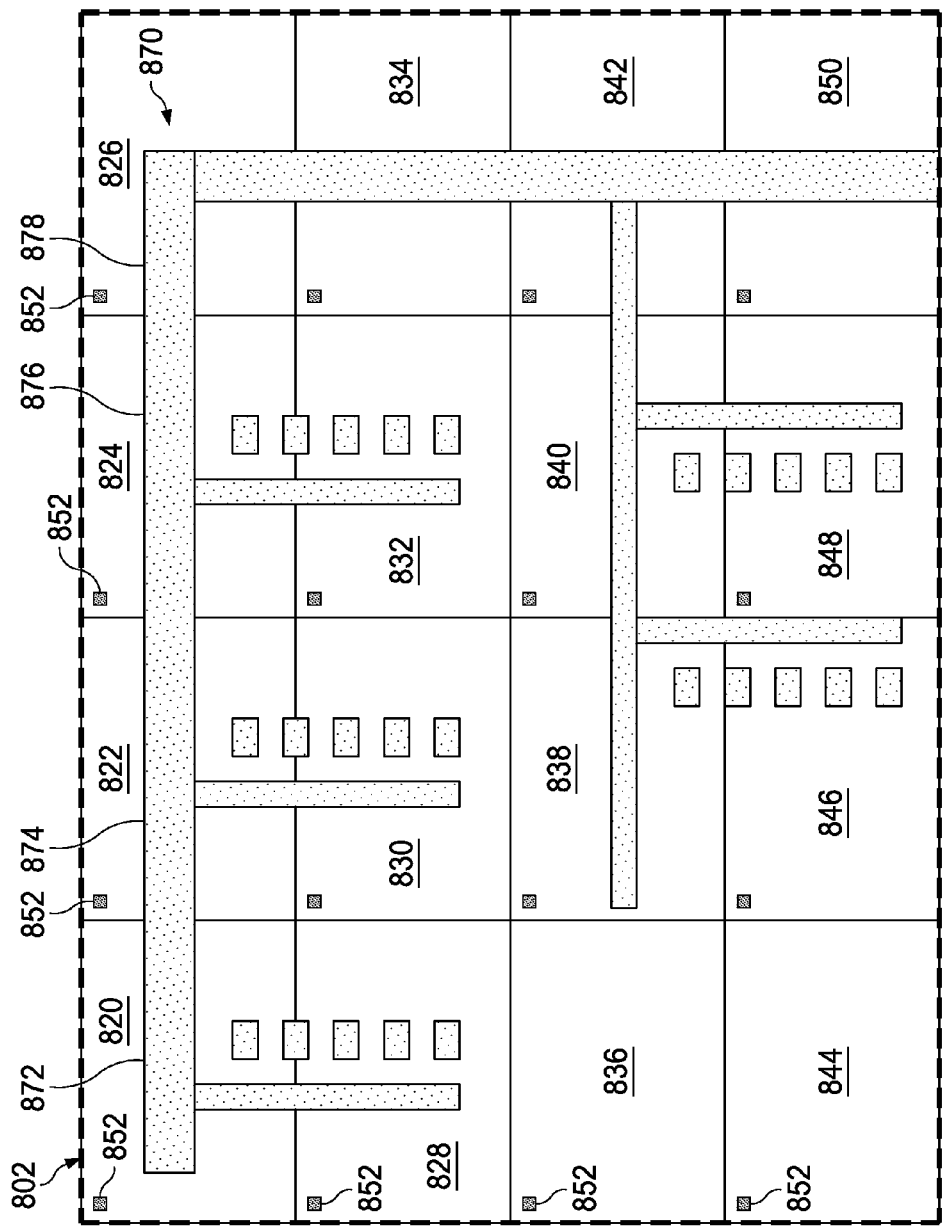

In order to ensure that the positioning of the tip of the STM system during depassivation results in forming the desired pattern 860, the pattern 860 is divided into a plurality of write elements across the plurality of write fields. For example, FIG. 31 shows a diagrammatic top view of the scan field 802 where the desired pattern 860 of FIG. 30 has been divided into a plurality of write elements across the plurality of write fields 820, 822, 824, 826, 828, 830, 832, 834, 838, 840, 842, 846, 848, and 850 according to an embodiment of the present disclosure. Pattern geometries that extend across multiple write fields are fractured or divided into multiple write elements corresponding to each of the write fields. For example, the rectangular pattern geometry 862 of FIG. 30 has been divided into a corresponding write pattern 870 consisting of write elements 872, 874, 876, and 878, where write element 872 corresponds to the section of rectangular pattern 862 within write field 820, write element 874 corresponds to the section of rectangular pattern 862 within write field 822, write element 876 corresponds to the section of rectangular pattern 862 within write field 824, and write element 878 corresponds to the section of rectangular pattern 862 within write field 826. Similar divisions of pattern geometries are performed for any pattern geometries that extend across a boundary between two write fields such that the entire desired pattern is defined by a plurality of write elements, each write element contained in a single write field. Pattern geometries fully contained within a single write field include a corresponding write element within the write field.

Figure 32:
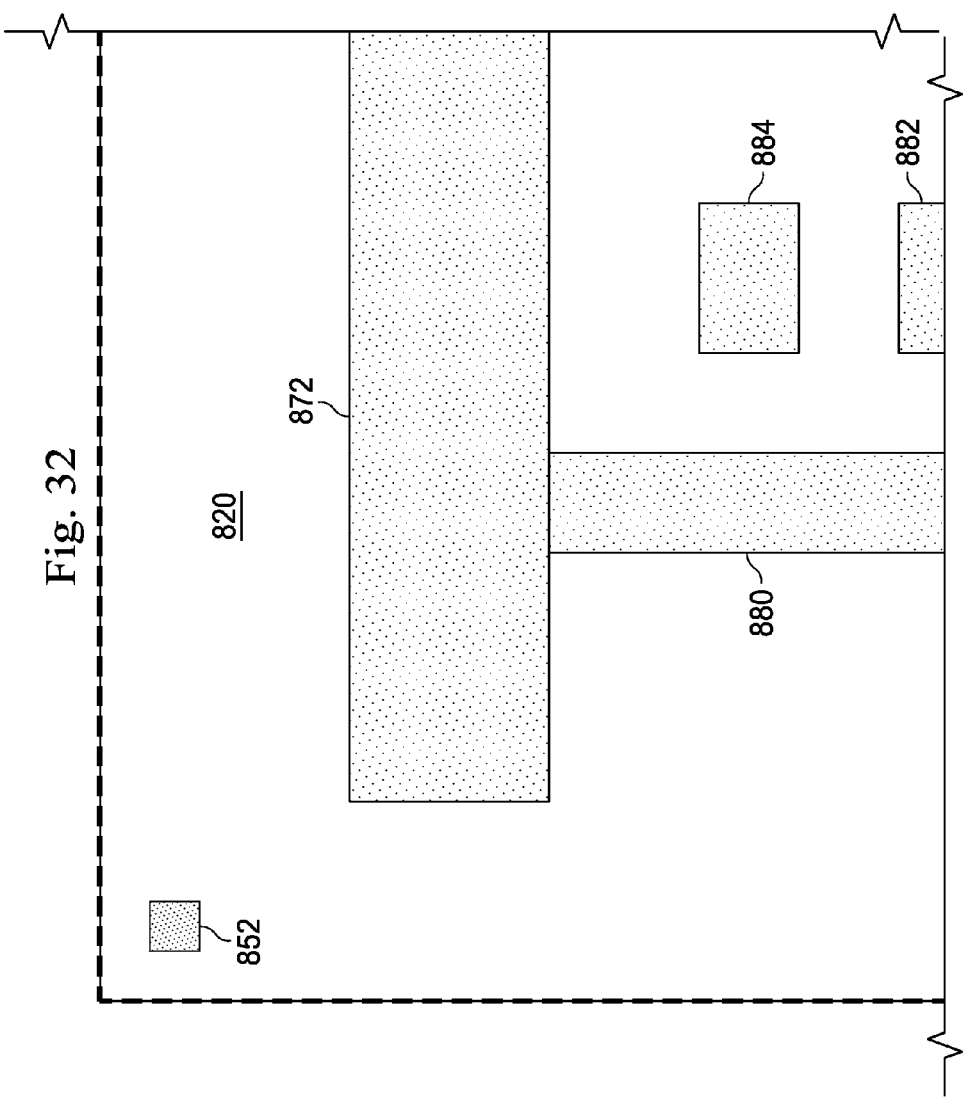

Referring now to FIG. 32, shown therein is a diagrammatic top view of write field 820 of scan field 802 of FIGS. 29-31 showing a plurality of write elements corresponding to a section of pattern 860 associated with write field 820 according to an embodiment of the present disclosure. As shown, the write field 820 includes write elements 872, 880, 882, and 884. Each of write elements 872, 880, and 882 is a section of a larger pattern geometry that extends across a boundary between write field 820 and an adjacent write field. For example, as discussed above write element 872 defines a section of rectangular pattern geometry 862 that extends horizontally from write field 820 to adjacent write field 822, through write field 824, and on to write field 826. Write element 880 is a section of a larger pattern geometry that extends vertically across the boundary between write field 820 and write field 828. Similarly, write element 882 is a section of a larger pattern geometry that extends across the boundary between write field 820 and write field 828. Finally, write element 884 is fully contained within the write field 820. That is, the entire outer profile of write element 884 is positioned within the boundaries of write field 820. While fracturing the pattern 860 into the plurality of write elements associated with each of the write fields provides a general outline as to how the depassivation procedure should be performed by the STM system, the particular manner in which the depassivation procedure is implemented takes several additional factors into consideration, including the lithography parameters to be utilized and the associated saturated and un-saturated line widths of such a bias voltage, the scan pattern(s) across the write elements, desired boundary precision for various parts of the pattern, and/or other factors involved with determining the variables used to implement the depassivation procedure.

Writing a Write Element —Tip Vectors

In some instances, each write element is fractured or divided into a plurality of sections based on the exposure mode(s) to be applied in a manner that takes into consideration the desired pattern accuracy while also trying to minimize the time needed to perform the patterning process.

As noted above, even with each write element fractured or divided into a plurality of sections based on the particular exposure mode(s) to be applied, it is still necessary to define how the tip of the STM should be moved across the write field to apply the selected exposure modes. In this and some following examples the patterns illustrated are small enough to be exposed entirely in the low bias, atomic-resolution mode. These patterning approaches can also be applied to the atomic resolution portions of write elements that also include high-bias portions.

Figure 33:
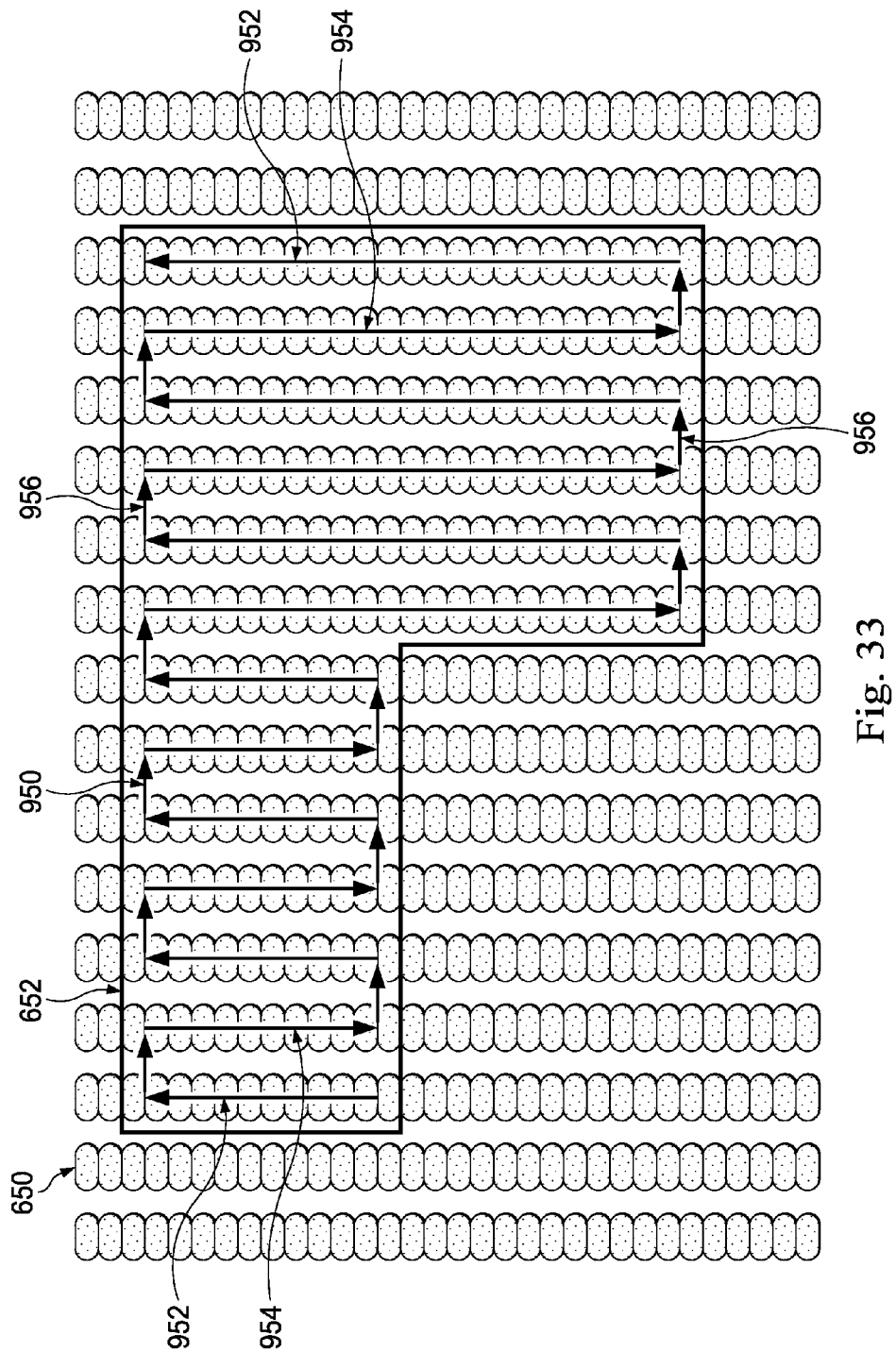
FIGS. 33-35 illustrate various write patterns for depassivating atoms or molecules from a lattice structure according to embodiments of the present disclosure.

In the context of hydrogen depassivation of a silicon (100) 2×1 surface, depending on the implementation, assuming an atomically-precise low-bias mode that has a fully saturated line width of 1 pixel, the tip is moved along the dimer rows (i.e., parallel to the dimer rows), moved across the dimer rows (i.e., perpendicular to the dimer rows), and/or combinations thereof. For example, FIG. 33 shows a diagrammatic schematic top view of the silicon lattice structure sample 650 with the desired pattern outline 652 with a write pattern 950 extending along dimer rows of the silicon lattice structure sample according to an embodiment of the present disclosure. As shown, the write pattern 950 includes an alternating series of tip vectors 952 moving up the dimer rows (as depicted in FIG. 33) and tip vectors 954 moving down the dimer rows. The tip vectors 952 and 954 are connected by transition tip vectors 956 that move the tip between dimer rows. By following the tip vectors 952, 954, and 956 the tip traverses the entire area outlined by the pattern 652.

Figure 34:
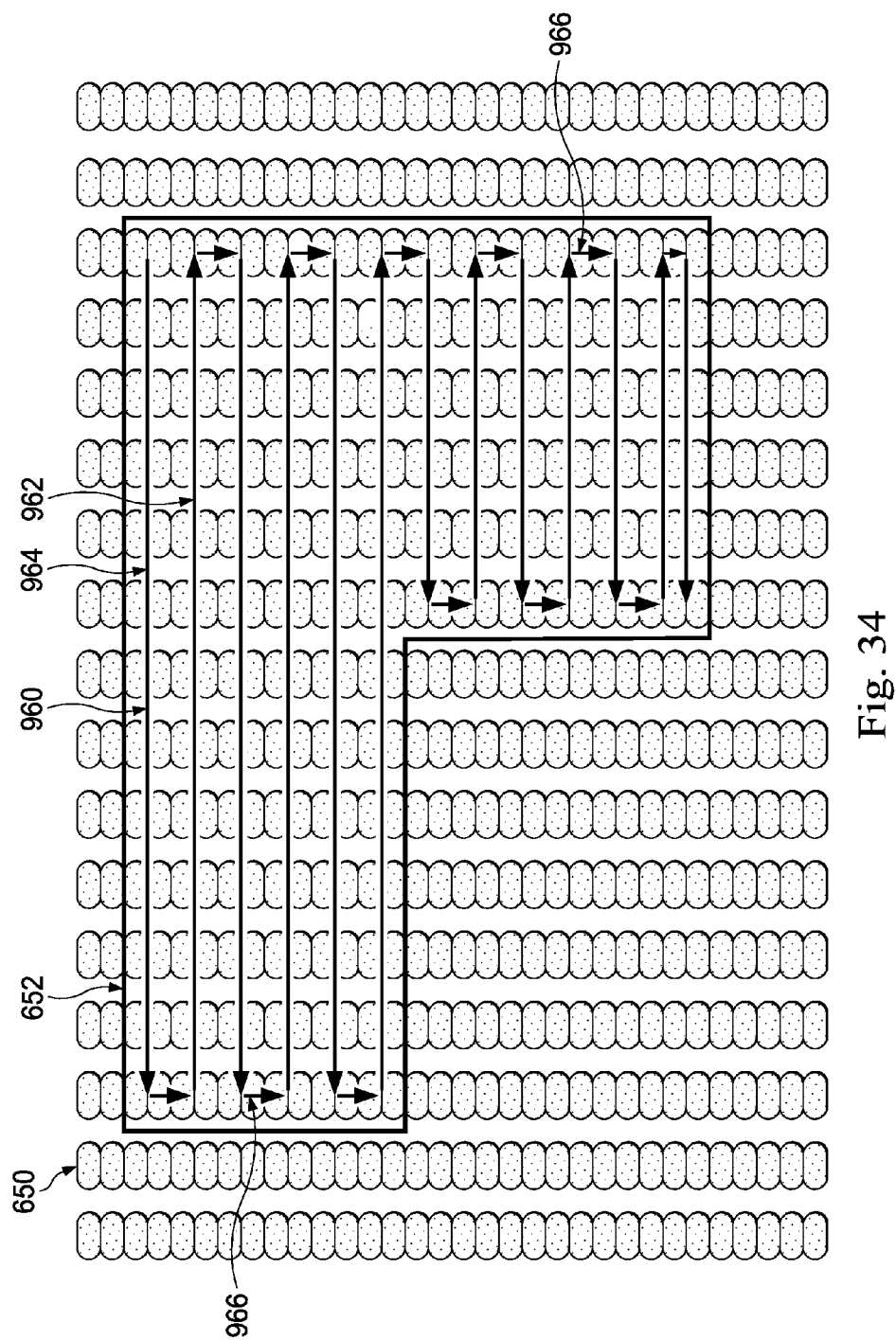

On the other hand, FIG. 34 shows a diagrammatic schematic top view of the silicon lattice structure sample 650 with the desired pattern outline 652 with a write pattern 960 extending across the dimer rows of the silicon lattice structure sample according to an embodiment of the present disclosure. As shown, the write pattern 960 includes an alternating series of tip vectors 962 moving across the dimer rows left to right (as depicted in FIG. 34) and tip vectors 964 moving across the dimer rows right to left. The tip vectors 962 and 964 are connected by transition tip vectors 966 that move the tip along the dimer row to the position for the next tip vector 962, 964. By following the tip vectors 962, 964, and 966 the tip traverses the entire area outlined by the pattern 652.

Figure 35:
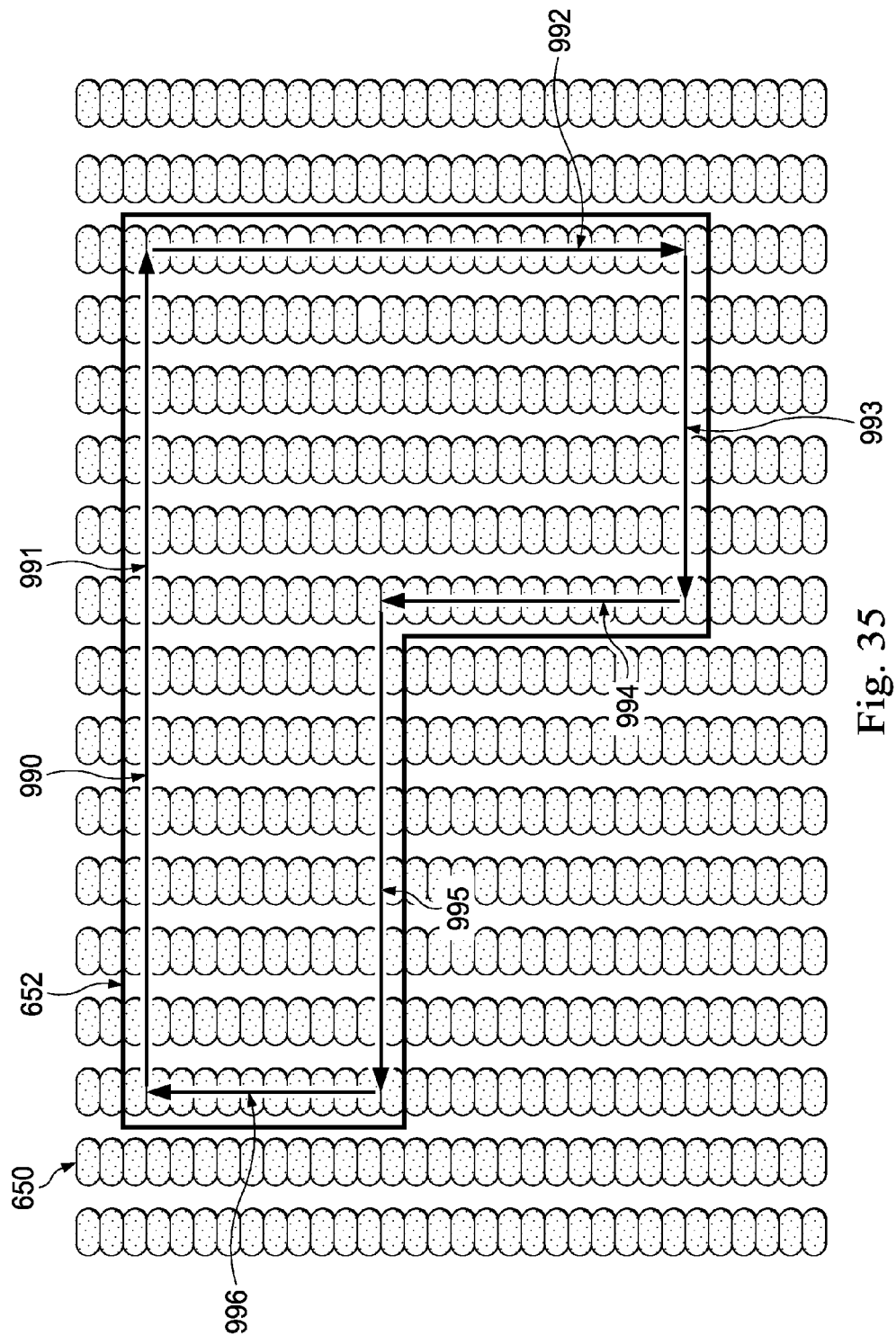

FIG. 35 is a diagrammatic schematic top view of the silicon lattice structure sample 650 with the desired pattern outline 652 illustrating a write pattern 990 according to an embodiment of the present disclosure. As shown, the write pattern includes a series of tip vectors 991, 992, 993, 994, 995, and 996 that follow the outline of the desired pattern geometry 652. As shown, tip vectors 991, 993, and 995 go across the dimer rows (as depicted in FIG. 35), while tip vectors 992, 994, and 996 go along the dimer across the dimer rows to follow the outline of desired pattern 652. In this manner, the tip vectors 991, 992, 993, 994, 995, and 996 follow the desired pattern outline regardless of orientation with respect to the dimer rows. In some instances, one or more of the tip vectors 991, 992, 993, 994, 995, and 996 are written with an atomically precise low bias mode that ensures atomic precision of the removal of the resist layer atoms or molecules associated with that tip vector. In this manner, all of the sections of the outer boundary of the pattern 652 that are to be written with atomic precision achieve the desired line precision. The remaining inner portion of the pattern 652 can be filled in using any of the write patterns disclosed herein. In some embodiments, the inner portion of the pattern 652 will be written in a high bias mode to facilitate faster pattern completion. By following the boundary tip vectors 991, 992, 993, 994, 995, and 996 and an associated set of tip vectors for the inner portion of the pattern, the tip traverses the entire area outlined by the pattern 652.

It is understood that these exemplary line patterns do not provide an exhaustive list of approaches, but rather indicate the types of variations of line patterns that may be utilized. It is understood that other patterns, including a raster scan approach or combinations of and/or variations to the disclosed patterns, are used in some instances. Further, with any of these scan patterns, instead of utilizing a constant speed scan, feedback controlled movement of the tip can be implemented where the tip moves a short increment (e.g., equal to dimer spacing or instance) and remains motionless until either a specific tip height is detected (indicating that the tip is positioned over a dangling bond) or a current spike is detected (indicating that a depassivation event has occurred). Due to the decrease in scan speed, such feedback controlled movement of the tip is likely only to be used in the context of low bias modes where atomically precise line precision is needed. Further, if and when there is concern about a missed atom or molecule and/or repassivation, a second pass across the write element, or section thereof, can be performed. In this regard, the same scan pattern or a different scan pattern may be used for the second pass. In some instances, a different scan pattern is intentionally utilized for the second pass in an effort to eliminate any adverse effects resulting from the scan pattern itself.

Maintaining Registry with the Design Grid

Referring now to FIGS. 36-39, shown therein are aspects of writing a desired pattern geometry by depassivating atoms or molecules from a lattice structure according to an embodiment of the present disclosure.

Moving Within a Scan Field

Figure 36:
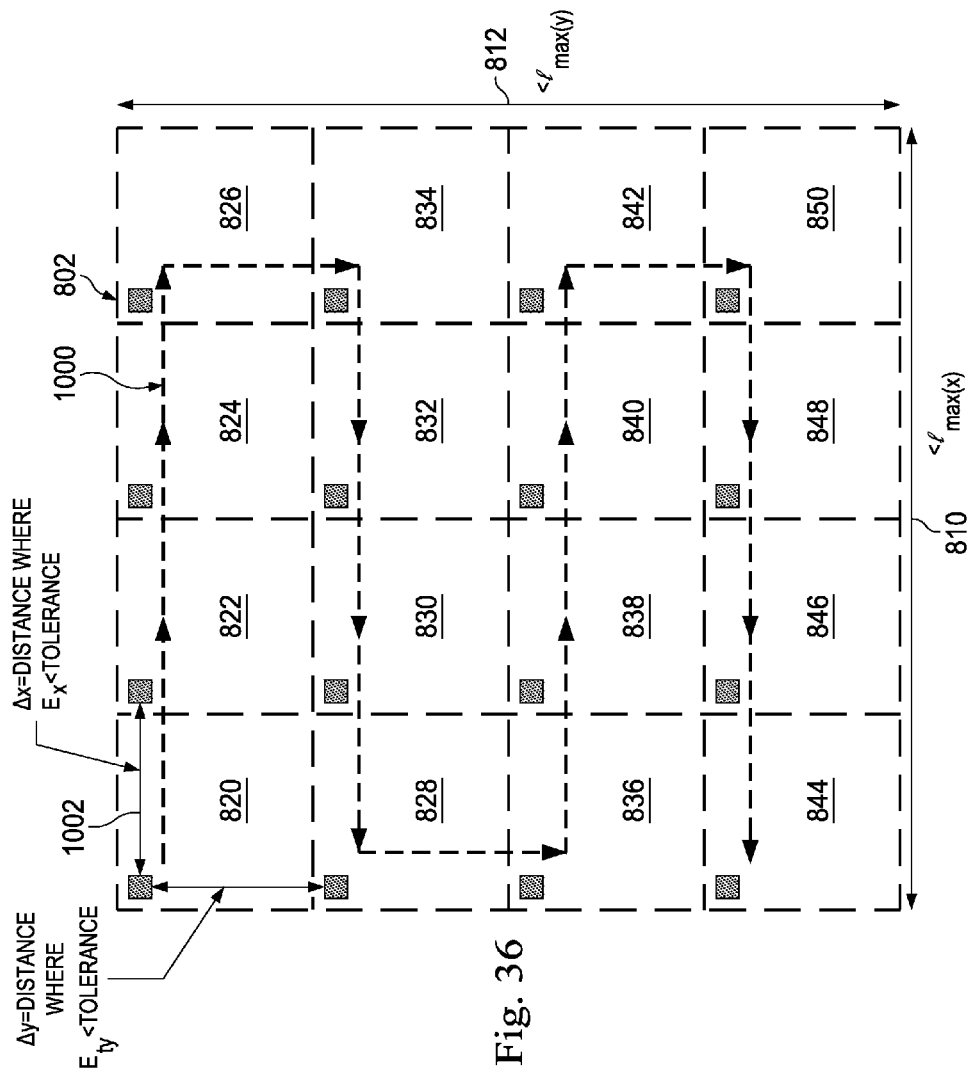
FIG. 36 is a diagrammatic top view of a scan field having a plurality of write fields showing an exemplary path across the plurality of write fields for generating fiducial markers within each write field according to an embodiment of the present disclosure.

Referring to FIG. 36, shown therein is a diagrammatic top view of the scan field 802 comprised of write fields 820, 822, 824, 826, 828, 830, 832, 834, 836, 838, 840, 842, 844, 846, 848, and 850 showing an exemplary path 1000 across the plurality of write fields for generating and/or identifying fiducial markers within each write field according to an embodiment of the present disclosure. As discussed above with respect to FIGS. 29-32, the write fields 820, 822, 824, 826, 828, 830, 832, 834, 836, 838, 840, 842, 844, 846, 848, and 850 are sized such that movement within a single write field and between adjacent write fields is atomically precise (within a given error tolerance). In some instances, each write field has a width extending in the X-direction between about 20 nm and about 500 nm, and a height extending in the Y-direction between about 20 nm and about 500 nm. However, systems with improved stability might allow this range to be expanded.

Further, each of the write fields 820, 822, 824, 826, 828, 830, 832, 834, 836, 838, 840, 842, 844, 846, 848, and 850 includes a fiducial marker 852. In some implementations, the fiducial markers 852 have a specific geometric pattern. For example, in some instances the fiducial markers 852 have a rectangular or square profile defined by a fixed number of pixels in the X and Y directions. As the fiducial markers 852 can be defined by only a few pixels (e.g., 2×2 array in some instances), the fiducial markers can be written quickly and imaged to determine proper alignment with the lattice structure. In some instances, the fiducial markers are formed at the same relative location within each of the write fields 820, 822, 824, 826, 828, 830, 832, 834, 836, 838, 840, 842, 844, 846, 848, and 850. Accordingly, in such instances the fiducial markers 852 are spaced from adjacent fiducial markers in the X-direction by the width of the write fields and are spaced from adjacent fiducial markers in the Y-direction by the height of the write fields. For example, FIG. 36 shows that the fiducial marker of write field 820 is spaced from the fiducial marker of write field 822 by a distance 1002 that is equal to the width of the write fields and is spaced from the fiducial marker of write field 828 by a distance 1004 that is equal to the height of the write fields. Accordingly, in some instances an initial step of the depassivation process is creating and/or identifying the fiducial marker(s) associated with each write field. In some instances, there are circumstances where flawless matching of a pattern across write fields is highly desirable. In such instances, using fiducial markers in an adjacent write field near or at the edge of the current write field can help ensure proper stitching of the pattern across the write fields.

In the illustrated embodiment, the tip moves between the write fields 820, 822, 824, 826, 834, 832, 830, 828, 836, 838, 840, 842, 850, 848, 846, and 844 of the scan field by following the path 1000. By identifying and tracking step edges when writing the fiducial array across the write fields 820, 822, 824, 826, 828, 830, 832, 834, 836, 838, 840, 842, 844, 846, 848, and 850, the system can adjust the location of the fiducial markers within each write field to account for pixel shifts and/or otherwise keep track of the step edges to minimize positioning errors. Further, information about the location of step edges collected while writing the fiducial array can be utilized in subsequent aspects of the depassivation procedure, including determining pattern layout. Accordingly, in some instances an imaging mode is applied when moving the tip between fiducial marker positions of adjacent write fields. This topological information is utilized in some implementations as part of the scheme(s) to locate and deal with step edges during the depassivation process. Some different ways of dealing with step edges are described below.

As noted above, it is not necessary that the fiducial markers be written to the write fields. For example, when pre-scanning a write field reveals one or more identifiable surface features, such as step edge features, dimer vacancies, and dangling bonds, these surface features and associated positions can be used as a fiducial marker. Further, as will be discussed below, in some implementations an area around each fiducial marker is designated as a forbidden zone such that no portion of a write element is able to be positioned within the forbidden zone. Inevitably, including such a forbidden zone around each fiducial marker will interfere with a desired pattern layout. In some instances, this potential problem is eliminated by simply having any portion of the write element positioned within the forbidden zone written last within the write field such that there is no further need to reference the fiducial marker. In other instances, the portion of the write element positioned within the forbidden zone can be written once another suitable fiducial marker is created within the write field as a result of writing the pattern. For example, in some instances the system utilizes a portion of the pattern, such as the corner of a rectangle, as a fiducial marker in order to reference the tip position to the absolute registration of the lattice sample. In yet other instances, an additional fiducial marker is written within the write field, but outside the boundaries of any write elements of the write field. Further, in some instances there will be one or more write fields that are to be completely exposed. Accordingly, in such instances it is likely that the depassivation will be carried out with a high bias mode such that it is not necessary to inspect for step edges, dangling bonds, or vacancies and, in some instances, even the registration to the fiducial marker is not required for some write fields. Thus, in some implementations one or more of the steps of creating or identifying fiducial markers, registering to fiducial markers, and/or imaging to identify surface features can be scaled back or eliminated for these write fields.

Because each fiducial marker (or other dangling bond feature written by the tip) that is in a known position on the fiducial grid can be used as fiducial marker, there is no need to return to a single, global fiducial mark that may not be near a particular write field. This is because the constant periodicity of the Si(100) lattice structure prevents an accumulation of errors in the location of the fiducial markers. As a result, the array of fiducial markers created by forming a fiducial marker in each write field (and tracking terrace changes) provides the necessary alignment to the lattice structure to facilitate the creation of atomically precise structures.

While absolute precision is the goal for writing the fiducial markers to the write fields, there is a non-zero chance of creating a fiducial marker that is not perfect for one reason or another. However, once a fiducial marker is written it can be imaged and the particular pattern for the fiducial marker (even if not the desired pattern) can be recorded and associated with that particular write field. Accordingly, when returning to that specific fiducial marker an autocorrelation of the stored image and a fresh scan of the fiducial can account for any deviation from a perfectly formed fiducial marker and, therefore, would not negatively impact the tip alignment process for the write field. In this regard, when registering the tip to a fiducial marker, whether it is part of the array of written fiducial markers, part of a previously written pattern, and/or an identifiable portion of the sample structure, there are a number of different techniques that can be used to identify the position of fiducial marker and register the tip position to the fiducial marker. For example, one method to ensure that the fiducial marker is found and registered to is to perform an image scan on every write field. Such an approach also ensures that sample defects (dangling bonds, vacancies, step edges, etc.) are detected. The scan speed and density of scan lines can be selected to trade off image resolution for shortened scan time. For instance, a scan that included one scan line per dimer row is sufficient to detect the majority of defects. If more details of a detected defect are needed, then additional scanning only in the defect area can be carried out. For instance a relatively low density scan can detect if there was a step edge in the write field. Smaller high resolution scans can then be carried out along the step edge to image all of the relevant details. In some instances, image analysis of a high resolution scan of a region of the write field containing the fiducial marker is utilized. In other instances, a lower resolution scan of the region of the write field containing the fiducial marker can be utilized to identify two or more of the edges of a fiducial marker and those edge positions can be utilized to register the tip position.

Other, tip registration techniques may also be utilized. For example, Hastings and Smith (See, e.g., Hastings et al. *J. Vac. Sci. Technol. B* 18, 3268-3271 (2000), hereby incorporated by reference in its entirety) have developed a method of using information from a global fiducial grid during writing with conventional e-beam lithography to keep the pattern placement accurate. A similar approach can be utilized for the depassivation lithography of the present disclosure where the global fiducial grid is the crystal lattice.

Moving within a Write Field

A general strategy for doing depassivation lithography in accordance with the present disclosure that maintains registration of the tip to the lattice structure based on the fiducial markers is to characterize the stability of the system so that there is a known length of time where the uncertainty in position remains significantly less than the pitch of the address grid. For example, in the case of a silicon lattice structure, for a Si (100) 2×1 surface the pitch is 0.384 nm along the dimer row and 0.768 nm dimer row to dimer row. Accordingly, in some instances, the maximum allowable uncertainty in position of the tip is 0.192 nm. If the tip position cannot be determined within this tolerance, then the registering of the tip to the absolute reference would be lost. Accordingly, in some implementations the system periodically checks the tip position relative to the lattice structure to maintain accurate patterning.

Figure 37:
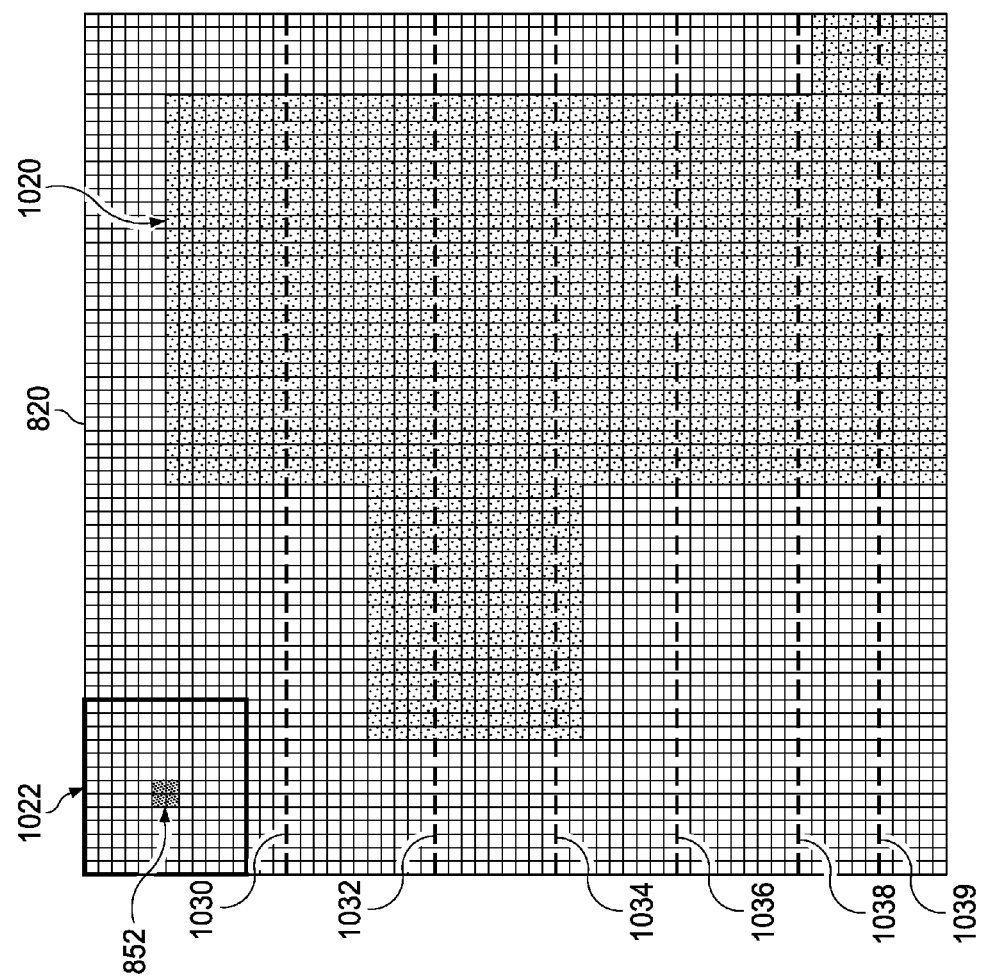
FIG. 37 is a diagrammatic top view of a write field of the scan field of FIG. 36 according to an embodiment of the present disclosure.

For example, FIG. 37 provides a diagrammatic top view of the pixel grid of the write field 820 of the scan field 802 that has a desired pattern 1020 according to an embodiment of the present disclosure, where a series of re-scan positions have been identified. In particular, lines 1030, 1032, 1034, 1036, 1038, and 1039 represent points in the depassivation patterning process within write field 820 when the tip will check its position relative to the silicon lattice structure by re-scanning the fiducial marker 852 or other identifiable portion of the pattern (e.g., one of the written corners). For example, if it is presumed that the depassivation procedure proceeds from the top of the write field down, then the tip will initially register with the fiducial marker 852 and write the pattern until reaching line 1030, at which point the system will check the tip position relative to the lattice structure again by referencing the fiducial marker 852 or one of the corners of the written pattern. This process will be repeated upon the tip reaching each of the lines 1032, 1034, 1036, 1038, and 1039. The number of times and associated frequency that the tip position is checked may be determined based on the desired precision of the pattern, the scan speed of the tip, the size of the write element(s), and/or other factors. This may result in more frequent checking of the desired position in sections where more lithography is performed, and/or more frequent position checking when the desired lithographic segment is farther from the fiducial marker 852.

In some instances the tip position is checked relative to the silicon lattice structure, either clean or hydrogen passivated, such that a relative lock to the address grid could be assured. In some instances, a vertical hill climb is performed in order to reestablish the tip's reference to the lattice structure. In this regard, a vertical hill climb is a method where the tip continually moves to the highest vertical point within a very small area to identify a local maximum that will be associated with an atom or a dimer row on the surface, which facilitates a relative lock to the lattice. In other instances, the tip position is checked relative to a written feature or pre-existing feature of the sample (e.g., a dangling bond fiducial pattern, an existing dangling bond, step edges, dimer vacancies, etc.) that has a known relationship to the absolute reference of the lattice structure.

The alignment of the tip to the silicon lattice structure can be important not only when defining the edges of the pattern features, but also can affect the writing process. For instance, as mentioned in the depassivation lithography section, when writing on a hydrogen passivated Si(100) sample there is a tolerance of +/−0.15 nm for successful patterning. If such depassivation techniques are to be relied upon and utilized to create atomically precise patterns, then a higher tip positioning accuracy is required than that necessary for simply keeping a lock on the absolute grid address of the silicon lattice structure.

When writing in the high bias modes, the patterning is not as precise and, therefore, the resulting features of the high bias modes cannot generally be relied upon to reference the tip to the absolute address grid of the lattice structure. However, due to the lower precision, the need for tip position accuracy is not as high when patterning in the high bias modes. Therefore, the time between re-referencing the tip to absolute address grid can be increased relative to the low bias modes. Accordingly, in some instances it is desirable to form the high resolution portions of the patterns using the low bias modes first, such that aspects of those high resolution portions can be utilized as a local fiducial marker that can be accessed as needed when subsequently forming the lower resolution portions of the patterns in the high bias modes.

Maintaining Registry while Patterning

The low-bias lithography modes also have a high resolution of the surface details. In this regard, similar to the imaging mode, the tip operates in the tunneling regime in the low bias modes and, in some instances the feedback control loop is still on to control the tip position. As a result, high resolution topographical information is also obtained in the low bias modes. Of course, in the lithography mode dangling bonds are constantly being created, but as mentioned below, some of the written pattern features from the low bias exposure modes can be utilized as to maintain the accurate absolute registration of the tip to the address grid of the lattice structure. In high bias exposure modes where the tip emission is in the field emission regime, the feedback loop is still on in some instances but the resulting imaging resolution is typically much poorer and, therefore, is much more difficult to use for referencing.

In some implementations, the position of the tip is checked during the patterning of a single pattern element. For instance, consider the writing of a rectangle of arbitrary size that is contained within a scan field. After the tip position has been verified to be aligned correctly with the absolute grid address, a single pixel line around the periphery is written, without reference to the surface, by the calibrated or closed loop positioning system. In some implementations, this outer boundary is written in the time frame that allows for the patterning to be completed before drift or other effects would have a meaningful chance of causing the tip to lose the absolute reference. If the time needed to write the boundary is longer than can be safely presumed to avoid such effects, then a re-referencing of the tip to the fiducial mark can be performed and the creation of the outer boundary resumed.

Once the outline of the rectangle is complete, the tip can move along the inside of the written periphery to expose lines of pixels one after another (e.g., in a serpentine pattern) until all pixels are written. In some instances, the feedback loop is still on during this process and the tip responds to the tails of the dangling bonds of the pixels on the adjacent line. Accordingly, as the tip proceeds along the line that it is writing, the average height of the tip increases as the tip drifts closer to the previously written line and decreases as the tip drifts away from the previously written line. This tip height variation can be used to keep the tip centered in the line of pixels that it is writing. As the tip approaches the periphery of the rectangle that was already written, the increase in tip height due to the already written dangling bond of the outer boundary provides a clear indication of the tip position in the orthogonal direction.

Coarse Positioning

Figure 39:
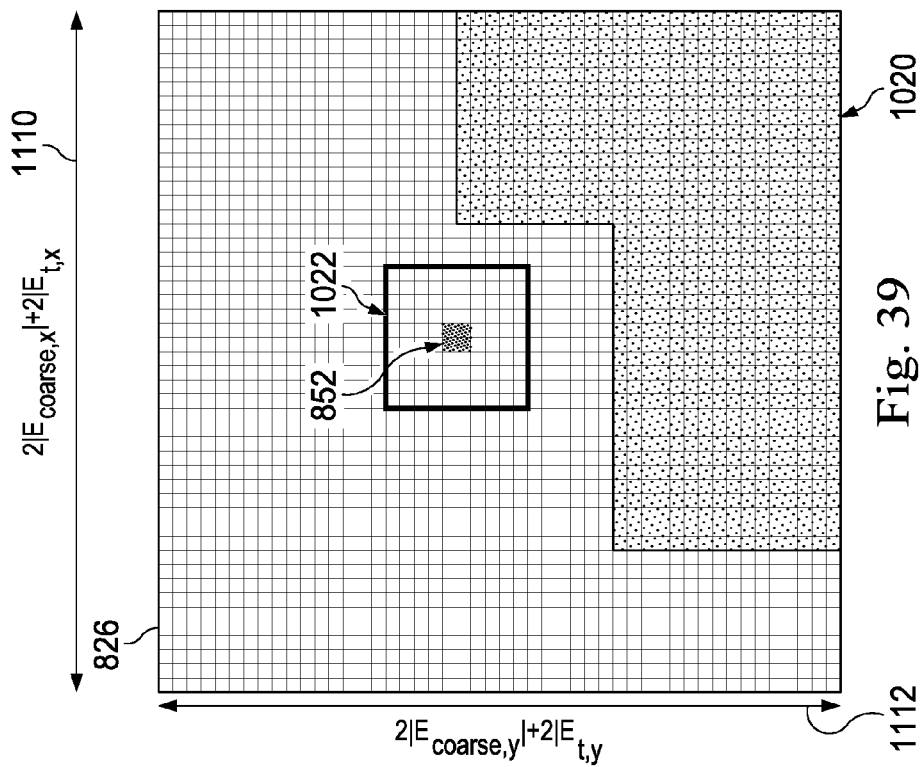
FIGS. 38 and 39 show aspects of ensuring proper alignment of a tip of a STM to a lattice structure after a coarse movement of the tip across the lattice structure according to an embodiment of the present disclosure.
Figure 38:
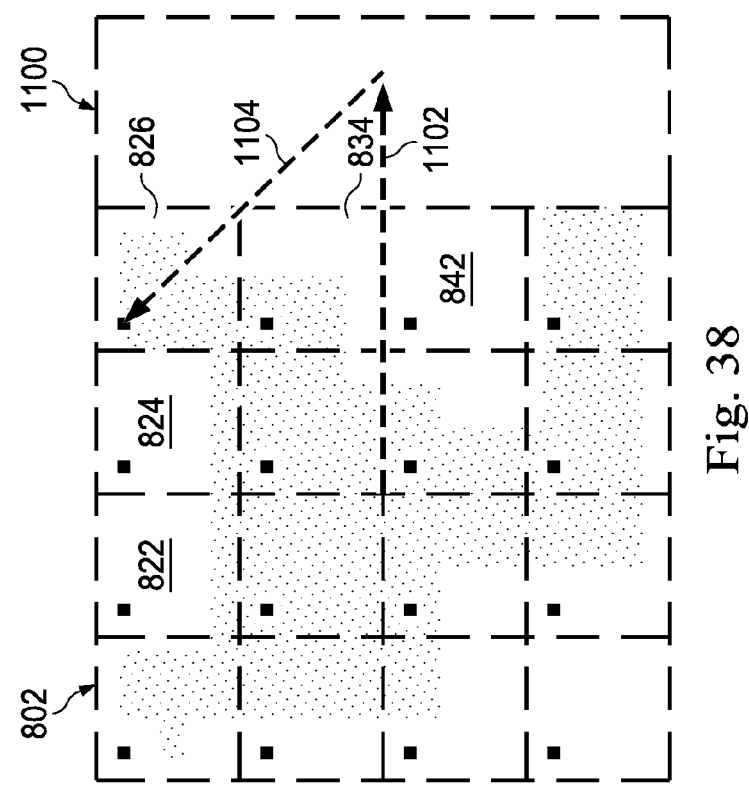

Referring now to FIGS. 38 and 39, shown therein are aspects of ensuring proper alignment of the tip of the STM to the lattice structure after a coarse movement of the tip across the lattice structure according to an embodiment of the present disclosure. In this regard, FIG. 38 is a diagrammatic top view of a pair of scan fields according to an embodiment of the present disclosure. In particular, scan field 802 and an adjacent scan field 1100 are illustrated. As shown, the scan fields 802 and 1100 share a column of write fields. More specifically, write fields 826, 834, 842, and 850 are portions of both scan field 802 and scan field 1000, such that the write fields 826, 834, 842, and 850 define a right boundary of scan field 802 and a left boundary of scan field 1100. In other embodiments, adjacent scan fields do not include overlapping, such as shown by scan fields 802, 804, 806, and 808 of FIG. 29. Regardless of the particular arrangement of the scan fields, movement between scan fields is indicative of a coarse positioning of the tip of the STM with respect to the sample.

In the illustrated embodiment of FIG. 38, the coarse movement of the tip is represented by path 1102. As shown, the coarse positioning is utilized to move the tip from the center of scan field 802 to the center of scan field 1100. In the illustrated path 1102, the movement is entirely in the x-direction. However, it is understood that the coarse positioning may be defined by motion in the x-direction, y-direction, and/or combinations thereof. As discussed above, the components that control the coarse motion of the tip are typically different than the piezoelectric actuators or other elements that are utilized to control the primary scan functions of the STM system. In some instances, the tip disengages from the sample during coarse positioning.

As a result of the coarse movement of the tip, it is necessary for the tip to be re-referenced to the lattice structure within a write field of the new scan field 1100. In this regard, a coarse error ($E_{coarse}$) results from the coarse motion of the tip. In some instances, other tip position errors associated with the system are also taken into consideration. For example, positional errors in the x and y directions ($E_{c,x}$, $E_{c,y}$) are the errors associated with creep and calibration errors in the x and y directions. In some instances, the positional errors ($E_{c,x}$, $E_{c,y}$) are defined by a function having the form $dx=C_1 x$ where $C_1$ is a constant and x is the distance away from a reference point. In some instances, the constant associated with the y direction positional error function is different than the constant associated with the x direction positional error function. Similarly, a time-based positional error ($E_d$) accounts for the expected uncertainty in tip position due to drift. In some instances, the time-based positional error is defined as $(E_d)=C_2(t)=C_{2,x}(t)+C_{2,y}(t)$. Accordingly, in some implementations the total positional error ($E_t$) is defined by the combination of positional errors ($E_{c,x}$, $E_{c,y}$) associated with creep and calibration and the time-based positional errors ($E_d$). For example, in some instances the total positional error is defined as $(E_t)=\text{sqrt}(E_c^2+E_d^2)$. However, in some instances the individual x and y components of the total error are taken into consideration such that the total positional error in each of the x and y directions is defined by $E_{t,x}=|E_{c,x}|+|E_{t,x}|$ and $E_{t,y}=|E_{c,y}|+|E_{t,y}|$.

In order to re-reference the tip to the lattice structure within the new scan field 1100, the tip is moved to the center of an expected location of a fiducial marker. For example, in the illustrated embodiment of FIG. 38, the movement of the tip from the center of scan field 1100 to the expected location of fiducial marker 852 in write field 826 is represented by path 1104. As the movement defined by path 1104 is within the scan field 1100, it is carried out by the piezoelectric actuators or other elements that are utilized to control the primary scan functions of the STM system, instead of the coarse positioning components. With the tip positioned where a fiducial marker is expected to be located, a region of the sample centered on that location is imaged in order to identify the fiducial marker and reference the tip to the actual location of the fiducial marker. To this end, FIG. 39 is a diagrammatic top view of a portion of the pixel grid of write field 826 corresponding to the region that will be scanned in an effort to identify the fiducial marker 852. As shown, the scan region is sized to take into account the expected total scan error ($|E_{t,x}|$, $|E_{t,y}|$) and coarse motion error ($|E_{coarse,x}|$, $|E_{coarse,y}|$) associated with moving the tip from the scan field 802 to the center of scan field 1100 to the expected location of fiducial marker 852 within the write field 826. Accordingly, in the illustrated embodiment the scan region has a width 1110 in the x direction that is equal to $2|E_{coarse,x}|+2|E_{t,x}|$ and a height 1112 in the y direction that is equal to $2|E_{coarse,y}|+2|E_{t,y}|$. In this manner, as long as the positional error is within the expected tolerances, then the fiducial marker 852 will be captured by the scan region and the tip can be referenced to the fiducial marker and, thereby, the sample lattice structure.

Generating Tip Vectors in Multi-Mode Patterning

With a desired pattern defined in pixels that have a direct correspondence to the surface lattice structure of the sample, the pattern is divided into scan fields, write fields, and write elements for one or more exposure modes (e.g., low bias modes and/or high bias modes). The starting pattern is defined in pixels and the edges of the pattern are characterized in terms of the desired (e.g., absolute atomic precision, atomic precision, edge acuity of x pixels or less, etc.). The process of converting a pattern, defined as a set of pixels and associated edge acuities, into an input file with a list of instructions for the tip to follow in terms of movements and exposure modes is generally referred to as compiling. Exemplary aspects of compiling a pattern for depassivation lithography in accordance with the present disclosure are described below. However, it is understood that the described steps of compiling the pattern are exemplary in nature and that one or more of the steps may be omitted, one or more additional steps may be added, and/or the order of the steps may be changed without departing from the scope of the present disclosure. Further, one skilled in the art will recognize that there are alternative ways or manners of compiling a pattern for the depassivation lithography techniques of the present disclosure and such alternative techniques are included within the scope of the present disclosure. Generally speaking, any type of compiling procedure now known or developed in the future may be utilized to compile patterns for use with the depassivation lithography processes of the present disclosure.

For the sake of clarity in the provided example, it is presumed that the STM system is operable in an imaging mode and three different depassivation exposure modes. More specifically, the depassivation exposure modes include one atomically precise, low bias mode (LB-1) and two different high bias modes (HB-1 and HB-2). For the compiling process, these different exposure modes are understood to have the following line pattern characteristics in terms of fully saturated and partially saturated portions as measured in units of pixels:

| Mode | Fully Saturated Line Width | Partially Saturated Line Width | Partially Saturated Line-End Line Width |
|---|---|---|---|
| LB-1 | 1 | 0 | 0 |
| HB-1 | 6 | 2 | 5 |
| HB-2 | 10 | 4 | 9 |

The table above is simply one possibility of modes that could be developed and used. The modes are expected to expose pixels in lines similar to those shown in FIGS. 27 and 28. The LB modes are expected to have only fully saturated line widths. For any one mode, the widths of the lines both fully saturated and partially saturated, and the partially saturated end of line length are fixed. The lines can be as long as required within one write field or even scan field.

Figure 40:
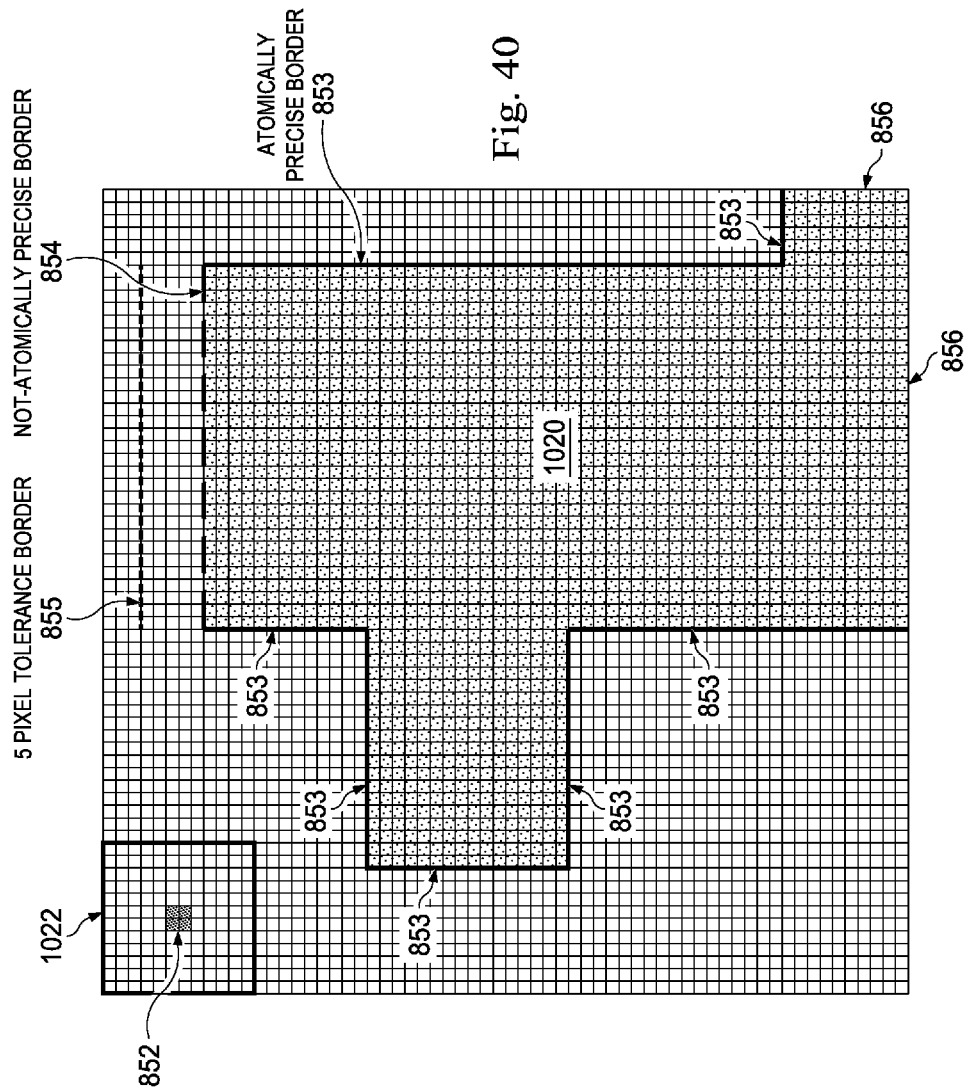
FIGS. 40-46 show aspects of generating tip vectors for a desired pattern according to an embodiment of the present disclosure.

FIG. 40 as well as FIGS. 41-46 is pixel grids of a write field. Such as is shown in FIG. 40, in each write field where a portion of the desired pattern 1020 exists, the pattern needs to be exposed with some distribution of these exposure modes. The pattern will include boundaries that will be designated as atomically precise (AP) boundaries 853 or Non-AP boundaries 854 where a tolerance in pixels orthogonally beyond the boundary 855 is also defined. Portions of the pattern 1020 that are at the boundary of the write field 856 will be treated in some embodiments as atomically precise borders.

The following process is one way to divide the exposure of such a pattern between these three exposure modes that attempts to minimize the use of the LB1 mode while maintaining the atomic precision of the AP boundaries and respecting the tolerances defined for the non-AP boundaries and at the same time attempting to use the HB2 mode as much as possible to speed up the exposure process. In this example the portions of the pattern in the write field that are coincident with the write field boundaries are treated as AP boundaries if the desired pattern does not extend beyond the boundary and is specified to be an AP boundary. If, however, the pattern does extend beyond the write field boundary, that edge will be considered a non-AP boundary with a tolerance as large as the extent of the pattern beyond the write field (e.g., in the adjacent write field(s)).

Figure 41:
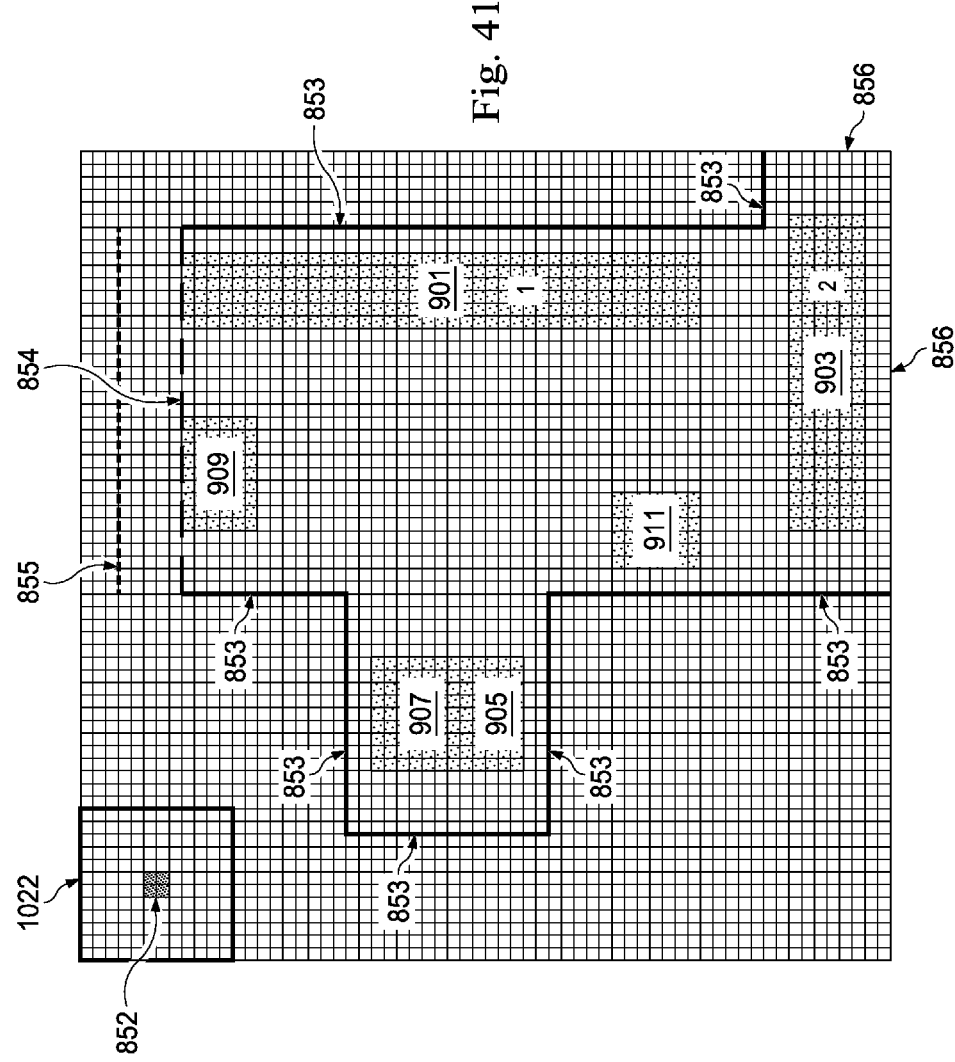

The first step in this process, as shown in FIG. 41, is to place HB1 (the HB mode with the smallest partially saturated regions) lines along the periphery of the pattern starting with the longest such AP boundary edge and proceeding in decreasing length order until all boundary edges that are longer than the fully saturated width of mode HB1 have an HB 1 line along the edge. In FIG. 41, HB1 lines 901, 903, 905, 907, 909, and 911 have been placed in that order. In placing these lines, the outer edge of the partially saturated region aligns with the AP boundaries 853 and 856 while the non-AP boundaries 854 align with the fully saturated region of the HB 1 line, unless the partially saturated region of the line extends beyond the tolerance area 855 for that boundary. In that case, the edge of the partially saturated region of the HB 1 line aligns with the limit of the tolerance 855 defined for that non-AP boundary.

Figure 42:
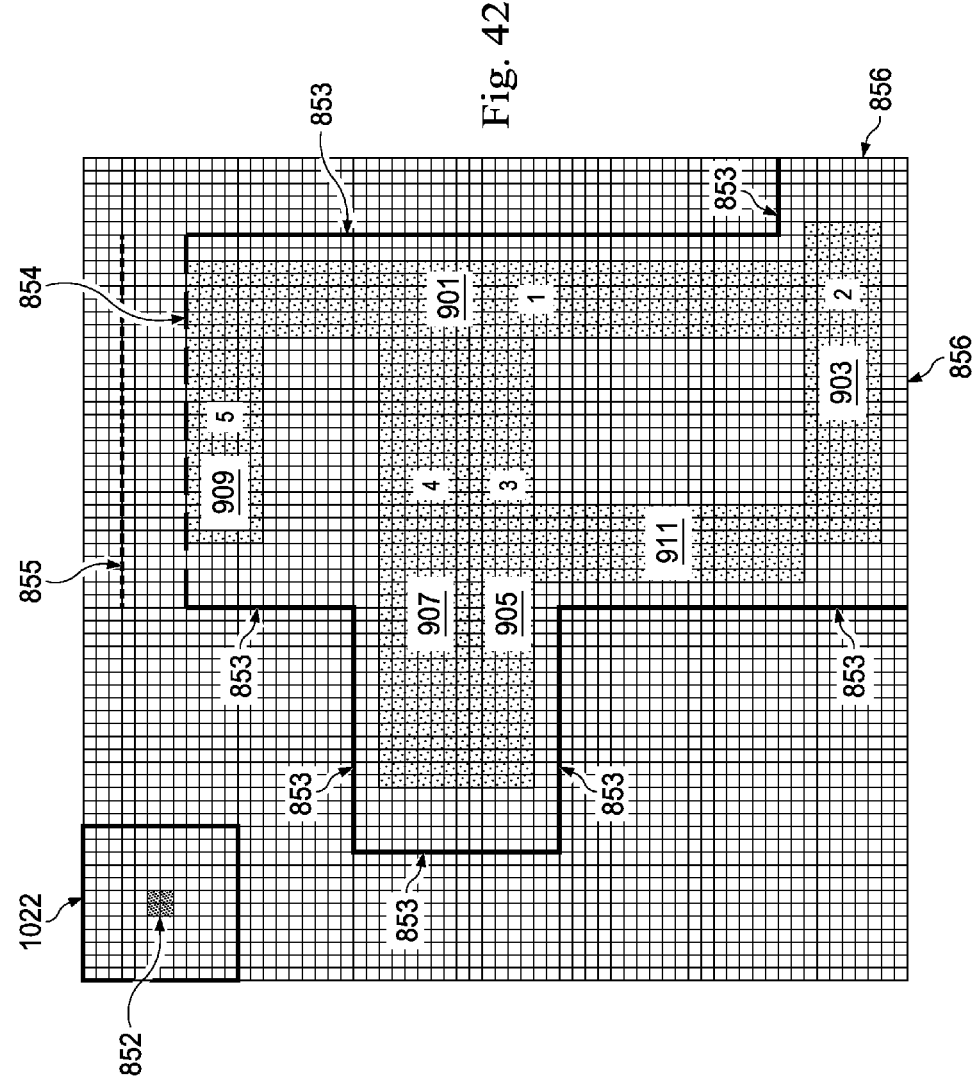

The second step in this process, as illustrated in FIG. 42, is to extend the HB1 lines at either end, in the order that they were assigned until their saturated region meets the saturated region of another HB 1 line, or the edge of the partially saturated region of the extending line reaches an AP boundary or the tolerance of an Non-AP boundary. Allowing HB 1 lines to overlap is acceptable in some instances. For instance HB1 line 901 extends down until its fully saturated region reaches the fully saturated region of HB1 line 903. Similarly lines 905, 907, and 909 have been extended until their fully saturated regions met the fully saturated regions of the other lines. HB1 line 911 was similarly extended in this case at both ends.

Figure 43:
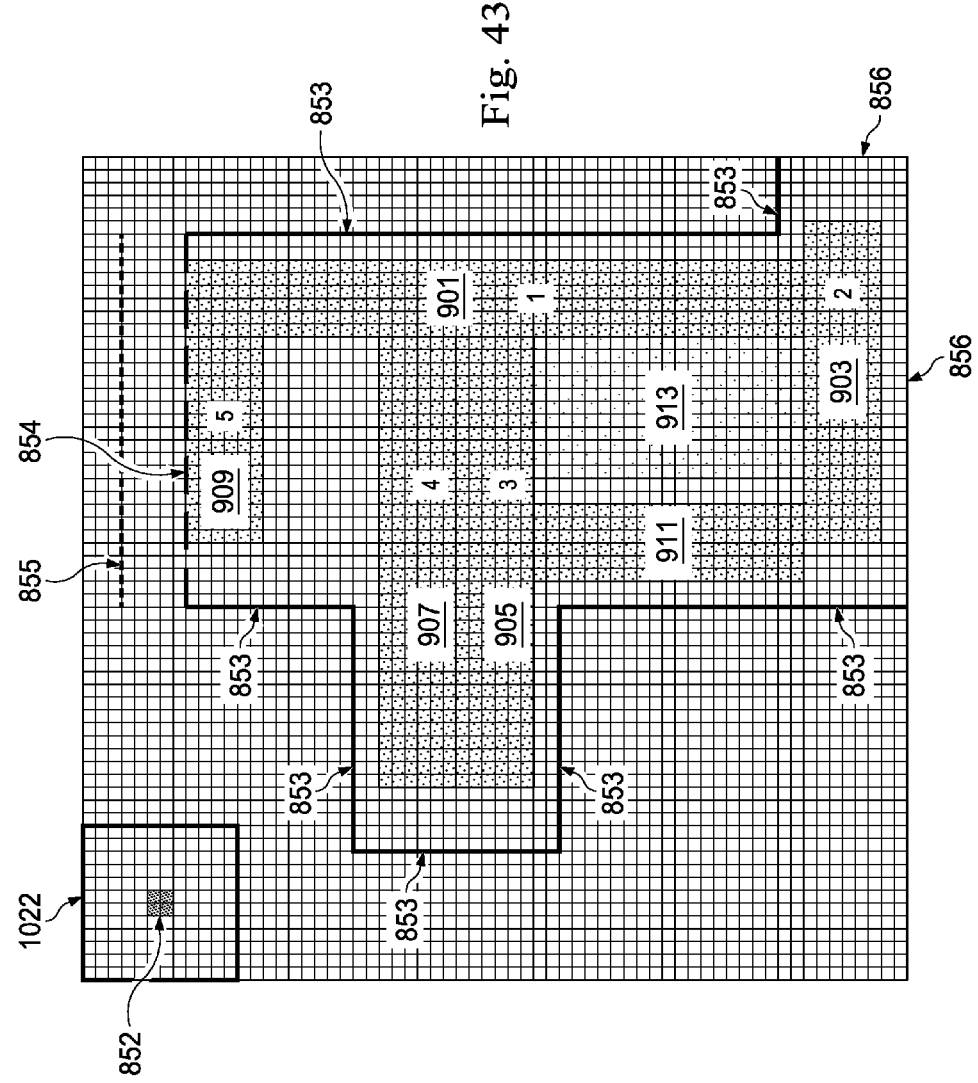

The third step in this process, as illustrated in FIG. 43, is to place HB2 lines in the pattern. This is done wherever there is an area of pixels at least N×N (where N is the fully saturated line width of HB2 lines) that are not yet covered by fully saturated regions of one of the previously placed HB lines. This placement must not place any portion of the HB2 line (i.e., fully or partially saturated portions) outside of the AP boundaries or outside the tolerance of non-AP boundaries. The placement of the HB2 lines should maximize the coverage of fully saturated pixels in the pattern while minimizing the overlap of fully saturated pixels. HB2 line 913 is placed according to these rules in FIG. 43.

Figure 44:
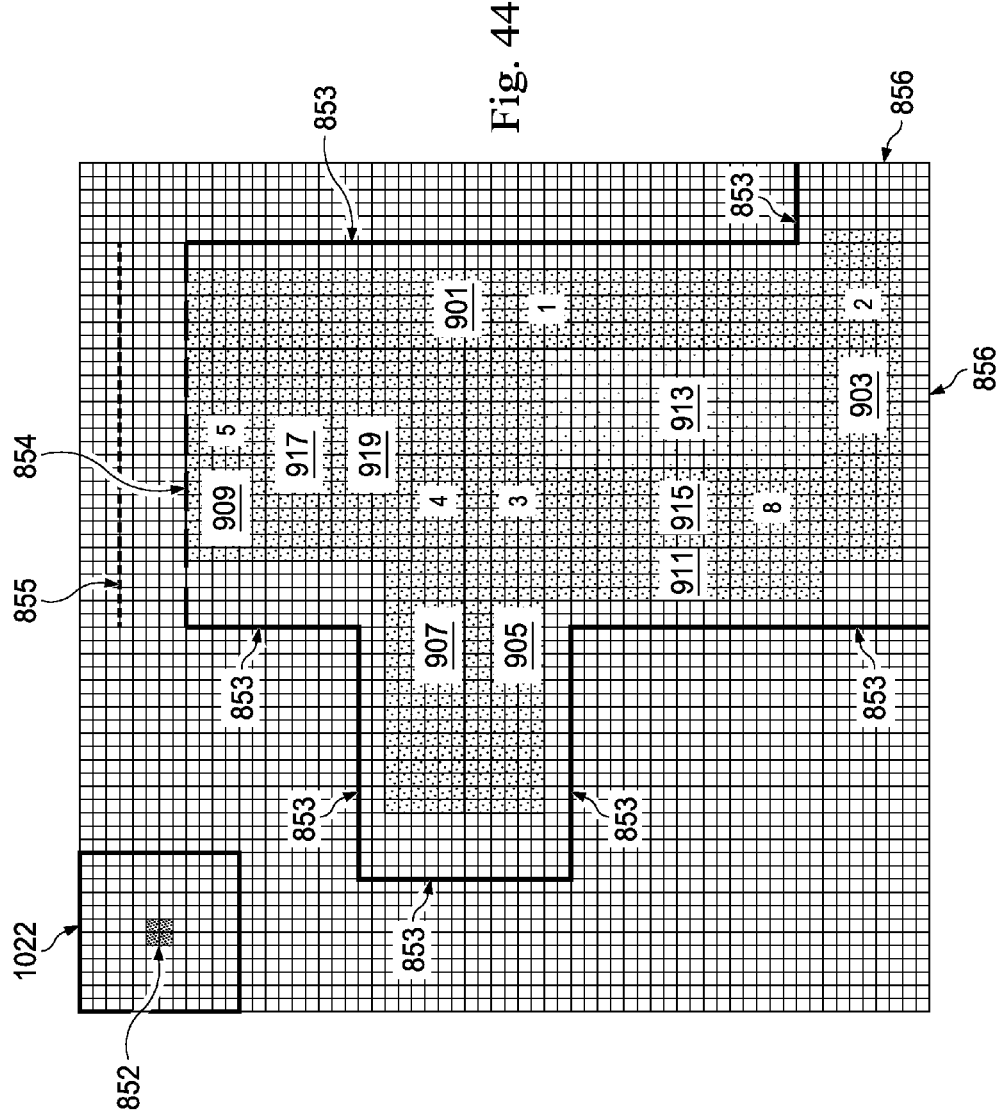

The fourth step in this process, as illustrated in FIG. 44, is to place additional HB 1 lines where possible following the same rules to the placement of HB2 lines in step three. These additional HB1 lines are placed wherever there is an area of pixels at least M×M (where M is the fully saturated line width of HB1 lines) that are not yet covered by fully saturated regions of one of the previously placed HB1 or HB2 lines. HB1 lines 915, 917, and 919 are placed according to these rules in FIG. 44.

Figure 45:
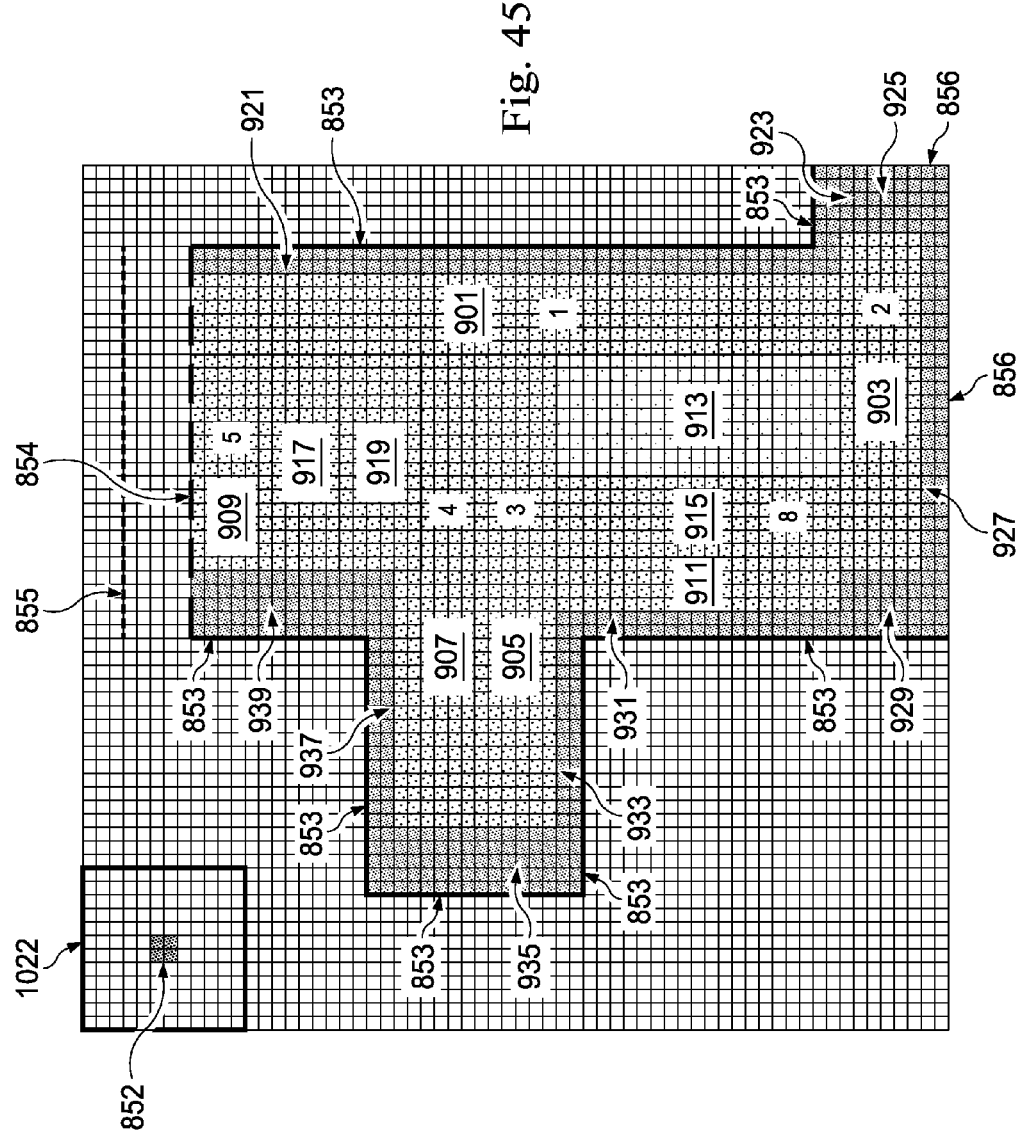

The fifth step in this process, as illustrated in FIG. 45, is to identify all of the pixels that are inside the desired pattern area that are not covered by the fully saturated regions of the HB1 and HB2 exposures and designate these as pixels that will be exposed by the LB1 mode. The identified pixels are collected into rectangular LB1-write elements. The rectangular LB1 write elements 921, 923, 925, 927, 929, 931, 933, 935, 937, and 939 are shown in FIG. 45.

Figure 46:
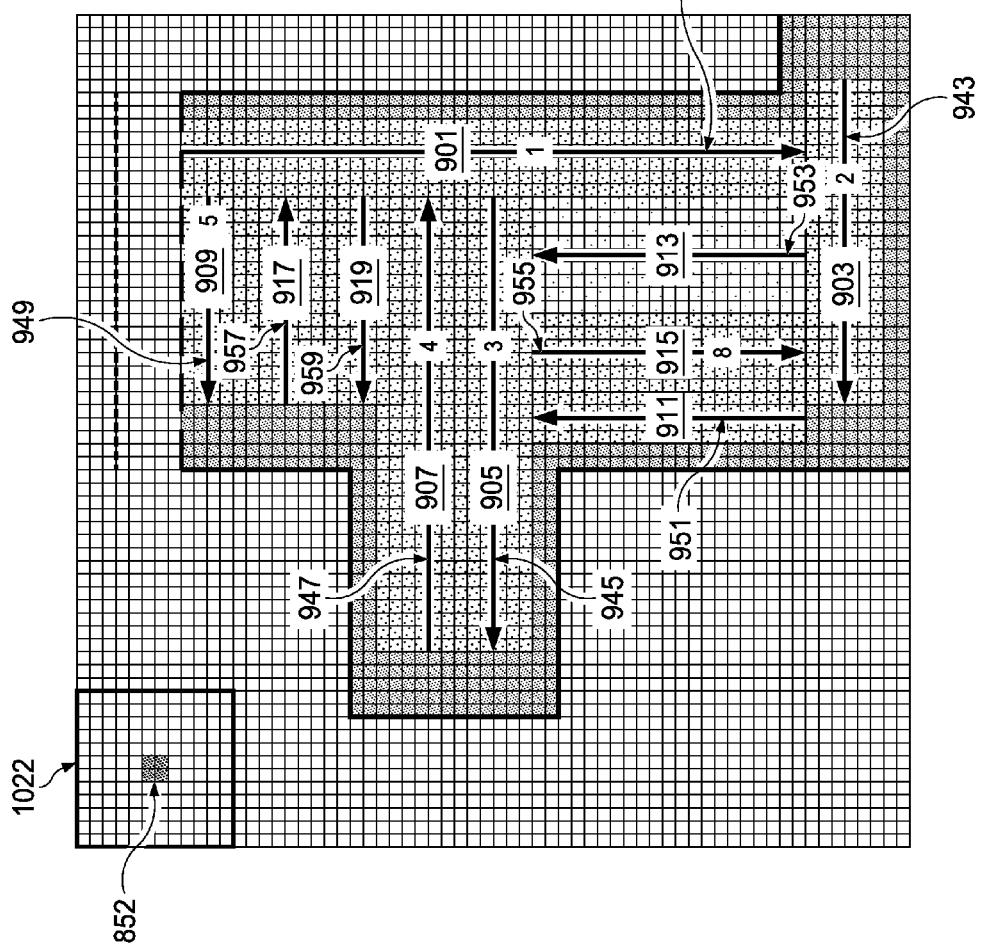

The sixth step of this process, as illustrated in FIG. 46, is to define the tip vectors for the HB1 and HB2 modes. A tip vector that will expose one of the HB1 or HB2 lines defined in steps 2-4 will run along the center line of the defined line with the beginning and end points being at or close to the end of the saturated region. Tip vectors 941, 943, 945, 947, 949, 951, 953, 955, 957, and 959 for the HB1 and HB2 lines are shown in FIG. 46. In some instances, the beginning and end points are biased slightly to achieve the desired exposure pattern. The necessary adjustment is determined experimentally in some implementations. The direction of the tip vector could be either direction along the line and could be selected to minimize tip motion and/or creep. Similarly, the order of the tip vectors (order of exposure) can be chosen to minimize tip motion and/or creep.

The seventh step in this process is to define tip vectors for the LB1 mode exposures. Rectangular LB1 write elements were defined in step 5. Exposure along dimer rows as depicted in FIG. 33, or perpendicular to dimer rows as depicted in FIG. 34 or other exposure approaches discussed elsewhere herein can be used to define LB mode tip vectors.

At the end of this process a list of ordered tip vectors is defined for each mode within each write field. These tip vectors can be organized into a file representing the exposure process for any specific pattern. The order of tip vectors in the file represents the exposure order in some instances. To that end, the exposure order can be selected to satisfy a number of different criteria. For instance, doing the LB1 exposures first has the advantage of creating structures that can be used as fiducials for subsequent HB1 and HB2 exposures. If set up and verification of the different exposure modes are long enough, it is preferable in some instances to finish all LB1 exposures in all scan and write fields before moving on to HB1 and HB2 exposures. Similarly, all HB1 exposures are completed before moving onto HB2 exposures in some instances. On the other hand, if minimizing total tip motion in exposures is desirable, completing all exposure modes in each write field may be preferable in some implementations. Other organizing principles may be used including ones that take into account the need to protect fiducial markers until they are no longer required.

There are a number of different tip paths that can be taken when moving from one write field to another write field, within a single write field when moving from one write element to another write element, and even within a write element, for example choosing whether to write along or across dimer rows. The particular path selected can be determined in real time by the STM system or by ordering the details of the write elements in the input file as described above. In determining the tip path, there are different organizing principles that can be used.

Figure 47:
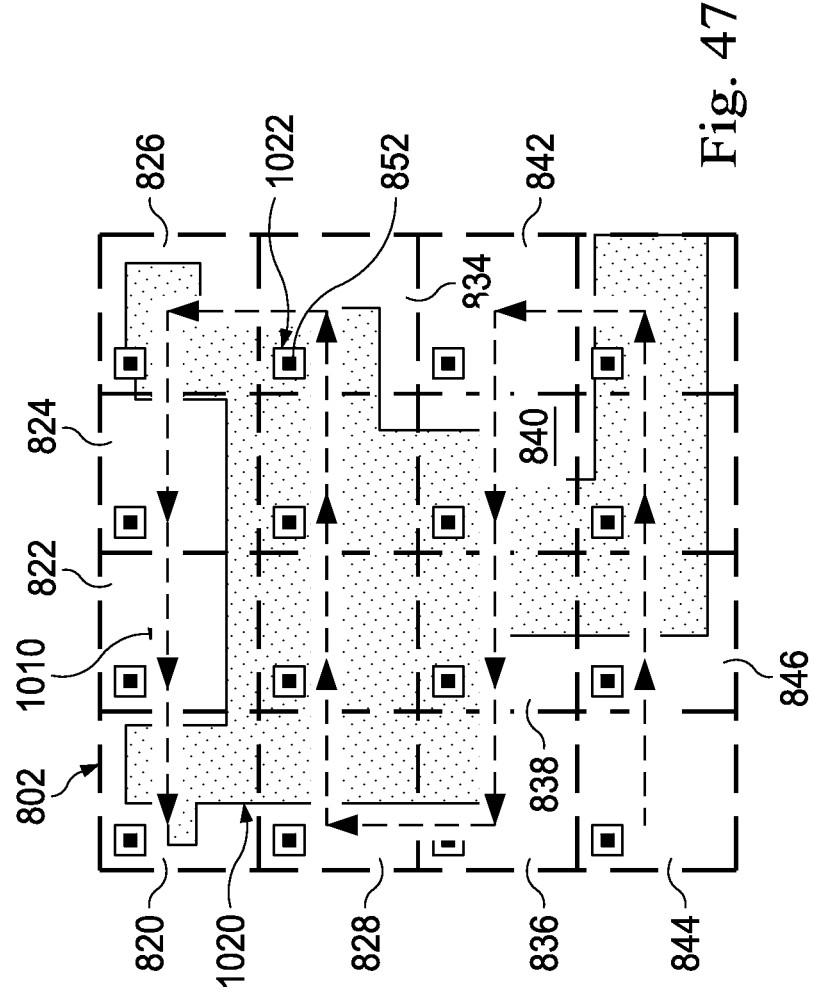
FIG. 47 is a diagrammatic top view of a scan field showing an exemplary path across the plurality of write fields for generating a pattern across the plurality of write fields according to an embodiment of the present disclosure.

In some instances, the tip path is organized in an effort to minimize the length of the path, which can improve time efficiency and potentially reduced positional errors. One such approach for minimizing path length is shown in FIG. 36, where the tip follows a serpentine path (e.g., path 1000 of FIG. 36) through the write fields of a scan field when writing the array of fiducial markers. Once the last fiducial marker has been written for the scan field and the relative location of last fiducial marker has been verified to the lattice structure, then the write element with the closest starting point to the last fiducial marker is identified (e.g., by using a simple approximation to the traveling salesman problem or other technique for determining the write element with closest starting point). The tip motion proceeds by moving to closest write element, exposing the write element pattern with the appropriate exposure mode(s), and then moving to the next closest write element. This process is repeated until all of the write elements of the write field have been exposed at which point the tip proceeds to the next write field following a path (e.g., path 1010 of FIG. 47) that moves across the write fields in a reverse order to the original serpentine pattern (e.g., path 1000 of FIG. 36) that wrote the fiducial array. Upon registering the tip to the fiducial marker in the new write field, the tip continues the process of writing the nearest write element in the manner described above. If there are no write elements for a write field, then the tip simply continues to the next write field. This process continues until all of the write elements in the write fields have been written.

In some instances, the tip path is organized to take into consideration the different bias modes that will be used to write the pattern. As noted previously, if the pattern is to be written with both a low bias mode and a high bias mode, then there can be advantages to exposing the low bias mode portions first. For example, the atomic precision of these low bias portions allows parts of the written pattern to serve as additional fiducial markers that can be used for tip registration. To this end, the tip path can be organized to write all low bias mode portions for a write field or a scan field, before moving to the high bias mode portions for the write field or the scan field.

Accounting for Step Edges

As noted above, there will inevitably be instances where it is necessary to write a pattern over an area of a sample that contains one or more atomic step edges between terraces. Exemplary methods by which the patterns can accommodate these surface features are described below. The example used here to provide different techniques for dealing with step edges are specific to Si(001) or the (001) face of other diamond-structure elements, such as diamond or germanium. For (111) faces of cubic crystals, for example, there will be three layers with different atom positions, before the crystal repeats itself, and for (0001) faces of hexagonal close packed crystals, there will be two. Thus, in general, although the details will differ from one surface to another, similar concepts as those presented herein can be applied by abstracting a surface structure into arrays of individually writable pixels and handling any step edge, twin boundary, and/or other crystal defect on any crystal surface.

In the exemplary case of Si(001) with a diamond crystal lattice, step edges will introduce unavoidable shifts of ½ of the average atom spacing on a Si (100) surface, which is equivalent to a ¼ of a pixel described above. If two or more step edges are encountered, if there are epitaxial islands of different dimerization phases, and/or if there is a mixture of rebonded and non-rebonded B-type step edges present, then the pixel displacement on a particular terrace could be shifted as much as ½ of a pixel or an entire silicon atom. If these step edges are not taken into consideration, then the associated offsets in the actual surface atom positions relative to the design pixel grid can result in errors that adversely affect the depassivation process and the resulting pattern completeness and accuracy. The present disclosure provides several different techniques for handling these step edges when defining the pixel grid of the lattice structure. The techniques described below avoid error accumulation and limit the maximum shift of the desired pattern placement such that the error in the control of the placement of pattern elements and their edges can be kept to less than a pixel.

In the following paragraphs, two different methods of dealing with the shifts in atomic positions due to step edges for Si (100) 2×1 surfaces will be described. Each of these methods will start with a design based on the 4 atom pixel described above where the pixels are placed on a single atomic terrace.

Each of these examples will deal with small patterns where the exposures are all to be accomplished with atomic-resolution (e.g., low-bias modes) where the precision of the pattern definition and tip motion to accomplish the exposure are of the highest importance. In the context of the less precise patterning (e.g., high-bias modes) that will often be made in coordination with the atomically precise patterning the partial pixel shifts can be ignored in some implementations. Each of the methods described below also addresses the generation of tip vectors that are used to make the low-bias exposures. A distinguishing feature between each of the described methods is the level of pre-scanning of the write field that is utilized. In method 1, the least amount of pre-scanning is done. In method 2, there is a relatively complete pre-scan or surface sampling, as described with reference to FIGS. 9-21, so that essentially all surface features are known. It should be noted that aspects of two or more of these methods may be combined to form additional methods of dealing with step edges without departing from the scope of the present disclosure.

Step Edges—Method 1

Figure 48:
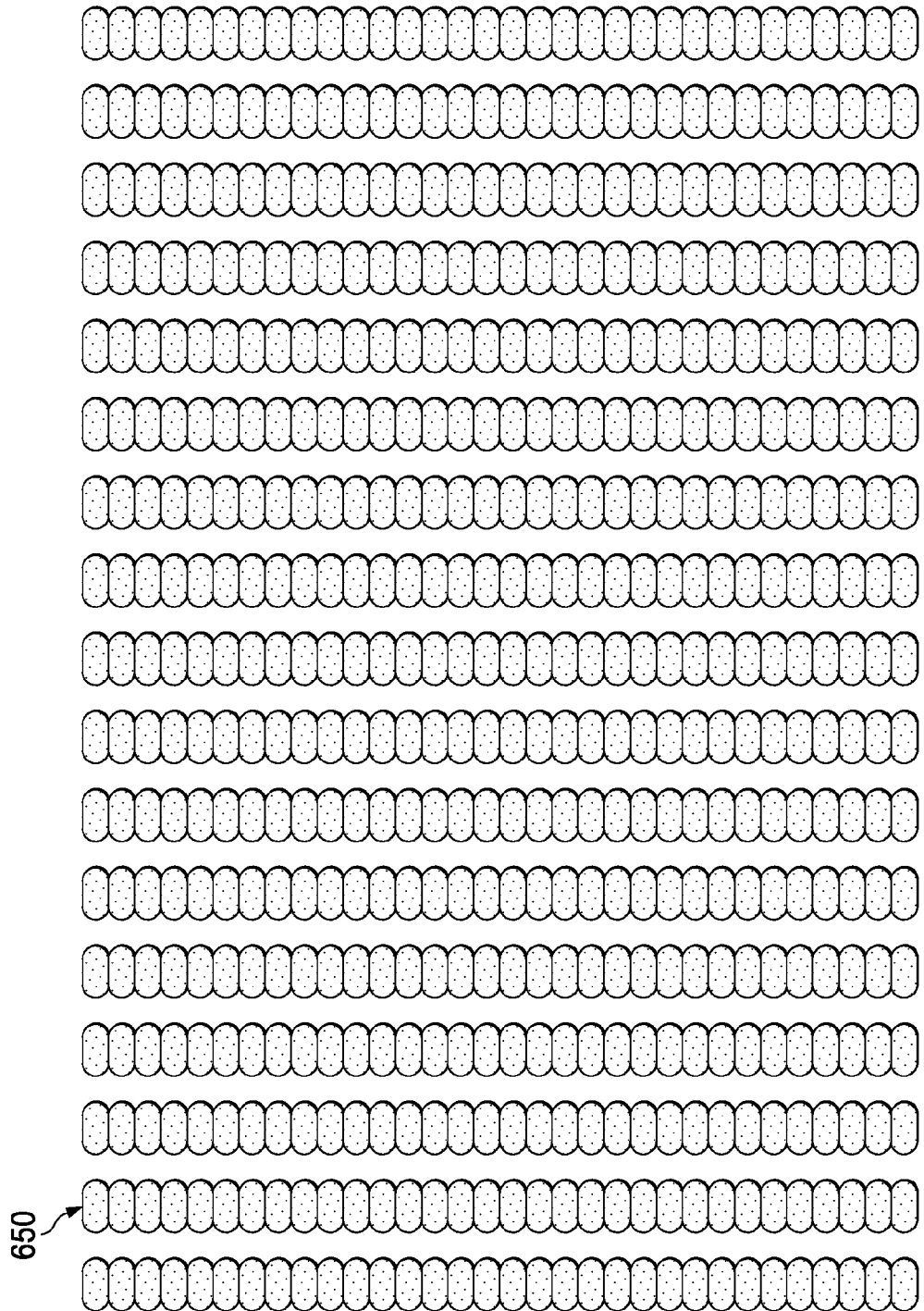
Figure 49:
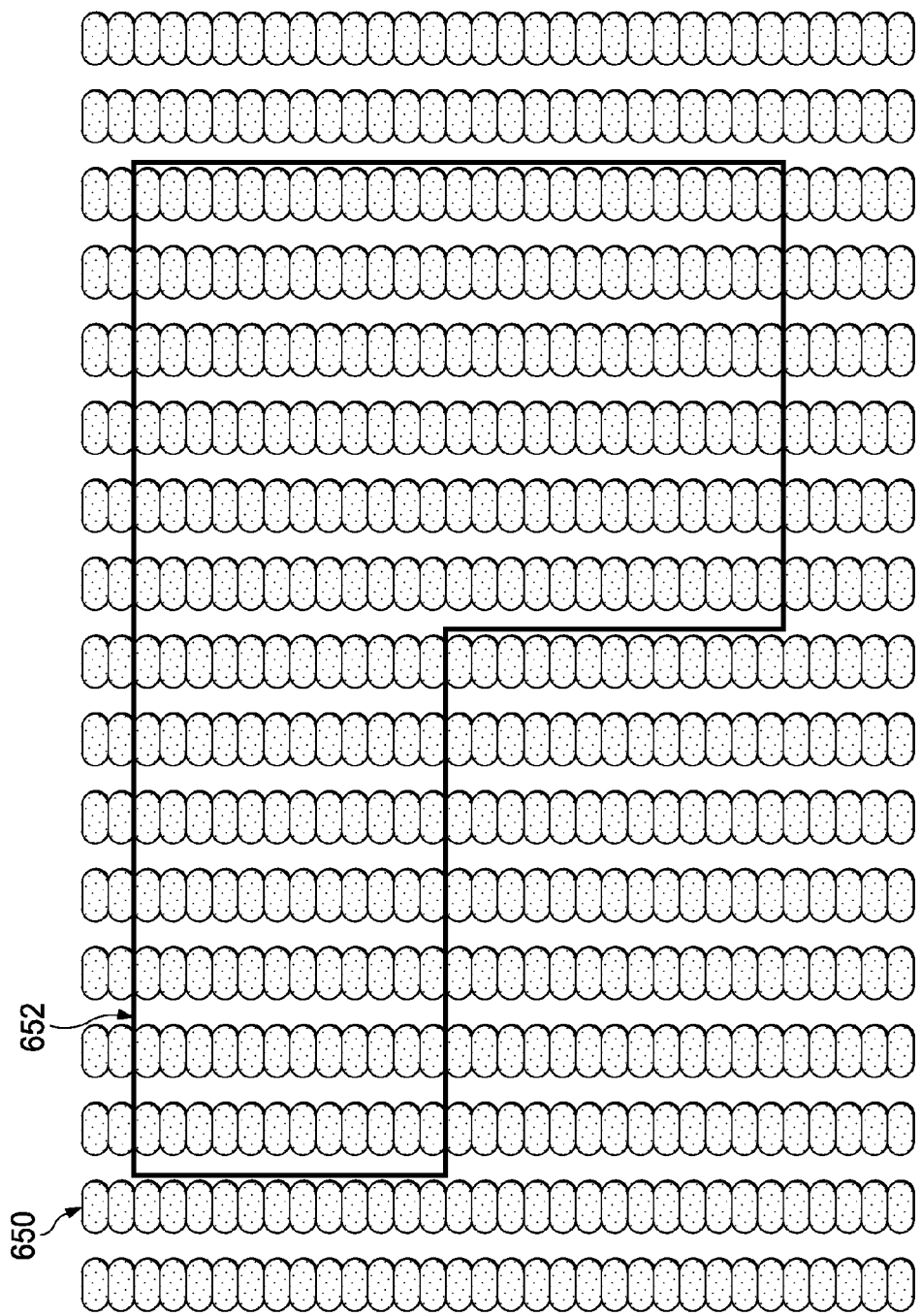

Collectively, FIGS. 48-52 show aspects of writing a desired pattern geometry by depassivating atoms or molecules from a lattice structure having multiple terraces that takes into account the effects of the multiple terraces according to an embodiment of the present disclosure. Referring initially to FIG. 48 the method starts by assuming the pattern will be formed on a silicon lattice structure sample 650 having a single terrace. With a single terrace, there is no ambiguity in the pattern layout as all of the pixels are defined by a common grid and, therefore, have a regular spacing. To this end, FIG. 49 shows a desired pattern outline 652 laid out on the single terrace sample 650.

With the pattern 652 defined on the single terrace sample 650, the terrace structure of an actual sample onto which the pattern is to be formed can be taken into consideration. For example, FIG. 50 illustrates a silicon lattice structure sample 660 having multiple terraces according to an embodiment of the present disclosure. In this context a terrace is understood to mean a generally contiguous area of the sample surface having dimer rows extending in a common direction. In particular, the sample 660 has four terraces 662, 664, 666, and 668 beginning with the upper most or highest terrace 662 and transition through terraces 664 and 666 to the lower most or bottom terrace 668. Further, there is an epitaxial island 670 located on terrace 664, which has the same height as terrace 662, but the dimer rows are out of phase with the dimer rows of terrace 662. Referring now to FIG. 51, the pattern 652 is overlaid onto the sample 660. As shown, the pattern 652 extends across all four terraces 662, 664, 666, and 668 of the sample 660. In the illustrated embodiment, the reference terrace of the pattern 652 is terrace 664. As a result of the terrace transitions, the pattern 652 is offset with respect to dimer row trenches of each of terraces 662, 666, and 668, and island 670. Accordingly, in some instances the original pattern 652 is modified to create a pattern 672 (as illustrated in FIG. 52) that aligns the pattern outline to the dimer rows and dimers of each terrace 662, 664, 666, 668, and 670. To this end, in some implementations the portions of the pattern 652 that are offset with respect to a dimer row are transitioned to the nearest possible dimer row or dimer. Where the pattern 652 is offset an equal distance between two dimer rows or dimers, then the pattern 652 is transitioned in accordance with a default rule. For example, in some instances the default rule indicates that for vertical pattern edges the pattern should move left and for horizontal pattern edges the pattern should move down. In other embodiments the default rule can dictate that the pattern move right or up, respectively. Any combination of vertical pattern edge rules (left or right) and horizontal pattern edge rules (up or down) can be utilized. Using such an approach resolves discrepancies in ideal pattern layout over a single terrace with respect to pixel grid layouts across multiple terraces without error accumulation as all modifications are relative to the initial pattern outline and in no case are individual pattern boundary motions larger than ½ of a pixel.

As shown in FIG. 52, with the modified pattern 672 defined, tip vectors (i.e., the movements the tip of the STM system is to make) for writing the depassivation pattern are defined. In this regard, nominal tip vectors 680 are defined based on the original pattern 652. The tip vectors 680 are then modified as necessary to align with the lattice structure across the different terraces 662, 664, 666, and 668. This may include rotation of the tip vectors of successive terraces in order to align the tip vectors along or across the local dimer rows. In the illustrated embodiment, modified tip vectors 682 are defined. In this regard, in some implementations the modification of the tip vectors 680 follows the same approach, including similar vertical and horizontal decision rules, as that used to modify the pattern 652 into the pattern 672. This approach provides a simple and straightforward way of dealing with step edges to limit or eliminate adverse effects to the depassivation process.

Step Edges—Method 2

In the above approach, the pattern edges and then the direction and position of tip vectors are adjusted for on an ad hoc basis. It may, in some instances, be preferable to define a shift for the pixel grid for an entire terrace, and then to adjust the pattern edges for every write element on that terrace according to the shift in the pixel grid. Explicit determination of the shift in the pixel grid would allow, for example, that different write elements which are on the same terrace, would be shifted in the same direction, thus maintaining their precise relative separation.

Collectively, FIGS. 53-55 show aspects of writing a desired pattern geometry by depassivating atoms or molecules from a lattice structure having multiple terraces that takes into account the effects of the multiple terraces according to another embodiment of the present disclosure. In some instances, the process of laying out and adjusting the global pixel grid proceeds as follows: When the tip is moving across the surface, it will detect a step edge by the sudden change in average height. In some instances, the tip will make a pre-scan over a small area bridging the step edge to determine the local position of the dimer row trenches and the position of the step edge, on the new terrace using the methods described above in FIG. 22. In other instances, the tip will make a detailed scan of the entire write field to determine the location of all the step edges within the write field.

Based upon this pre-scan, the pixel grid will be laid out, with the dimer row trenches defining pixel edges in one direction for each terrace, and the pixel edges chosen in the other direction to minimize the net shift from the global reference grid. For example, a model of a section of the Si(001) surface is shown schematically, 660 in FIG. 50. The average z-level (i.e., tip height) for each terrace is utilized to determine terrace heights. It should be noted that in the context of this technique, two epitaxial islands are considered as separate terraces having the same height. Such an interpretation is desirable as the dimer rows of the two islands may have a ½ pixel shift with respect to each other. Referring now to FIG. 53, a pixel grid has been laid out on the surface section 660, covering each of the terraces 662,664,666,668, and 670.

If possible, the layout should shift in order to minimize any gaps in the grids between layers. Where this is unavoidable, half-pixels should be used, or overlap of pixels on the two layers, as illustrated by half-pixels 672 on terrace 664 in FIG. 53.

Using this method 2 will define all pixels and their precise location in the pattern desired to be exposed. Tip vectors may be determined by simply defining a path that travels over each pixel in each terrace. These could be all vertical paths, all horizontal paths, or paths designed to minimize the number of tip vectors or some other criteria. Furthermore since the direction of the dimer rows for each terrace will be known, it is possible to define tip vectors that are aligned with the dimer rows or are perpendicular with the dimer rows. Note that the tip vectors could be traced in either direction. Those skilled in the art recognize that there are many different and effective approaches that could be used to accomplish the same exposure.

This alternative method of dealing with step edges that tracks accumulated step edge errors is more time consuming than the Method 1 approach described above in the context of FIGS. 51-52, but has the advantage of anticipating the shifts that will buy some margin in keeping a known registration to the design grid. Accordingly, this approach of tracking accumulated step edge errors is implemented when maintaining registration is paramount. For example, in some implementations this accumulated error technique is utilized when writing a fiducial marker grid to the sample, while the Method 1 technique of FIGS. 51-52 is utilized when writing a pattern to the sample.

At this point, the sample surface and associated pixel grid are suitably formatted for a pattern compiler. The pattern compiler overlays the desired pattern (in pixels) as if the sample surface is defined by a single terrace, aligned to the reference terrace, as shown by the outline 652 in FIG. 54.

As illustrated in FIG. 55, the pixels to be written are identified and an associated adapted pattern 654 is defined so as to give the closest match to the desired pattern 652. Where the mismatch is ¼ of a pixel, the selected pixel will usually be unambiguous and not be changed. Where the mismatch is ½ of a pixel, there may be a choice of directions. For example, if the pattern edge falls in the center of a dimer row, in some implementations, the edge is moved down or to the left, in order to reach a trench between dimer rows. If the pattern edge falls between two dimers within a pixel, the edge may also be moved down and left, in order to reach a pixel edge. In other instances, a half-pixel (i.e., one dimer along a dimer row) may be used to achieve a better match.

As illustrated in FIG. 55, the compiler then assigns a series of tip vectors 656 that are defined to pass along the center line of the pixels, with a spacing of one dimer row, or one pixel, so as to expose all of the pixels to be written in accordance with the adapted pattern 654. The lengths of the tip vectors may be non-integer numbers of pixels, which allows for offsets at step edges, and for any half-pixels. The compiler determines a suitable tip pathway across the write field that takes into account any requirements to write along and/or across dimer rows. For write elements of the write field contained on a single terrace, the tip moves from a starting point, along the dimer row to the edge of the pattern, moves across one dimer row, and back along the new dimer row to the edge of the pattern, alternating direction until the end point is reached. For a write element extending across multiple-terraces of a write field, the compiler fractures the write element into a plurality of sub-write elements that are each contained on a single terrace. Where possible, the sub-write elements are defined as rectangular patterns. Where a write element must cross a step edge and cannot be fractured into separate sub-write elements each contained on a single terrace, the tip motion is defined to follow the dimer row in the direction of the majority terrace. Overlap of tip vectors is permitted, since there is no issue of overexposure in the case of hydrogen depassivation.

Those of ordinary skill in the art will also recognize that the methods and systems described above can be modified in various ways. Accordingly, those of ordinary skill in the art will appreciate that the embodiments encompassed by the present disclosure are not limited to the particular exemplary embodiments described above. In this regard, while illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A method of forming atomically precise structures, the method comprising:
   identifying features of a sample using a scanning tunneling microscope(STM); and
   patterning a surface of the sample by applying a bias voltage between a tip of the scanning tunneling microscope and the surface of the sample, wherein the identified features of the sample are utilized to guide movement of the tip of the scanning tunneling microscope relative to the surface;
   wherein the sample is a crystal and further comprising defining a pixel grid corresponding to the crystal sample based on the identified features of the crystal sample, wherein the pixel grid is utilized to guide movement of the tip of the scanning tunneling microscope relative to the surface of the crystal sample;
   wherein a pixel of the pixel grid is defined by a periodic grouping of atoms or molecules of the crystal sample;
   wherein the pixels are identified by performing at least one of:
   searching for a peak in the absolute value of a Fourier Transform nearest an expected frequency of the periodic grouping of the atoms or molecules;
   comparing an STM image of the crystal sample with a three-dimensional model of the crystal sample and aligning the three-dimensional model to the STM image, wherein the three-dimensional model is based on a lattice structure of the crystal sample defined by the periodic grouping of the atoms or molecules; or
   a combination of (a) searching for a peak in the absolute value of a Fourier Transform nearest an expected frequency of the periodic grouping of the atoms or molecules and (b) comparing an STM image of the crystal sample with a three-dimensional model of the crystal sample and aligning the three-dimensional model to the STM image, wherein the three-dimensional model is based on a lattice structure of the crystal sample defined by the periodic grouping of the atoms or molecules.

2. The method of claim 1, wherein patterning the surface includes removing at least one atom or molecule from the surface of the sample.

3. The method of claim 2, wherein the removal of the at least one atom or molecule is a result of desorption caused by an electronic current passing between the tip and the surface.

4. The method of claim 3, wherein the removal of the at least one atom or molecule is a result of desorption caused by an electronic current passing between the tip and a surface of the crystal.

5. The method of claim 4, wherein the surface is a (100) surface of a diamond structured crystal.

6. The method of claim 5, wherein the crystal is selected from the group of crystals consisting of diamond, silicon, and germanium.

7. The method of claim 6, wherein patterning the crystal surface includes removing at least one hydrogen atom from the crystal surface.

8. The method of claim 2, wherein patterning the surface includes:
applying a first bias voltage to remove the at least one atom or molecule from the surface with an atomic precision; and
applying a second bias voltage to remove the at least one atom or molecule from the surface with a second precision that is not atomically precise and is more efficient at removing atoms or molecules.

9. The method of claim 1, wherein the movement of the tip of the scanning tunneling microscope relative to the surface automatically accounts for creep of one or more actuators used by the scanning tunneling microscope.

10. The method of claim 1, wherein the movement of the tip of the scanning tunneling microscope relative to the surface automatically accounts for drift of the scanning tunneling microscope.

11. The method of claim 1, wherein the movement of the tip of the scanning tunneling microscope relative to the surface utilizes closed loop positioning in three axes.

12. The method of claim 1, wherein the identified features of the sample utilized to guide movement of the tip of the scanning tunneling microscope include surface features resulting from patterning the surface of the sample using the scanning tunneling microscope.

13. The method of claim 1, wherein the movement of the tip of the scanning tunneling microscope relative to the surface automatically accounts for resonances of a tip positioning system utilized to control the position of the tip of the scanning tunneling microscope.

14. The method of claim 1, further comprising:
imaging the surface of the sample with the scanning tunneling microscope following the patterning; and
determining automatically, based on the imaging of the surface following the patterning, whether a desired pattern has been achieved.

15. The method of claim 14, wherein determining whether the desired pattern has been achieved includes identifying any atoms or molecules of the surface intended to be removed that have not been removed; and
further comprising removing, using the scanning tunneling microscope, the identified atoms or molecules intended to be removed that have not been removed.

16. The method of claim 15, further comprising adjusting at least one of the bias voltage, a current, a scan speed, and a relative tip position of the scanning tunneling microscope in subsequent patterning of the surface of the sample with the scanning tunneling microscope to improve an accuracy of the patterning.

17. The method of claim 1, further comprising defining a pixel grid corresponding to the crystal sample based on the identified features of the crystal sample, wherein the pixel grid is utilized to guide movement of the tip of the scanning tunneling microscope relative to the surface of the crystal sample.

18. The method of claim 1, wherein the crystal sample has a 2×1 surface with dimer rows of atoms and wherein each pixel of the pixel grid is defined by four surface atoms formed from two dimers along a dimer row.

19. The method of claim 1, wherein the pixel grid automatically shifts pixel placement to minimize errors when the identified features of the crystal sample include a step edge of one or more atomic layers.

20. The method of claim 1, wherein the movement of the tip of the scanning tunneling microscope relative to the surface of the sample automatically avoids tip changing encounters with the sample by making tip protection a higher priority than tip current control.

21. The method of claim 20, wherein a signal separate from the tip current is utilized for tip protection control.

22. The method of claim 21, wherein the separate signal includes at least one of: a lower gain, higher bandwidth signal from a tunneling current; an accelerometer signal; a signal indicating electrical disturbances; a proximity sensor signal; an encoder signal of a tip positioning system; and an encoder signal of a tip positioning system along with previous knowledge of surface topography.

23. The method of claim 1, wherein patterning the surface of the sample includes dividing a desired pattern into scan fields and write fields, with each write field including an alignment mark.

24. The method of claim 23, wherein the scan fields and the write fields are sized based on an accuracy of a tip positioning system, a stability of the tip positioning system, and a desired pattern precision.

25. The method of claim 1, wherein patterning the surface of the sample includes determining a tip motion to create a desired pattern.

26. The method of claim 25, wherein the tip motion is defined by a plurality of tip vectors.

27. The method of claim 26, wherein the plurality of tip vectors include a first group of tip vectors associated with a first exposure mode having atomic precision and a second group of tip vectors associated with a second exposure mode not having atomic precision that is more efficient at removing atoms or molecules.

28. The method of claim 25, wherein the tip motion is automatically defined to optimize at least one of time, distance, lift, accuracy, and edge precision.

29. The method of claim 25, wherein the tip motion includes reference to one or more reference features to maintain a desired pattern accuracy.

30. The method of claim 29, wherein the one or more reference features include at least one of an identified surface feature of the sample and a feature formed on the surface of the sample using the scanning tunneling microscope.

31. The method of claim 1, further comprising:
imaging the sample with the scanning tunneling microscope during the patterning of the crystal surface; and
automatically adjusting a position of the tip of the scanning tunneling microscope relative to a lattice structure of the sample based on the imaging.

32. A system for forming atomically precise structures on a sample, the system comprising: a scanning tunneling microscope having a tip;
a motion control system configured to precisely control movement of the tip of the scanning tunneling microscope relative to a sample; and
a processing system in communication with the scanning tunneling microscope and the motion control system, wherein the processing system is configured to:
identify features of the sample based on images of the sample obtained by the scanning tunneling microscope such that the identified features of the sample are utilized by the motion control system to guide movement of the tip of the scanning tunneling microscope relative to the sample; and control application of a bias voltage between the tip of the scanning tunneling microscope and a surface of the sample to pattern the surface of the sample;

wherein the sample is a crystal and further comprising defining a pixel grid corresponding to the crystal sample based on the identified features of the crystal sample, wherein the pixel grid is utilized to guide movement of the tip of the scanning tunneling microscope relative to the surface of the crystal sample;

wherein a pixel of the pixel grid is defined by a periodic grouping of atoms or molecules of the crystal sample;

wherein the pixels are identified by performing at least one of:

searching for a peak in the absolute value of a Fourier Transform nearest an expected frequency of the periodic grouping of the atoms or molecules;

comparing an STM image of the crystal sample with a three-dimensional model of the crystal sample and aligning the three-dimensional model to the STM image, wherein the three-dimensional model is based on a lattice structure of the crystal sample defined by the periodic grouping of the atoms or molecules; or a combination of (a) searching for a peak in the absolute value of a Fourier Transform nearest an expected frequency of the periodic grouping of the atoms or molecules and (b) comparing an STM image of the crystal sample with a three-dimensional model of the crystal sample and aligning the three-dimensional model to the STM image, wherein the three-dimensional model is based on a lattice structure of the crystal sample defined by the periodic grouping of the atoms or molecules.

33. The system of claim 32, wherein the application of the bias voltage between the tip of the scanning tunneling microscope and the surface of the sample to pattern the surface of the sample removes at least one atom or molecule from the surface of the sample.

34. The system of claim 33, wherein the processing system controls application of the bias voltage by:

applying a first bias voltage to remove the at least one atom or molecule from the surface with an atomic precision; and applying a second bias voltage to remove the at least one atom or molecule from the surface with a second precision that is not atomically precise and is more efficient at removing atoms or molecules.

35. The system of claim 32, wherein the motion control system automatically accounts for creep of one or more actuators used to control movement of the tip of the scanning tunneling microscope.

36. The system of claim 32, wherein the motion control system automatically accounts for drift of the scanning tunneling microscope.

37. The system of claim 32, wherein the motion control system utilizes closed loop positioning in three axes.

38. The system of claim 32, wherein the identified features of the sample utilized to guide movement of the tip of the scanning tunneling microscope include surface features resulting from patterning the surface of the sample.

39. The system of claim 32, wherein the processing system is further configured to:

determine automatically, based on images of the surface of the sample obtained by the scanning tunneling microscope following patterning, whether a desired pattern has been achieved.

40. The system of claim 39, wherein the processing system determines whether the desired pattern has been achieved by identifying any atoms or molecules of the surface intended to be removed that have not been removed; and wherein the processing system is further configured to control application of the bias voltage between the tip of the scanning tunneling microscope and the surface of the sample to remove the identified atoms or molecules intended to be removed that have not been removed.

41. The system of claim 40, wherein the processing system is configured to automatically adjust at least one of the bias voltage, a current, a scan speed, and a relative tip position of the scanning tunneling microscope in subsequent patterning of the surface of the sample with the scanning tunneling microscope to improve an accuracy of the patterning.

42. The system of claim 32 wherein the processing system is configured to define a pixel grid corresponding to the crystal sample based on the identified features of the crystal sample, wherein the pixel grid is utilized to guide movement of the tip of the scanning tunneling microscope relative to the surface of the crystal sample.

43. The system of claim 32, wherein each pixel of the pixel grid is defined by four surface atoms formed from two dimers along a dimer row of the crystal sample having a 2×1 surface.

44. The system of claim 32, wherein the processing system automatically shifts pixel placement to minimize errors when the identified features of the crystal sample include a step edge of one or more atomic layers.

45. The system of claim 32, wherein the motion control system automatically avoids tip changing encounters with the sample by making tip protection a higher priority than tip current control.

46. The system of claim 32, wherein the processing system is further configured to divide a desired pattern into scan fields and write fields, with each write field including an alignment mark.

47. The system of claim 46, wherein the scan fields and the write fields are sized based on an accuracy of the motion control system, a stability of the motion control system, and a desired pattern precision.

48. The system of claim 32, wherein the processing system is further configured to determine a tip motion to create a desired pattern.

49. The system of claim 48, wherein the tip motion is defined by a plurality of tip vectors, wherein a first group of tip vectors is associated with a first exposure mode having atomic precision and a second group of tip vectors is associated with a second exposure mode not having atomic precision that is more efficient at removing atoms or molecules.

50. The system of claim 49, wherein the tip motion is automatically defined to optimize at least one of time, distance, lift, accuracy, and edge precision.

51. The system of claim 48, wherein the tip motion includes reference to one or more reference features to maintain a desired pattern accuracy.

52. The system of claim 51, wherein the one or more reference features include at least one of an identified surface feature of the sample and a feature formed on the surface of the sample using the scanning tunneling microscope.

* * * * *